United States Patent [19]

Speller, Sr. et al.

[11] Patent Number: 4,821,408
[45] Date of Patent: Apr. 18, 1989

[54] PROGRAMMABLE FIXTURE AND ASSEMBLY CELL

[75] Inventors: Thomas H. Speller, Sr., Buffalo; Jeffrey P. Weaver, Tonawanda, both of N.Y.

[73] Assignee: Gemcor Engineering Corp., Buffalo, N.Y.

[21] Appl. No.: 938,732

[22] Filed: Dec. 5, 1986

[51] Int. Cl.⁴ .................. B23P 21/00; B25B 27/14
[52] U.S. Cl. .................... 29/701; 29/281.5; 29/703; 29/771; 29/822
[58] Field of Search ............ 29/281.1, 281.4, 281.5, 29/281.6, 701, 702, 703, 709, 771, 822, 711, 783, 791; 269/56; 294/81.2, 81.61

[56] References Cited

U.S. PATENT DOCUMENTS

| | | | |
|---|---|---|---|
| 3,243,178 | 3/1966 | Williamson et al. | 269/58 |
| 3,379,354 | 4/1968 | Moehlenpah et al. | 227/152 |
| 3,624,886 | 12/1971 | Powers et al. | 29/281.1 X |
| 3,658,315 | 4/1972 | Boucherie | 269/20 |
| 3,968,558 | 7/1976 | Sekine et al. | 29/429 |
| 4,176,269 | 11/1979 | Merrick et al. | 219/60 A |
| 4,520,919 | 7/1982 | Keitaro | 198/648 |
| 4,553,309 | 11/1985 | Hess et al. | 29/450 |
| 4,557,371 | 12/1985 | Yonezawa | 198/803.01 |
| 4,627,158 | 12/1986 | Mitoh | 29/824 X |
| 4,641,819 | 2/1987 | Poland | 29/281.6 X |

FOREIGN PATENT DOCUMENTS

| | | |
|---|---|---|
| 115131 | 7/1984 | Japan . |
| 1169927 | 7/1985 | U.S.S.R. . |
| 1545851 | 5/1979 | United Kingdom . |

Primary Examiner—Timothy V. Eley
Assistant Examiner—Andrew E. Rawlins
Attorney, Agent, or Firm—Christel, Bean & Linihan

[57] ABSTRACT

A programmable or flexible fixture for holding a plurality of details comprising an assembly during assembly processes thereon comprising an elongated base supported in a predetermined position, a plurality of positioning units located at spaced locations along the base, each of the positioning units having a clamp adapted to engage the details, the positioning units being located to allow access to the details from two directions of movement of tools of assembly apparatus moving with respect to the workpiece during assembly processes thereon, a robot operatively associated with the positioning units for moving the positioning units relative to the base for accepting the various members of a family of details which all have the same configuration and differ by increments in size and for holding the details together as an assembly and holding the assembly in the proper detail location and assembly position for assembling, and an actuator for moving the clamp into and out of engagement with the details. A programmable or flexible assembly cell comprises at least one automatic assembly machine, each machine having operational parameters determined by the nature of the details to be assembled, at least one of the programmable or flexible fixtures for holding a plurality of details comprising an assembly, the fixture being capable of accepting a family of details, which all have the same configuration and differ by increments in size, the fixture having the plurality of movable positioning units at spaced locations along the fixture and each of the positioning units having the clamp adapted to engage the details, at least one robot for adjusting the fixture positioning units and for placing details and assemblies in the fixture and removing details and assemblies from the fixture, and a conveyor for transporting details to the cell and for transporting assemblies from the cell. A cell controller monitors information pertaining to the details and assemblies, monitors operation of the assembly machine and controls operation of the robot.

36 Claims, 18 Drawing Sheets

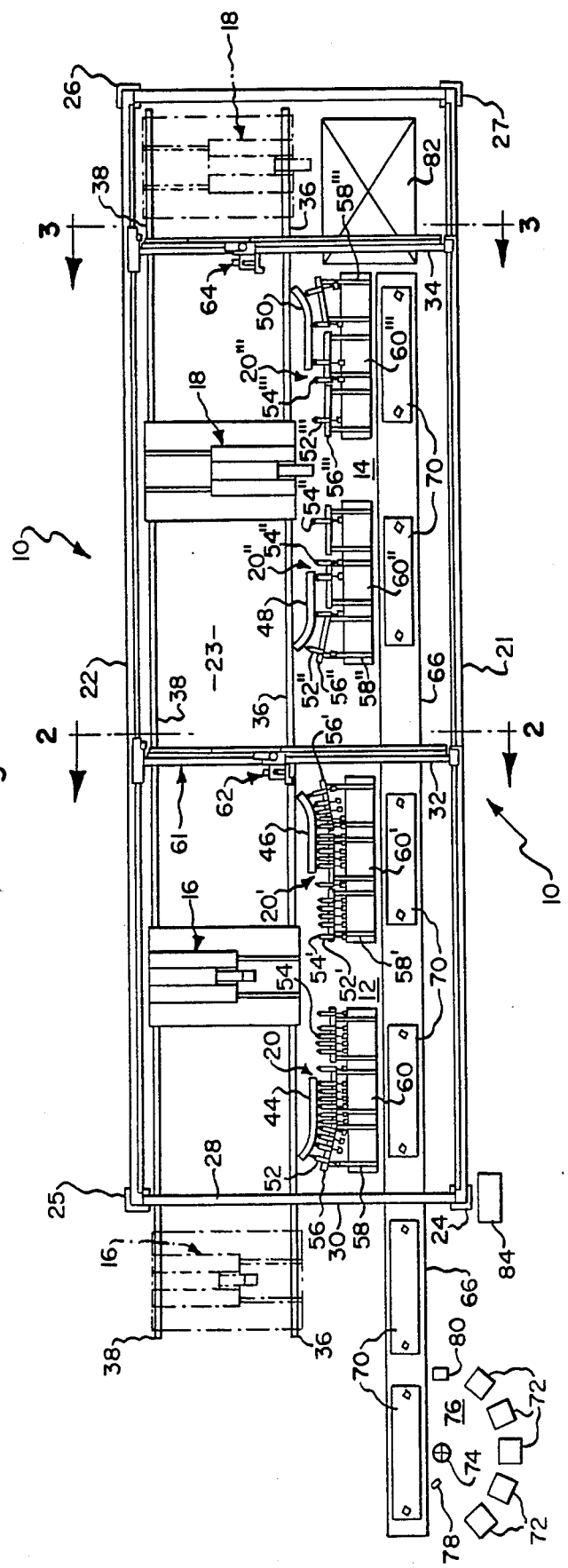
Fig. 1.
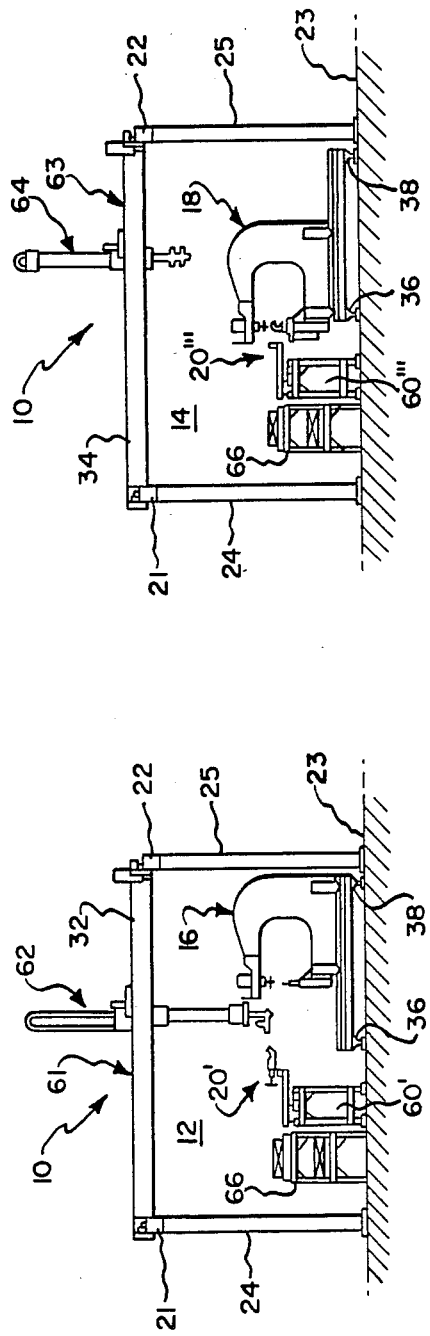
Fig. 2.
Fig. 3.

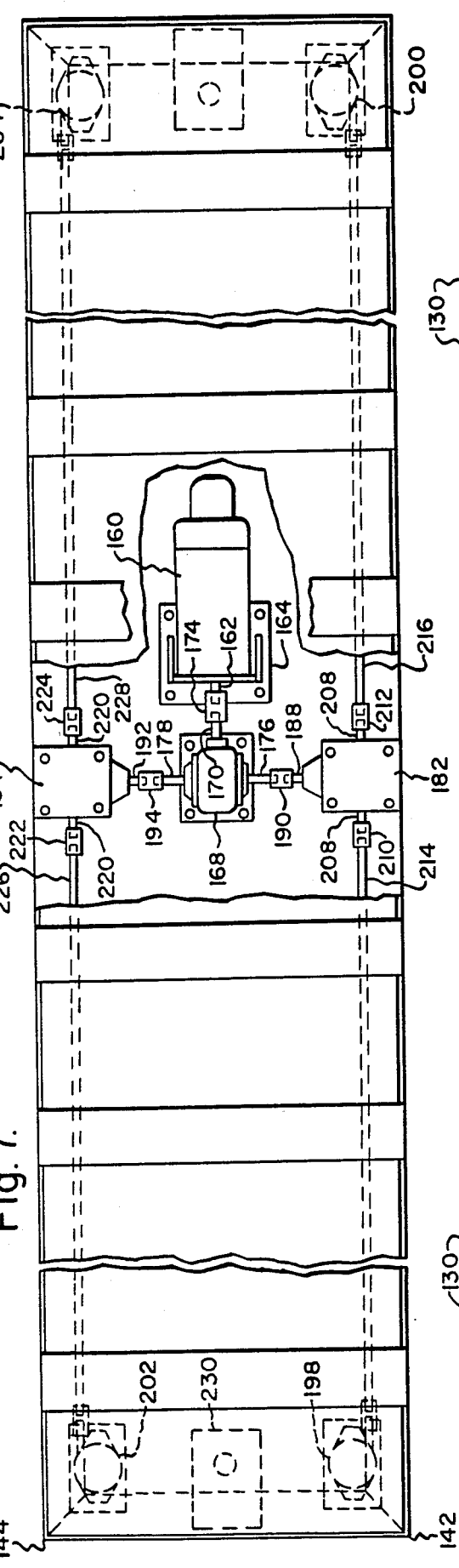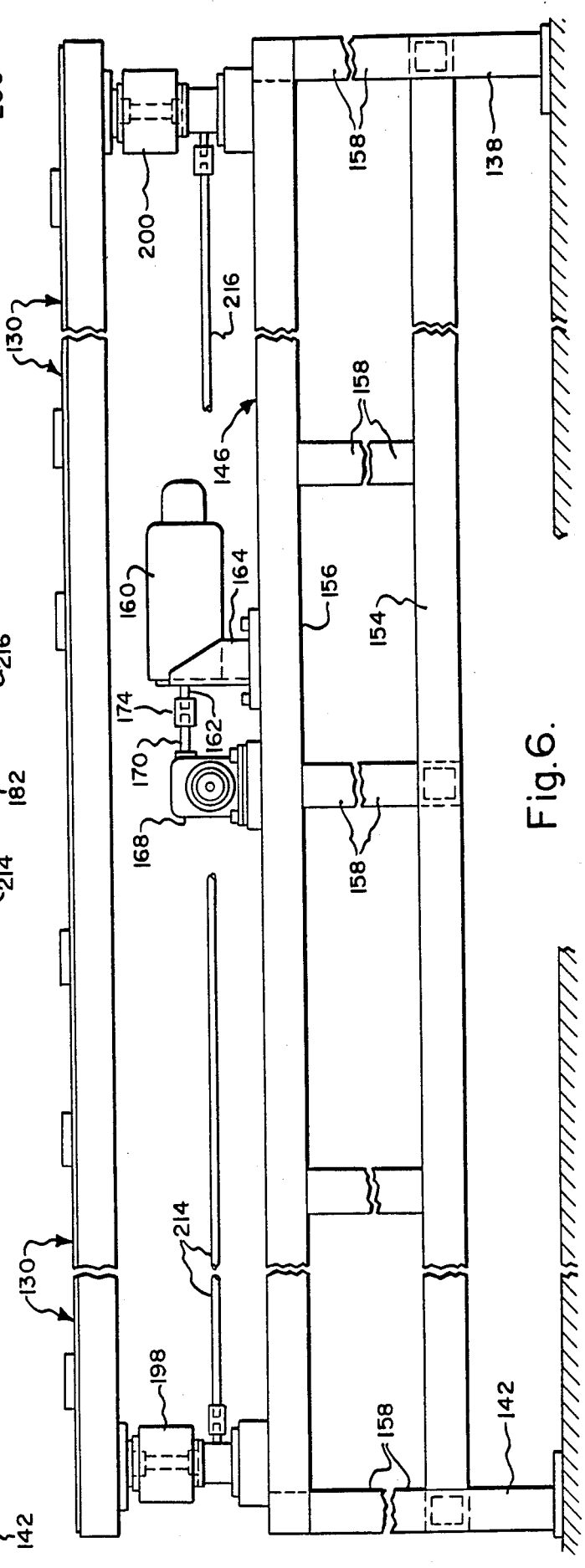

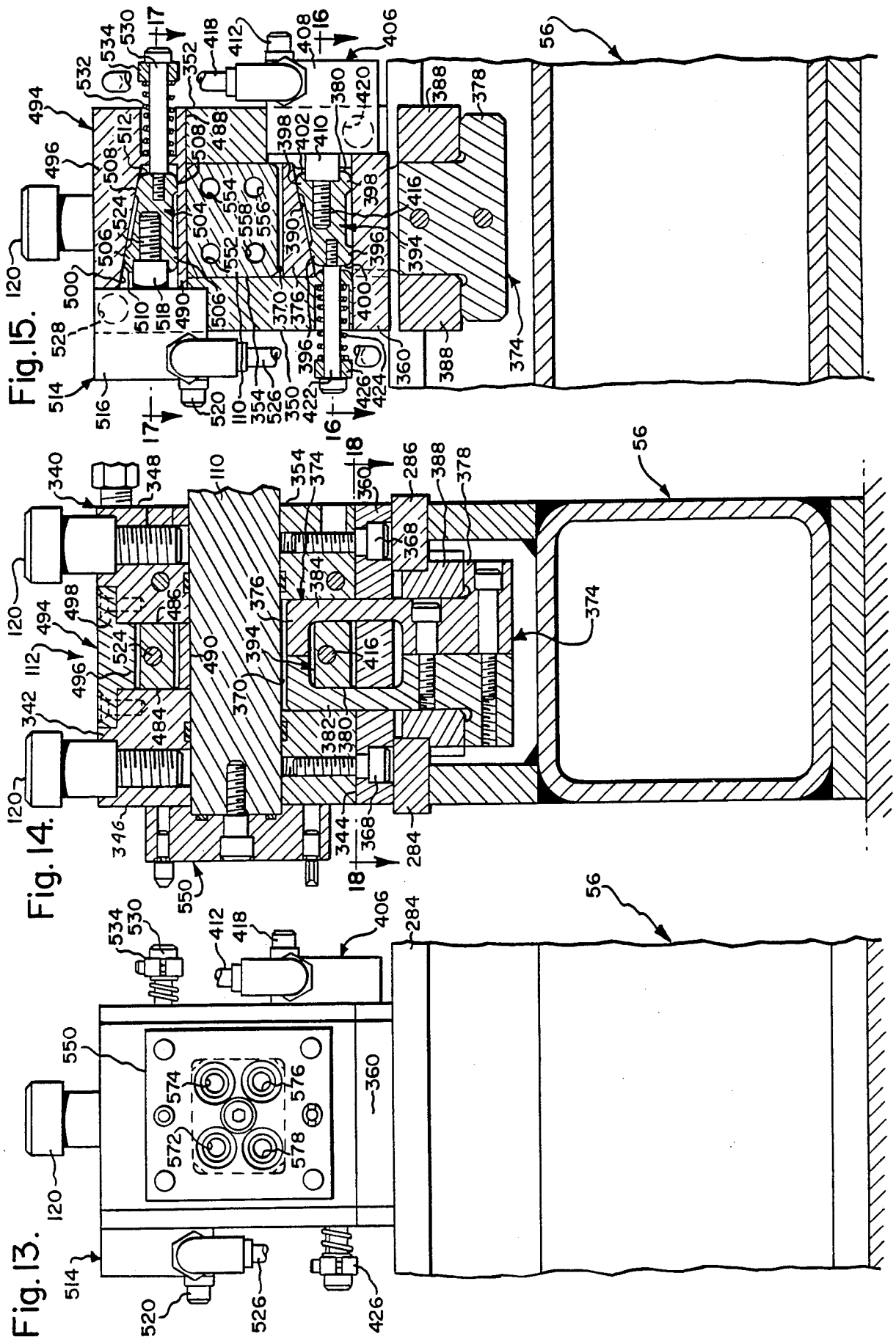

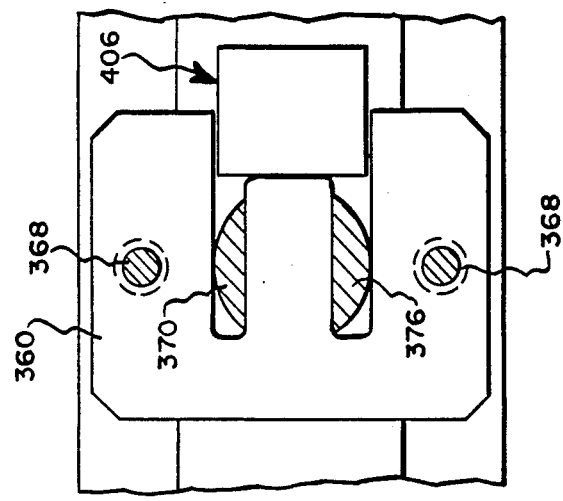
Fig. 18.
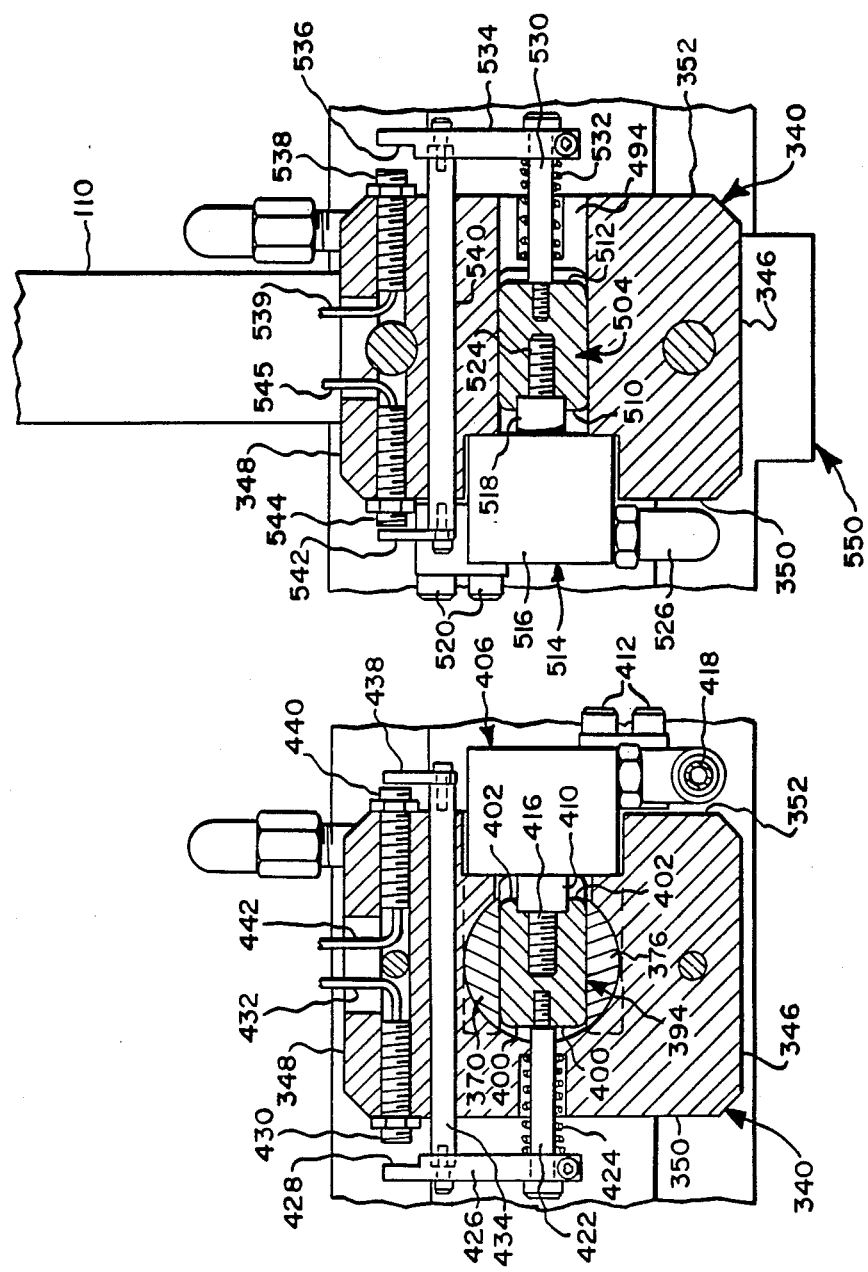
Fig. 17.
Fig. 16.

Fig. 35.
Fig. 37.
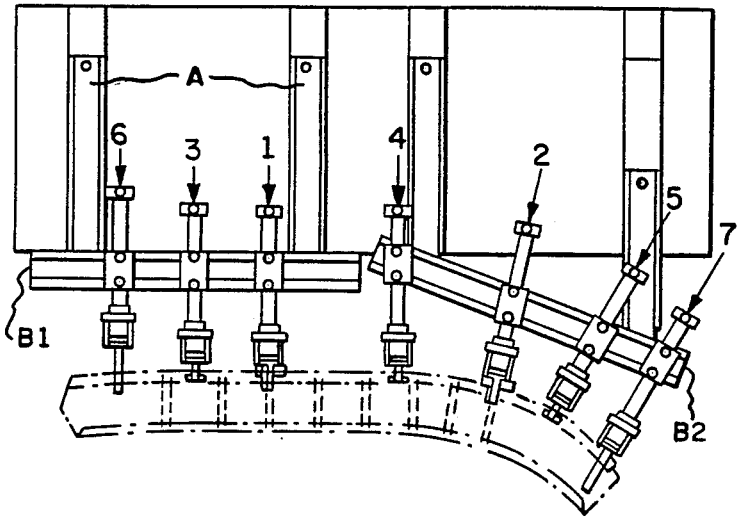
| SOLENOID | FUNCTION |
|---|---|
| 1HA | "X" CLAMP |
| 1HB | "X" UNCLAMP |
| 2HA | "Y" CLAMP |
| 2HB | "Y" UNCLAMP |
| 3HA | ANGLE GRIP |
| 3HB | ANGLE RELEASE |
| 4HA | ANGLE CLAMP |
| 4HB | ANGLE UNCLAMP |
| 5HA | BOTTOM TEE CLAMP |
| 5HB | BOTTOM TEE UNCLAMP |
| 6HA | TOP TEE CLAMP |
| 6HB | TOP TEE UNCLAMP |
| 7HA | BOTTOM WEB CLAMP |
| 7HB | BOTTOM WEB UNCLAMP |
| 8HA | TOP WEB CLAMP |
| 8HB | TOP WEB UNCLAMP |
| 9H | SYSTEM PRESSURIZE |
Fig. 36.
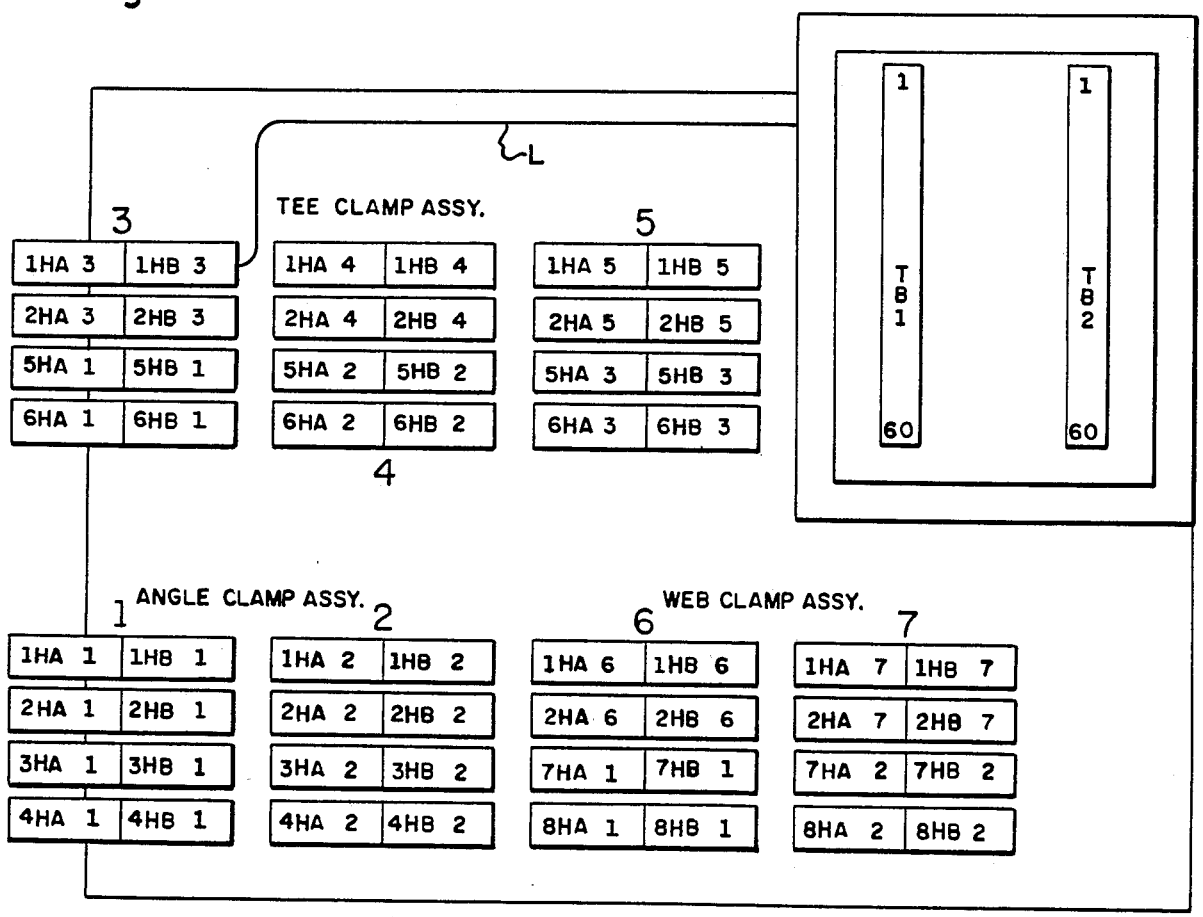

Fig. 38.

| Label | Terminal | Output No. | TB1 | Common |
|---|---|---|---|---|
| "X" CLAMP | 1HA3-1 | 1 | 1 | |
| | 1HA3-2 | | 2 | |
| "X" UNCLAMP | 1HB3-1 | 2 | 3 | |
| | 1HB3-2 | | 4 | |
| "Y" CLAMP | 2HA3-1 | 3 | 5 | |
| | 2HA3-2 | | 6 | |
| "Y" UNCLAMP | 2HB3-1 | 4 | 7 | |
| | 2HB3-2 | 3 — 5 | 8 | |
| BOTTOM "T" CLAMP | 5HA1-1 | | 9 | |
| | 5HA1-2 | 6 | 10 | |
| BOTTOM "T" UNCLAMP | 5HB1-1 | | 11 | |
| | 5HB1-2 | 7 | 12 | |
| TOP "T" CLAMP | 6HA1-1 | | 13 | |
| | 6HA1-2 | 8 | 14 | |
| TOP "T" UNCLAMP | 6HB1-1 | | 15 | |
| | 6HB1-2 | 9 | 16 | |
| "X" CLAMP | 1HA4-1 | | 17 | |
| | 1HA4-2 | 10 | 18 | |
| "X" UNCLAMP | 1HB4-1 | | 19 | |
| | 1HB4-2 | 11 | 20 | |
| "Y" CLAMP | 2HA4-1 | | 21 | |
| | 2HA4-2 | 12 | 22 | |
| "Y" UNLAMP | 2HB4-1 — 4 — 12 | | 23 | |
| | 2HB4-2 | 85 | 24 | |
| BOTTOM "T" CLAMP | 5HA2-1 | | 25 | |
| | 5HA2-2 | 86 | 26 | |
| BOTTOM "T" UNCLAMP | 5HB2-1 | | 27 | |
| | 5HB2-2 | 87 | 28 | |
| TOP "T" CLAMP | 6HA2-1 | | 29 | |
| | 6HA2-2 | 88 | 30 | |
| TOP "T" UNCLAMP | 6HB2-1 | | 31 | |
| | 6HB2-2 | 17 | 32 | |
| "X" CLAMP | 1HA5-1 | | 33 | |
| | 1HA5-2 | 18 | 34 | |
| "X" CLAMP | 1HB5-1 | | 35 | |
| | 1HB5-2 | 19 | 36 | |
| "Y" CLAMP | 2HA5-1 | | 37 | |
| | 2HA5-2 | 20 | 38 | |
| "Y" UNCLAMP | 2HB5-1 | | 39 | |
| | 2HB5-2 | 5 — 21 | 40 | |
| BOTTOM "T" CLAMP | 5HA3-1 | | 41 | |
| | 5HA3-2 | 22 | 42 | |
| BOTTOM "T" UNCLAMP | 5HB3-1 | | 43 | |
| | 5HB3-2 | 23 | 44 | |
| TOP "T" CLAMP | 6HA3-1 | | 45 | |
| | 6HA3-2 | 24 | 46 | |
| TOP "T" UNCLAMP | 6HB3-1 | | 47 | |
| | 6HB3-2 | 25 | 48 | |
| "X" CLAMP | 1HA1-1 | | 49 | |
| | 1HA1-2 | 26 | 50 | |
| "X" UNCLAMP | 1HB1-1 | | 51 | |
| | 1HB1-2 | 27 | 52 | |
| "Y" CLAMP | 2HA1-1 | | 53 | |
| | 2HA1-2 | 28 | 54 | |
| "Y" UNCLAMP | 2HB1-1 — 1 | | 55 | |
| | 2HB1-2 | 33 | 56 | |
| ⊿ CLAMP GRIP | 3HA1-1 | | 57 | |
| | 3HA1-2 | 34 | 58 | |
| ⊿ CLAMP RELEASE | 3HB1-1 | | 59 | |
| | 3HB1-2 | | 60 | |

Fig. 39.

| TB2 | OUTPUT NOS. | | |
|---|---|---|---|
| COMMON | | | |
| 1 | 35 | 4HA1-1 | ⊿ CLAMP UP |
| 2 | | 4HA1-2 | |
| 3 | 36 | 4HB1-1 | ⊿ CLAMP DOWN |
| 4 | 37 | 4HB1-2 | |
| 5 | | 1HA2-1 | "X" CLAMP |
| 6 | 38 | 1HA2-2 | |
| 7 | | 1HB2-1 | "X" UNCLAMP |
| 8 | 39 | 1HB2-2 | |
| 9 | | 2HA2-1 | "Y" CLAMP |
| 10 | 40 | 2HA2-2 | |
| 11 | | 2HB2-1 | "Y" UNCLAMP |
| 12 | 41 | 2-2HB2-2 | |
| 13 | | 3HA2-1 | ⊿ CLAMP GRIP |
| 14 | 42 | 3HA2-2 | |
| 15 | | 3HB2-1 | ⊿ CLAMP RELEASE |
| 16 | 43 | 3HB2-2 | |
| 17 | | 4HA2-1 | ⊿ CLAMP UP |
| 18 | 44 | 4HA2-2 | |
| 19 | | 4HB2-1 | ⊿ CLAMP DOWN |
| 20 | 45 | 4HB2-2 | |
| 21 | | 1HA6-1 | "X" CLAMP |
| 22 | 46 | 1HA6-2 | |
| 23 | | 1HB6-1 | "X" UNCLAMP |
| 24 | 47 | 1HB6-2 | |
| 25 | | 2HA6-1 | "Y" CLAMP |
| 26 | 48 | 2HA6-2 | |
| 27 | | 2HB6-1 | "Y" UNCLAMP |
| 28 | 49 | 6-2HB6-2 | |
| 29 | | 7HA1-1 | BOTTOM WEB CLAMP |
| 30 | 50 | 7HA1-2 | |
| 31 | | 7HB1-1 | BOTTOM WEB UNCLAMP |
| 32 | 51 | 7HB1-2 | |
| 33 | | 8HA1-1 | TOP WEB CLAMP |
| 34 | 52 | 8HA1-2 | |
| 35 | | 8HB1-1 | TOP WEB UNCLAMP |
| 36 | 53 | 8HB1-2 | |
| 37 | | 1HA7-1 | "X" CLAMP |
| 38 | 54 | 1HA7-2 | |
| 39 | | 1HB7-1 | "X" UNCLAMP |
| 40 | 55 | 1HB7-2 | |
| 41 | | 2HA7-1 | "Y" CLAMP |
| 42 | 56 | 2HA7-2 | |
| 43 | | 2HB7-1 | "Y" UNCLAMP |
| 44 | 57 | 7-2HB7-2 | |
| 45 | | 7HA2-1 | BOTTOM WEB CLAMP |
| 46 | 58 | 7HA2-2 | |
| 47 | | 7HB2-1 | BOTTOM WEB UNCLAMP |
| 48 | 59 | 7HB2-2 | |
| 49 | | 8HA2-1 | TOP WEB CLAMP |
| 50 | 60 | 8HA2-2 | |
| 51 | | 8HB2-1 | TOP WEB UNCLAMP |
| 52 | | 8HB2-2 | |
| 53 | | | |
| 54 | | | |
| 55 | | | |
| 56 | | | |
| 57 | | | |
| 58 | | | |
| 59 | | | SYSTEM PRESSURE |
| 60 | | | |

PROGRAMMABLE FIXTURE AND ASSEMBLY CELL

BACKGROUND OF THE INVENTION

This invention relates to the art of automatic assembly of parts, and more particularly to a new and improved automated assembly system and method utilizing a programmable or flexible fixture and assembly cell.

One area of use of the present invention is in the automated assembly and manufacture of air frame subassemblies, although the principles of the present invention can be variously applied. It would be highly desirable to provide an automated manufacturing assembly cell for processing multi-dimensional and multi-configuration subassemblies utilizing computer controlled automatic fastening systems. It would be an advanced technology, automated material accountability and manufacturing assembly cell with the ability to process multi-configured and dimensional assemblies, using automatic fastening systems and a flexible or programmable holding fixture. Advantages would include the proven benefits of computer aided manufacturing along with flexible fastening and welding initiated through robotic processing using CAD/CAM data bases for repeatable close tolerance subassembly production including high quality drilling, fastening, sealant application, accurate dimensional repeatability of interfacing surfaces and maximum manufacturing-production flexibility for scheduling and lot sizing.

In manufacture of airframe subassemblies, part families under consideration include assemblies such as wing ribs, leading and trailing edge ribs on the wings and on the horizontal and vertical stabilizers, horizontal and vertical stabilizer ribs, body panels, fuselage frames, floor beams and miscellaneous subassemblies. The definition of a family would be any configuration of assemblies which remain relatively the same, one to the other, with variations in length, width and/or height. The assemblies would be similar in profile. A good example of the foregoing would be a wing rib. The wing rib at the root of the wing and the tip of the wing are basically the same configuration, an airfoil. They vary only in length, width and height, when compared to one another. These assemblies would then be considered an entire family.

In manufacture of assemblies including a family of parts, use of conventional static fixtures requiring a separate fixture for each assembly can be burdensome. For example, a typical number of different leading edge ribs on a tapered wing could be two hundred fifty per shipset, each requiring a separate static fixture. This, in turn, requires extensive space for storage, retrieval and movement of fixtures in addition to the cost arising from large numbers of fixtures. Accordingly, it would be highly desirable to provide a flexible or programmable fixture for use in assembling and fastening a family of parts. Such flexible fixture could eliminate the need and non-recurring cost of separate fixtures for each assembly, reduce the cost associated with fixture modification necessitated by assembly design changes, reduce the lead time to process new assemblies into production or introduce changes and reduce the level of skilled labor required to refer to drawings to set up parts in the fixtures and perform high-quality fastening.

SUMMARY OF THE INVENTION

It is, therefore, a primary object of this invention to provide a new and improved flexible fixture for use in assembling and fastening a family of parts.

It is a further object of this invention to provide such a fixture which eliminates the need and non-recurring cost of separate fixtures for each assembly and reduces the cost associated with fixture modification necessitated by part design changes.

It is a further object of this invention to provide such a fixture which accepts a wide range of sizes in a family of parts and allows access to the parts therein from the required number of directions during automatic installation of fasteners.

It is a further object of this invention to provide such a fixture which is relatively economical to manufacture and effective and efficient in operation.

It is a further object of this invention to provide such a fixture in association with an automatic fastening machine thereby providing a fastener assembly cell.

It is a further object of this invention to provide such a fixture for use in an automated manufacturing and assembling system and method.

The present invention provides a programmable or flexible fixture for holding a plurality of details comprising an assembly during assembly processes thereon comprising an elongated base, means for supporting the base in a predetermined position, a plurality of positioning means located at spaced locations along the base, each of the positioning means having holding means adapted to engage the details, the positioning means being located to allow access to the details from two directions of movement of tools of assembly apparatus moving with respect to the workpiece during assembly processes thereon, means operatively associated with the positioning means for moving the positioning means relative to the base for accepting the various members of a family of details which all have the same configuration and differ by increments in size and for holding the details together as an assembly and holding the assembly in the proper detail location and assembly position for assembling, and means for moving the holding means into and out of engagement with the details. The positioning means are movably mounted on the base for movement in first and second substantially orthogonal directions in a plane substantially parallel to the plane of the assembly and for pivotal movement about an axis substantially perpendicular to the plane, and the base supporting means includes means for moving the base in a direction substantially perpendicular to the plane of the workpiece. The means for moving the positioning means comprises robotic means operatively associated with the fixture, and there is provided control means operatively connected to the robotic means and to the means for moving the holding means into and out of engagement with the details.

There is also provided a programmable or flexible assembly cell comprising at least one automatic assembly machine, each machine having operational parameters determined by the nature of the details to be assembled, at least one flexible fixture for holding a plurality of details comprising an assembly, the fixture being capable of accepting a family of details, which all have the same configuration and differ by increments in size, the fixture having a plurality of movable positioning means at spaced locations along the fixture and each of the positioning means having holding means adapted to engage the details, controlled means for adjusting the fixture positioning means and for placing details and assemblies in the fixture and removing details and assemblies from the fixture, and means for transporting details to the cell and for transporting assemblies from the cell. The controlled means for adjusting the fixture and placing and removing details comprises robotic means, and there is also provided cell controller means for monitoring information pertaining to the details and assemblies, for monitoring operation of the assembly machine and for controlling operation of the robotic means.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a plan view of a programmable or flexible assembly cell according to the present invention containing a plurality of programmable or flexible fixtures according to the present invention;

FIG. 2 is an end elevational view taken about on line 2—2 of FIG. 1;

FIG. 3 is an end elevational view taken about on line 3—3 in FIG. 1;

FIG. 6 is an enlarged side elevational view with parts removed of the mounting table of the fixture of FIGS. 4 and 5;

FIG. 7 is a top plan view with parts removed of the mounting table of FIG. 6;

FIG. 13 is an end elevational view thereof taken from the left-hand end in FIG. 10;

FIG. 14 is a longitudinal cross-sectional view of the positioning means of FIG. 10;

FIG. 15 is a transverse cross-sectional view of the positioning means of FIG. 10;

FIG. 16 is a sectional view taken about on line 16—16 in FIG. 15;

FIG. 17 is a sectional view taken about on line 17—17 in FIG. 15;

FIG. 18 is a sectional view taken about on line 18—18 in FIG. 14;

FIG. 35 is a diagrammatic view of a programmable or flexible fixture according to the present invention constructed for test purposes;

FIG. 36 is a diagrammatic view of an arrangement of solenoids for operating valves in the test fixture of FIG. 35;

FIG. 37 is a table describing the functions controlled by the solenoids and associated valves of FIG. 36; and FIG. 38 and 39 are diagrammatic views illustrating the arrangement of terminal blocks and connections of the control for the solenoids and valves of FIG. 36.

DETAILED DESCRIPTION OF THE ILLUSTRATED EMBODIMENT

Figure 5:
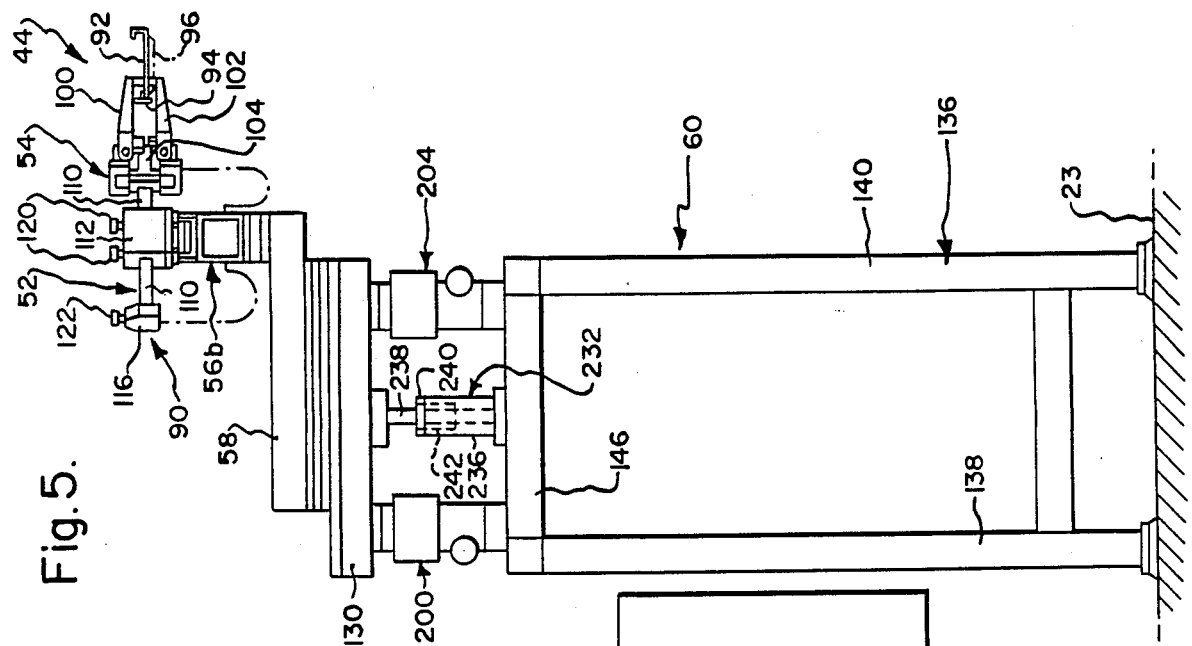
FIG. 5 is an end elevational view of the fixture of FIG. 4 and taken from the right hand end thereof.

The present invention is directed to a programmable or flexible assembly cell, a programmable or flexible fixture and automatic assembly methods utilizing the cell and fixtures, all for the assembly of a family of parts. The term family of parts in connection with the present invention is intended to include a series of parts or details having the same overall configuration, but which differ by small increment in length, width, and height from part to part or member to member in the family. In an assembly operation, a number of factors are involved in determination of families. Those factors include assembly envelope size, assembly configuration, total number of details per assembly, individual detail configuration, individual detail size, relationships between details, assembly sequence, and assembly staging.

The programmable or flexible assembly cell of the present invention is programmed to assemble a family or families of parts, and as such the tooling, fixturing, material handling systems etc. would be geared to those particular assemblies. The flexible or programmable fixture of the present invention requires only one set of tooling clamps, retention member and holding clamps to position details for assembly thereby reducing the high cost of fixturing heretofore encountered due to requirements of separate fixtures for each assembly. The system of the present invention reduces or eliminates extensive floor space necessary to provide storage for fixtures and for material process flow. This includes the reduction or elimination of the material handling systems and personnel necessary for the storage and retrieval of dedicated assembly fixtures. In the system of the present invention, the flexible or programmable fixtures are dedicated to the assembly cell and its confines.

The programmable or flexible assembly cell of the present invention allows reduction or elimination of the moderately high-skilled labor force normally required to refer to assembly drawings or to set up details in the fixtures for performance of high-quality fastening. Furthermore, the cell of the present invention reduces the high cost of making detail and assembly design changes. One can re-enter a particular configuration within the cell, remove an erroneous detail, and reinstall the proper detail, thereby providing complete flexbility to be a able to rework existing fabricated assemblies. The system of the present invention also reduces the long lead time necessary to process new assemblies into production or to introduce changes. This is accomplished directly through a CAD/CAM interface through a cell controller and local area network. The assembly cell of the present invention also reduces the high cost of material handling. Manual operations are used extensively to transfer materials between assembly operations, i.e. raw material to stores, then to fabrication, then to quality checking points, back to stores again, over to material treating and painting, returned back to stores, from stores to the assembly point, and finally over to the final paint and/or next assembly station. The cell also reduces the high cost of assembly setups. Manual operations are used extensively in setting up details and clamping them in the fixtures, drilling holes, disassembly, deburring, bonding application, tack assembly, sealant application, riveting, welding and quality checking.

Referring now to the drawings, FIGS. 1-3 show a programmable or flexible assembly cell according to the present invention including at least one automatic assembly machine and at least one programmable or flexible fixture according to the present invention. In the present illustration the cell, generally designated 10, includes two work stations 12 and 14 each including an automatic assembly machine 16 and 18, respectively. The two machines have different operational parameters determined by the nature of the details to be assembled. In the present illustration, the two machines comprise automatic fastening machines, in particular automatic drilling and riveting machines, for installing fasteners in details held in the fixture in the cell, which machines differ in degrees of freedom of movement of the upper and lower heads thereof. The cell of the present invention includes four programmable or flexible fixtures 20, 20',20", and 20'" two in each of the work stations 12 and 14. It is to be understood that the system of FIGS. 1-3 is by way of illustration, and that the number of fixtures, number of workstations and number and type of machines can vary depending upon the type of fastening operations being performed.

The work stations 12 and 14 of cell 10 are enclosed by a gantry framework including a pair of spaced apart parallel longitudinally extending overhead frame or track members 21, 22 supported on a floor 23 or similar supporting surface of the cell by posts 24, 25, 26 and 27. Track members 21, 22 are joined by spaced apart parallel laterally extending end members 28, 29. Member 28 and the included sections of track members 21, 22 extending to about the midpoint thereof outline station 12, and member 29 and the remaining included sections of members 21, 22 outline station 14. Machines 16, 18 are movably supported on a pair of tracks or rails 36, 38 extending along floor 23 within cell 10 parallel to frame members 21, 22 and through both stations 12, 14. At each end the rails 36, 38 extend a distance out from the respective stations 12, 14 to provide parking locations for the respective machines 16, 18 which are represented in broken lines in FIG. 1 at the parking locations.

Each programmable or flexible fixture is for holding a plurality of details comprising an assembly, for example the assemblies 44, 46, 48 and 50 held by fixtures 20, 20',20" and 20'", respectively. Each fixture is capable of accepting a family of parts which all have the same basic configuration and differ by increments in size. As will be described in further detail presently, each fixture comprises a plurality of movable positioning means 52 at spaced locations along the fixture and each positioning means has holding means 54 adapted to engage the details. The positioning means 52 are movably mounted on an elongated fixture base 56 supported by arms 58 extending from a fixture mounting table 60 which rests on the cell floor 23 all of which will be described in detail presently.

The cell 10 further comprises controlled means for adjusting the fixture positioning means and for placing details and assemblies in each fixture and removing details and assemblies from each fixture. In particular, the controlled means comprises robotic means, and in the present illustration there are two overhead gantry robots 61, 62 and 63, 64 associated with the cell stations 12 and 14, respectively. Each gantry robot 61, 62 and 63, 64 has motive means whereby it moves in orthogonal directions along the plane of the paper as viewed in FIG. 1 and in a third direction perpendicular to the plane of the paper as viewed in FIG. 1. In particular, bridge beams 61 and 63 each move in opposite directions along tracks 21, 22 by suitable means such as ball screw or rack and pinion arrangements. Each robot structure 62 and 64 is movable in opposite directions along beams 61 and 63, respectively, by suitable means such as ball screw or rack and pinion arrangements. This enables it to move to and from the fixtures. Each robot structure 62, 64 also has manipulative means carried thereby and having three degrees of freedom of movement as will be described in detail presently. This enables it to place and remove details and assemblies into and out of fixtures 20. By way of example in an illustrative system, each robot 61, 62 and 63, 64 is a gantry robot originally commercially available from GCA Corporation, now from Cimcorp Inc., under the designation XR6050M. The number of robots per workstation and per assembly cell can change depending upon the nature of the assembly operations.

The cell further comprises means in the form of conveyor 66 for transporting details to the cell 10 and for transporting assemblies from the cell 10. Conveyor 66 extends along within cell 10 parallel to frame members 21, 22 and is located near frame member 21, 24, 27 in the arrangement shown. Conveyor 66 is adapted to carry transport means 70 in the form of kitting trays for holding parts in fixed and defined locations therein, in a manner which will be described, prior to the details being handled by robots 61, 62, 63, 64, the trays 70 being capable of accommodating all members of a family of assemblies. Each tray 70 is loaded with details from containers 72 by a human operator designated 74 at a loading area 76. The operator is assisted by barcode reader means 78 and a video monitor 80. At the other end of conveyor 66 is an unloading zone 82 for receiving finished assemblies. The cell 10 further comprises cell controller means 84 for monitoring information pertaining to details and assemblies and for monitoring operation of the machines 16, 18 and robots 61, 62 and 63, 64 all in a manner which will be described.

Figure 31:
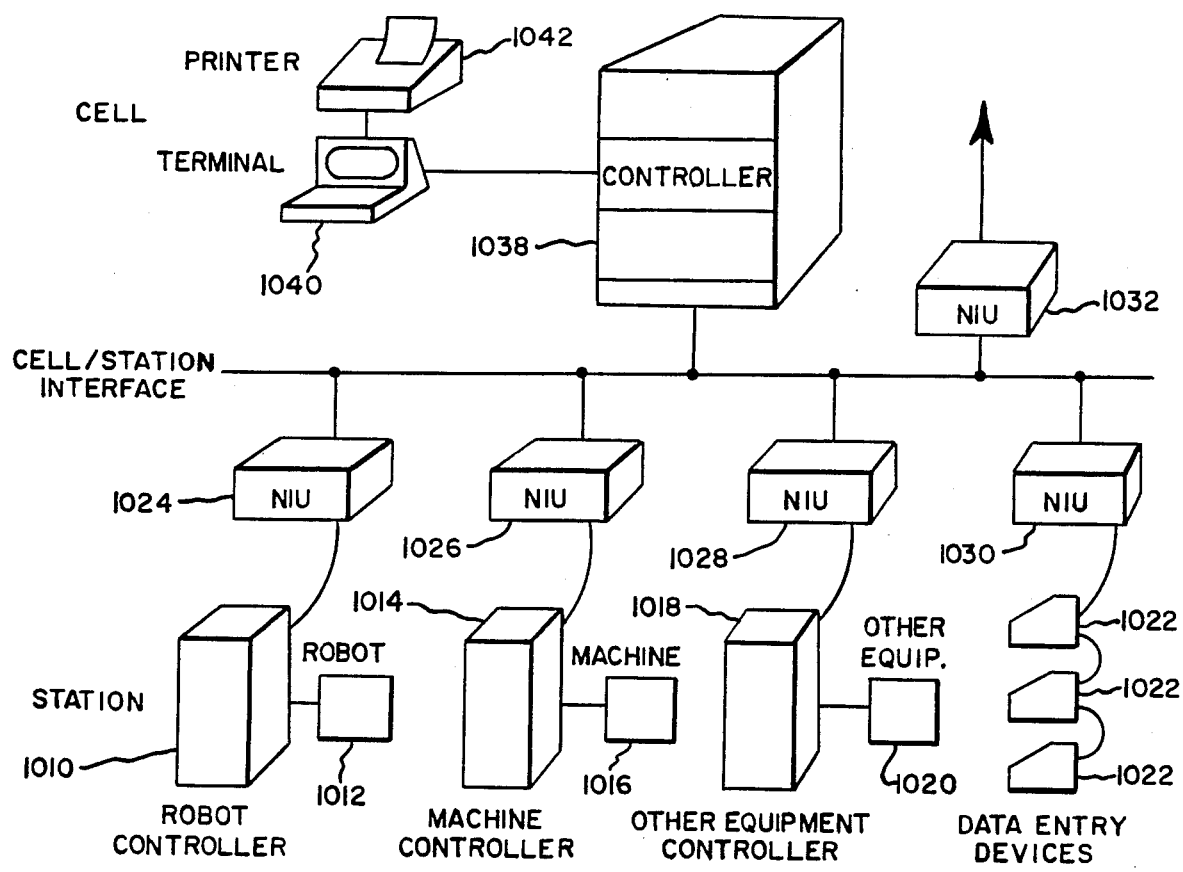
FIG. 31 is a block diagram of the control system for the programmable or flexible assembly cell of the present invention.

FIG. 31 is a block diagram illustrating the control system for the programmable or flexible assembly cell of the present invention of the type illustrated in FIGS. 1-3. The system includes a plurality of device controllers, for example a controller 1010 for each robot, one represented at 1012, a controller 1014 for each fastening machine, one represented 1016, and a controller 1018 for other equipment represented 1020, i.e. co-ordinate measuring machines for automatic quality assurance. At this level of the system there are also a plurality of data entry devices, i.e. CAD/CAM units each designated 1022. The controllers, in turn, are connected to corresponding network interface units including unit 1024 connected to controller 1010, unit 1026 connected to controller 1014, and unit 1028 connected to controller 1018. There is also an interface unit 1030 for data entry devices 1022, i.e. CAD/CAM units. The network interface units are microcomputer-based devices which translate and process all data. One unit can send messages to another unit without going through controllers thereby improving data reliability and increasing response time. Additional units can be included, for example unit 1032, for interfacing other equipment to the system, for example a factory host computer. The system also includes a central or cell controller 1038 to which all network interface units are connected and is the controller 84 in FIGS. 1-3. Input-output equipment such as terminal 1040 and printer 1042 is connected to controller 1038.

Controller 1038 is the monitor central communicator and cell function optimizer for the entire system. During initial loading of the details, which can be manual or automatic, a bar code is read and this operation immediately triggers controller 1038 to download the proper assembly and positioning programs to the robots and riveting machines. Controller 1038 has five major functions, and a first is equipment monitoring which allows controller 1038 to track and record the current status of all equipment within the assembly cell and display it on request to an operator at a central station which can be either near to or remote from the cell thereby extending capability to monitor several pieces of equipment and take corrective action whenever needed. For example, individual equipment can be moved on and off line via means command issued by controller 1038. A second function is fault monitoring wherein controller 1038 detects and records error conditions, classifies them according to user-defined severity levels, response to errors by shutting down malfunctioning equipment, and reroutes work in process.

A third function is program management wherein controller 1038 stores, uploads and downloads programs for programmable equipment within the assembly cell, thereby eliminating the need for additional program storage at the station controller. Programs are uploaded or downloaded automatically by controller 1038 or on command of the operator. Moreover, when the stored program format is textual, i.e. ASCII, programs can be retrieved from the library of controller 1038, edited and returned to storage. This permits the operator to make an emergency or try-out change on a part program through controller 1038. This allows changes to a part that has already been assembled, make a quick emergency changeover in the program itself, load an alternative program in, remove a defective part or remove a part that was installed on a prior design and install a new part, all without going through a complete reprogramming.

A fourth function is production control including tracking work in process and assigning work stations to maximize production. For every operation within a manufacturing process there will be programs to be downloaded to one or more of the device controllers 1010, 1014 and 1018. Controller 1038 co-ordinates these program downloads with the corresponding programmable device controller. A network including the interface units 1024, 1026, 1028 and 1030 provides an interlink between controller 1038 and the device controllers. The results of one production step typically dictate what the next step will be. Controller 1038 continually tracks the progress of each manufacturing step, recording production history data for later evaluation of overall cycle times, manufacturing problems and bottlenecks. Controller 1038 also maintains and evaluates completed product test results and tracks the number of rejected as compared to acceptable parts produced in the assembly cell. There is provided a complete record of number of parts run, problems with the machines, errors with assemblies, errors with incoming parts, and a total log is kept with everything tracked in real time.

A fifth function is resource management wherein controller 1038 tracks the availability of resources needed for the manufacturing process such as pallets, fixtures, tools and raw materials. The availability of resources for any given production step is checked before controller 1038 initiates that step. For any assembly cells where the resource is not available, controller 1038 requests an auxiliary system to supply the needed resource. In other words, if an assembly plan calls for the manufacturing of 15 sets of assemblies within a given time frame, controller 1038 goes through the inventory and checks that all details are available for all individual assemblies to meet the production schedule. If any are unavailable, controller 1038 keys that information back to the operator to provide a method of knowing which details are available and which are short. As the manufacturing sequence progresses, controller 1038 monitors when the resources are no longer needed and shares this information with that obtained by the production control function to maximize use of the assembly cell by increasing parallel producing routing.

By way of example, in an illustrative system, controller 1038 is a CIMCELL controller originally commercially available from GCA Corporation, now from Cimcorp Inc. Each network interface unit 1024, 1026, 1028, 1030 and 1032 is a unit originally commercially available from CGA Corporation, now from Cimcorp Inc., under the designation CIMNET. Controller 1010 is a CIMROC 2 robot controller originally commercially available from GCA Corporation, now from Cimcorp Inc.

Figure 4:
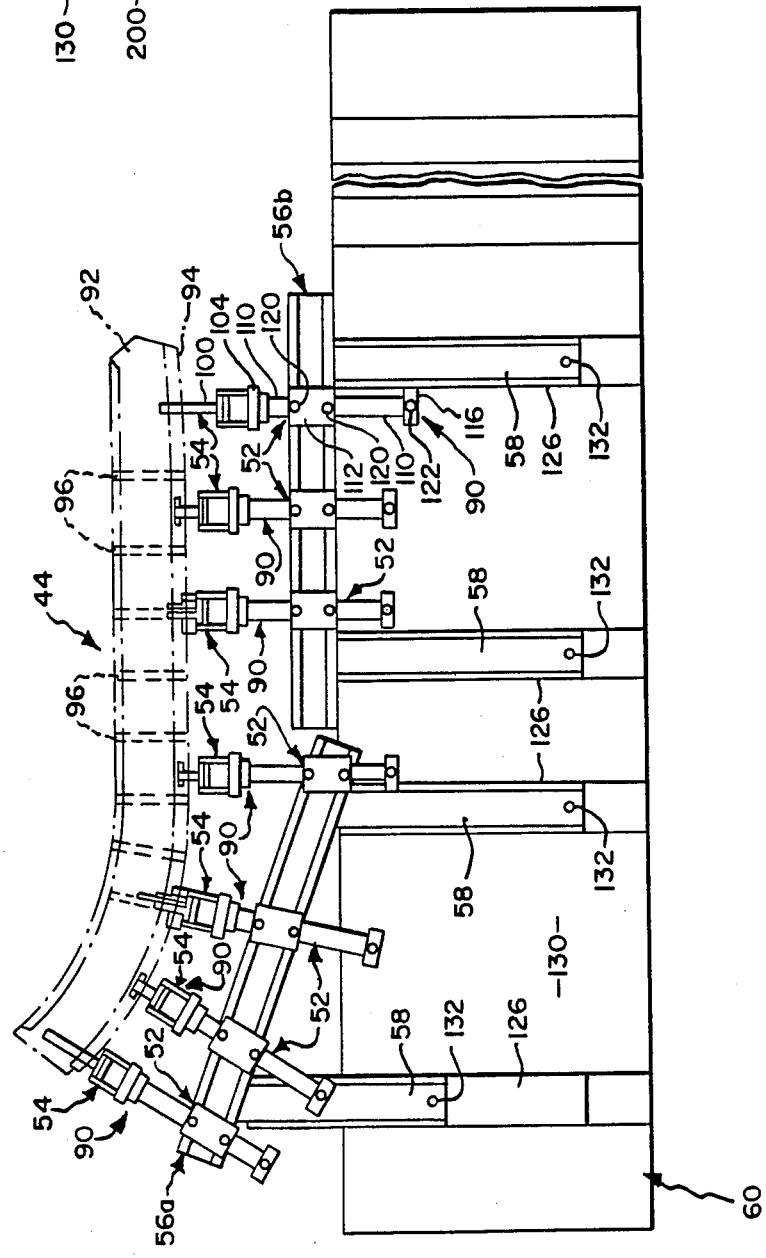
FIG. 4 is an enlarged plan view of the flexible or programmable fixture according to the present invention.

FIGS. 4 and 5 illustrate in further detail one of the programmable or flexible fixtures in the arrangement of FIGS. 1-3, for example fixture 20. For convenience in illustration, fixture 20 is illustrated in FIGS. 4 and 5 with a smaller number of clamp assembly and positioning units each generally designated 90 in therein. In the present example, assembly 44 held by fixture 20 comprises three details: a web 92, a tee member 94 extending along one edge of web 92 and a series of angle or reinforcement members 96 at spaced locations along web 92. The assembly 44 is held by twelve clamp assembly and positioning units, six associated with a first fixture base section 56a and six associated with a second fixture base section 56b. For convenience in illustration, only seven units are shown in FIG. 4, four on base section 56a and three on base section 56b. The number of clamp assembly and positioning units and fixture base sections can vary depending upon the configuration and size of the family of assemblies and the nature of the assembly operation. As shown in FIG. 5, the clamp assembly 54 of each unit 90 includes a pair of jaws 100, 102 for holding details of the assembly together during the assembly operation. In the form of clamp illustrated in FIG. 5, the jaws 100, 102 move along a plane perpendicular to the plane of assembly 44, i.e. perpendicular to the plane of web 92, and typically the jaws 100, 102 move toward and away from each other during clamping and unclamping. Other arrangements of jaws can be provided, depending upon the nature of the assembly and details for example two side-by-side jaws which move in unison toward and away from the detail to grasp members 96 therebetween. These are shown generally in FIG. 4 and will be described in detail presently. The clamp having jaws 100, 102 is a web clamp. The clamp immediately adjacent to the left in FIG. 4 is a tee clamp, and the next immediately adjacent clamp further to the left is an angle clamp. Each clamp assembly 54 also includes a jaw operating mechanism 104 which will be described in detail presently.

The positioning component 52 of each unit 90 comprises an elongated body or traverse bar 110 as shown in FIG. 5, which is supported between its ends by fixture clamp positioning unit 112 on fixture base 56 and which has the clamp assembly 54 connected to one end thereof. Traverse bar 110 is movably received in the fixture clamp positioning unit assembly 112 which, in turn, is movably supported on fixture base 56. Fixture clamp positioning unit 112 allows longitudinal movement of traverse bar 110 and clamps a traverse bar 110 at selected or adjusted longitudinal positions and the operative relationship between fixture clamp positioning unit 112 and fixture base 56 including a track defined along base 56 allows movement of traverse bar 110 along base 56 and about an axis perpendicular to base 56 all of which will be described in detail presently. The end of traverse bar 110 opposite clamp assembly 54 terminates in a manifold block 116 for a purpose to be described. A first formation comprising a pair of shouldered screws or knobs 120 is provided on fixture clamp positioning unit assembly 112 for manipulative grasping by robotic means to move and pivot the unit 90 relative to base 56 in a manner which will be described. Similarly, a second formation comprising a single shouldered screw or knob 122 is provided on manifold block 116 for manipulative grasping by the same robotic means to move the bar 110 longitudinally in a manner which will be described.

Each fixture base section is fixed to a pair of support arms 58 extending from the fixture mounting table 60. Typically, support arms 58 extend generally parallel to the floor or supporting surface 23 of the assembly cell. Support arms 58 are slidably received in guideways or dovetail slides 126 on the top 130 of table 60, and support arms 58 also are movably connected to fixture base 56. Thus, movement of fixture base 56 is between the two positions illustrated in FIG. 4, parallel to the side of tables 60 or at an angle thereto. Each support arm 58 is provided with a formation comprising a shouldered screw or knob 132 for grasping to effect movement along the slide 126.

Table 60 includes a base 136 including four legs at the connecting or supporting framework and top or platform 146. The tabletop 130 is raised or lowered relative to base 136 in a precisely controlled manner by an arrangement of four machine screw actuators, one at each corner, two of which are designated 200, 204 in FIG. 5, and which are driven by an arrangement of a motor, speed reducer, gear drives, flexible couplings and shafts located between platform 146 and top 130 which will be described. Thus, controlled raising and lowering of the tabletop 130 provides adjustable positioning of the units 90 in a direction generally perpendicular to the longitudinal axis of units 90 and generally perpendicular to the plane of the assembly.

In particular, and as shown in FIG. 6 and 7, the table base 136 includes four legs, the two legs 138, 140 shown in FIG. 5 and two additional legs 142, 144 at the opposite end of table 60. These are joined by horizontal frame members 154 and 156 shown in FIGS. 5 and 6. The base also includes a plurality of vertical frame members 158. The arrangement for raising and lowering tabletop 130 relative to base 136 includes a motor 160 having an output shaft 162 supported on platform 146 by a support bracket 164. Motor 160 is oriented with the axis of shaft 162 disposed parallel to the longitudinal axis of the elongated rectangular table 60. The arrangement also includes a speed reducer 168 mounted on platform 146 and having an input shaft 170 connected to motor output shaft 162 by a coupling 174 and having a pair of output shafts 176, 178 at right angles to input shaft 170. The arrangement also includes a pair of right angle gear drives 182, 184 mounted on platform 146 and operated by speed reducer 168. In particular, drive 182 has an input shaft 188 connected by a flexible coupling 190 to output shaft 176 of speed reducer 168, and drive 184 has an input shaft 192 connected by a coupling 194 to output shaft 178 of speed reducer 168. The arrangement also includes four machine screw actuators 198, 200, 202 and 204 located one near each of the four corners of table 60 and between platform 146 and top 130. Actuators 198, 200 are driven by gear drive 182 and actuators 202, 204 are driven by gear drive 184. In particular, gear drive 182 has an output shaft 208 having opposite ends connected by flexible couplings 210 and 212 to shafts 214 and 216, respectively, which in turn are connected to the inputs of actuators 198 and 200. Similarly, gear drive 184 has an output shaft 220 having opposite ends connected by flexible couplings 222 and 224 to shafts 226 and 228, respectively, which in turn are connected to the inputs of actuators 202 and 204. There is also provided a pair of guide mechanisms 230 and 232 one at each end of table 60 and between the corresponding machine screw actuators. Each guide member, for example guide 232 shown in FIG. 5, includes a guide housing 236 mounted on platform 146, a guide post 238 mounted on top 130 depending therefrom and sliably received in housing 236, the housing having a retaining plate 240 and an internal bushing 242. Thus, operation of motor 160 in one direction through speed reducer 168 and drive 184 raises top 130 relative to platform 146, and operation of motor 160 in the opposite direction lowers top 130, both raising and lowering being in very small and controlled increments of travel.

By way of example, in an illustrative arrangement, motor 160 is commercially available from Inland Motor Industrial Division of Kollmorgen Corporation under #TT-B-2922, speed reducer 168 is commercially available from Winsmith Division of UMC Industries, Inc. under #2-CT, each right angle gear drive 182, 184 is commercially available from Boston Gear under #R131-8, each flexible coupling 210, 212, 222 and 224 is commercially available from Lovejoy Flexible Coupling Company under #L-070 and each machine screw actuator 198, 200, 202 and 203 is commercially available from Duff Norton Company under Model #2501 rated one ton.

Figure 8:
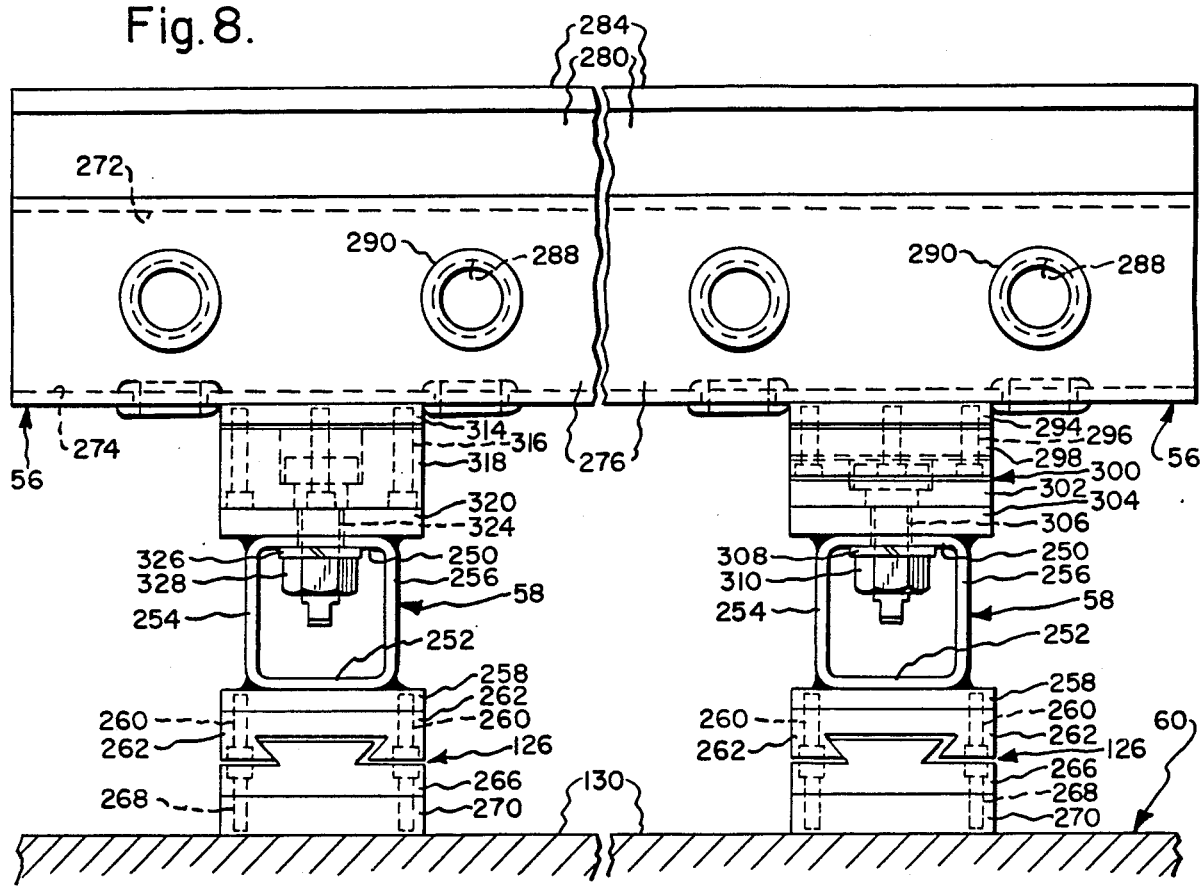
FIG. 8 is a side elevational view with parts removed of the arrangement of fixture base, support arms, movable connection therebetween and movable mounting of the support arms on the top of the fixture mounting table of FIGS. 6 and 7.
Figure 9:
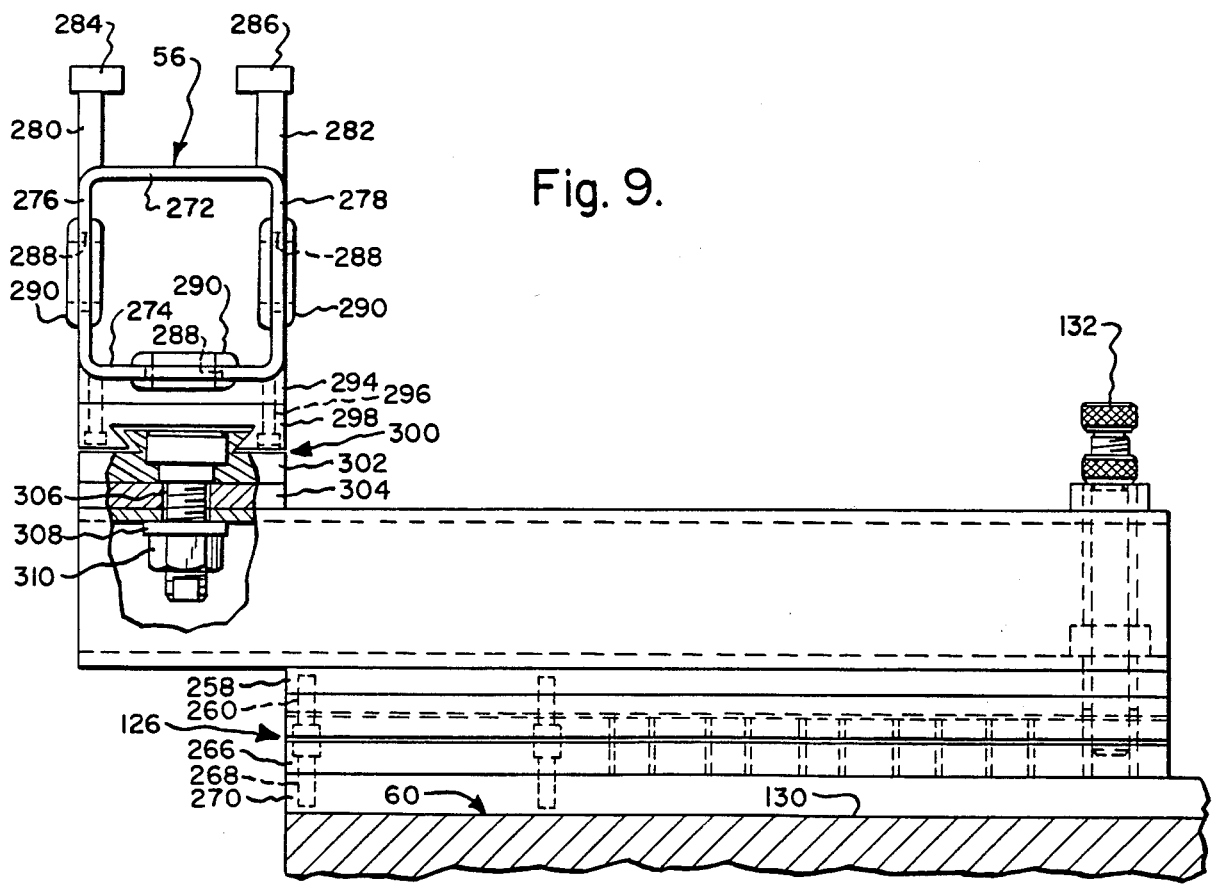
FIG. 9 is an end elevational view of the arrangement of FIG. 8 taken from the left-hand end in FIG. 8.

FIGS. 8 and 9 illustrate in further detail fixture base 56, support arms 58, the movable connection therebetween and the movable mounting of support arms 58 on the top 130 of fixture mounting table 60. As shown in FIG. 8, each supporting arm 58 is in the form of a rectangular tubular member having top and bottom walls 250 and 252 as viewed in FIG. 8 joined by a pair of sidewalls 254 and 256. The bottom wall 252 of each support arm 58 is welded to an elongated strip 258 which, in turn, is fastened by screws 260 to one component 262 of the elongated dovetail slide 126. The other component 266 of slide 126 is fixed by screws 268 to a strip 270 welded or otherwise fixed to the top 130 of fixture mounting table 60. Slide components 262, 266 are movable longitudinally relative to each other to allow movement of support arms 58 transversely across top 130 of table 60.

Fixture base 56 is in the form of a rectangular tubular member having top and bottom walls 272 and 274 joined by a pair of sidewalls 276 and 278. Extending upwardly from top wall 272 and substantially perpendicular thereto are a pair of relatively short, thicker sidewalls 280, 282 shown in FIG. 9 which terminate in inwardly directed flanges 284 and 286, respectively, disposed generally parallel to the top wall 272. The outer surfaces of walls 280 and 282 are substantially flush with the outer surfaces of sidewalls 276 and 278, respectively. The sidewalls 276 and 278 and bottom wall 274 of base 56 are provided with openings 288 having grommets 290 fitted therein for providing access to the interior of base 56 which serves as a conduit for electrical and hydraulic lines leading to and from the clamping and positioning units 90 as will be described.

Fixture base 56 is movably connected to each of the support arms 58 in a manner permitting movement of base 56 between positions illustrated in FIG. 4 where base 56 is disposed either parallel to or at an acute angle with respect to the side of table 60. In particular, referring first to the right-hand support arm 58 as viewed in FIG. 8, a strip 294 welded to bottom wall 274 and one component 298 of an elongated dovetail slide 300 is fastened by screws 296 to strip 294. The other component 302 of slide 300 contacts a strip 304 welded to the upper surface of support arm 58 and is connected to arm 58 by a pivot pin 306 having a head engaging a recess in component 302 and extending through bores or apertures in strip 304 and the upper surface of tubular arm 58 into the interior thereof where it is held by a washer 308 and nut 310. Referring now to the left-hand support arm 58 as viewed in FIG. 8, a strip 314 welded to bottom wall 274 and to a pivot mounting block 318 is fastened by screws 316 to strip 314. The lower surface of block 318 is fastened by screws 316 to strip 314. Contacts the upper surface of a strip 320 welded to the upper surface of support arm 58. Block 318 is pivotally connected to support arm 58 by means of a pivot pin 324 having a head engaging an annular shoulder of a recess in block 318 and extending through bores or apertures provided in strip 320 in the upper surface of tubular arm 58 into the interior thereof where it is held by a washer 326 and nut 328. By virtue of the foregoing arrangement, including pivotal connection of the one support arm 58, i.e. the left arm as viewed in FIG. 8, to base 56 and the pivotal and slidable connection of the other support arm 58, i.e. the right arm as viewed in FIG. 8, movement of base 56 between positions parallel to and at an angle to the side of table 10 is provided.

FIGS. 10-18 illustrate in further detail one of the positioning units, in particular the movable positioning means 52 thereof including the traverse bar 110, fixture clamp positioning unit assembly 112 and manifold block 116 thereof. All of the other movable positioning means 52 of the units 90 are identical to that shown in FIGS. 10-18. The only difference among units 90 is in the clamp assembly 54 which can be of several different types as will be described. Referring now to FIG. 14, fixture clamp positioning unit assembly 112 includes a housing or clamp base 340 which is in the form of a substantially square body having substantially parallel top and bottom surfaces 342 and 344, respectively, as viewed in FIG. 14, a first pair of substantially parallel side surfaces 346, 348 shown in FIG. 14 and a second pair of substantially parallel side surfaces 350, 352 as shown for example in FIG. 15. Base 340 is provided with a central through passage 354 extending between side surfaces 346 and 348 having a longitudinal axis substantially perpendicular to the surfaces 346, 348 and having a cross section conforming to the cross section of traverse bar 110 enabling the bar to be received and slidable in passage 354.

Clamp assembly 112 is positioned on fixture base 56 in the following manner. A base plate 360 having a configuration generally in the shape of an E as shown in FIG. 18 is mounted on bottom surface 344 of the base 340 by screws 368. The outer surface of base plate 360 contacts the upper surface of flanges 284, 286 such that assembly 112 is movably supported on fixture base 56.

Clamp assembly 112 is releasably held or clamped on fixture base 56 in the following manner. Base 340 is provided with an open region 370 extending inwardly from bottom surface 344 located generally centrally thereof and meeting the passage 354. A positioning unit clamp component 374 shown in FIGS. 14 and 15 extends into region 370 and is disposed with the longitudinal or pivot axis thereof substantially perpendicular to the longitudinal axis of traverse bar 110. In particular, component 374 has a shaft portion 376 of generally cylindrical shape fitted snugly within region 370 and depending therefrom through base plate 360 and into fixture base 56 where it meets a circular base portion 378. Shaft portion 376 is provided with an open region 380 shown in FIG. 14 defining a pair of spaced apart generally parallel walls 382, 384 which are received in the recesses of the E shaped base plate 360. The junction of shaft portion 376 and base 378 define therebetween an annular shoulder onto which is fitted a clamp block 388 of generally square outer configuration having a circular central opening to fit onto shaft portion 376 of component 374. The opposite ends of block 388 are formed with right-angle steps to engage the flanges 284, 286 of fixture mounting base 56 in the manner shown in FIG. 14. This engagement also serves to guide the assembly 112 during movement along the fixture base 56. Thus, as positioning unit clamp component 374 is moved slightly along its longitudinal axis, i.e. vertically as viewed in FIGS. 14 and 15, block 388 is moved into and out of clamping engagement with flanges 284, 286. In addition, component 374 is pivotally movable within block 388 which is held against rotation due to engagement with flanges 284, 286. Thus, when component 374 is in an unclamped position, the assembly 112 is pivotally movable relative to fixture base 56, and when component 374 is in a clamped position, assembly 112 is held against pivotal movement. The component 374 is shown in FIG. 14 in a clamped position.

The positioning unit clamp component 374 is moved between clamped and unclamped positions in the following manner. The open region 380 of shaft portion 376 is defined on opposite sides by the inner surfaces of walls 382, 384. As shown also in FIG. 15, the central leg of base plate 360 extends into open region 380 and the upper surface of the leg defines a lower boundary of the region. Region 380 has an upper inclined surface 290 as shown in FIG. 15. A generally wedge-shaped cam lock element 394 is located in region 380 in sliding contact with surface 390 and the upper surface of the leg of plate 360. Cam 394 is in the form of solid body having lands or similar formations 396 and 398 adjacent opposite ends 400 and 402, respectively thereof. Cam 394 also slidably contacts the inner surfaces of walls 382, 384. Movement of cam 394 to the left as viewed in FIG. 15 raises pivot shaft component 374 to a clamped position, and movement of cam 394 to the right lowers component 374 to an unclamped position. Cam 394 is shown in FIG. 15 in a clamping position.

Movement of cam 394 is effected by motor means in the form of an air/hydraulic cylinder generally designated 406 having a housing 408 and piston rod 410. Housing 408 is attached to base 340 by suitable means such as screws 412 and bracket 414 shown in FIG. 10. Piston rod 410 is connected to cam 374 by suitable means such as by an extension 416 threaded into the cam body. Fluid for operating cylinder 406 is supplied to and from housing 408 by lines 418, 420. Operation of cylinder 406 and hence the clamp and unclamped positions of cam 394 is monitored by sensing means including an operator member connected to cam 394 and sensor means associated with the operator member. In particular, the rod 422 as shown in FIGS. 15 and 16 is connected to cam 394 at surface 400 opposite the connection to piston rod 410 and extends through an opening in base 340 and is surrounded by a bias spring 424. An arm 426 is connected at one end to rod 422 and has an opposite end provided with a step 428 in proximity to a first sensor 430 supported in base 340 and connected by wire 432 to the system control. Arm 426 is connected to one end of a rod 434 extending through a passage in base 340 to the opposite side where it is connected to a tab 438 operatively associated with a second sensor 440 supported in base 340 and connected by a wire 442 to the system control. Sensors 430, 440 are responsive to contact with arm 426 and 438, respectively. When cam 394 is in the clamped position arm 426 is spaced from sensor 430 and tab 438 contacts sensor 440. When cam 394 is in an unclamped position, arm 426 contacts sensor 430 and tab 438 is spaced from sensor 440. Thus, sensors 430 and 440 signal the unclamped and clamped positions, respectively, of cam 394.

Traverse bar 110 is releasably held in fixture clamp positioning unit 112 in the following manner. Clamp base 340 is provided with an open region extending inwardly from top surface 342 as shown in FIG. 14 defining a pair of opposed substantially parallel surfaces 484, 486 and extending inwardly from side surface 352 defining an interior surface 488 shown in FIG. 15 substantially parallel to the top surface 342 of base 340. A cam plate 490 is placed in the opening between surfaces 484, 486 in a manner contacting a portion of the surface of traverse bar 110. A cap block 494 having a body portion 496 and a flange portion 498 is fitted in the opening region with body portion 496 fitted snugly between surfaces 484, 486 and with flange portion 498 supported in a shouldered recess provided in the surface 342 of base 340. Cap block 494 is somewhat L shaped as viewed from the side in FIG. 15 having an inclined surface 500 extending along the leg thereof and spaced from cam plate 490 and having a foot contacting the surface 488. Thus, a generally wedge-shaped region is defined between surfaces 484, 486, the inclined surface 500 and cam plate 490. A generally wedge-shaped cam lock element 504 similar to cam 394 is positioned in the region in sliding contact with inclined surface 500 and the opposed surface of cam plate 490 as well as surfaces 484, 486. Cam 504 is in the form of a solid body having lands or similar formations 506 and 508 adjacent the opposite ends 510 and 512, respectively. Movement of cam 504 to the right as viewed in FIG. 15 urges cam plate 490 into firm clamping contact with the surface of traverse bar 110, and movement of cam 504 to the left as viewed in FIG. 15 releases plate 490 to an unclamped position. Cam 504 is shown in FIG. 15 in a clamping position.

Movement of cam 504 is effected by motive means in the form of an air/hydraulic cylinder generally designated 514 in FIG. 15 having a housing 516 and piston rod 518. Housing 516 is attached to base 340 by suitable means such as screws 520. Piston rod 518 is connected to cam 504 by suitable means such as an extension 524 threaded into the body of the cam. Fluid for operating cylinder 514 is supplied to and from housing 516 by lines 526, 528. Operation of cylinder 514 and hence the clamped and unclamped positions of cam 504 is monitored by sensing means including an operator member connected to cam 504 and sensing means associated with the operator member in a manner similar to that of cam 394. In particular, a rod 530 shown in FIG. 15 is connected to cam 504 at surface 512 opposite the connection to piston rod 518 and extends through an opening in block 494 and is surrounded by a bias spring 532. An arm 534 is connected at one end to rod 530 and at the opposite end has a step formation 536 in proximity to a first sensor 538 supported in base 340 and connected by wire 539 to the system control. Arm 534 is connected to one end of a rod 540 which extends through a passage in base 340 to the opposite side where it is connected to a tab 542 operatively associated with the second sensor 544 supported in base 340 and connected by a wire 545 to the aforementioned control. Sensors 538 and 544 are responsive to contact with arm 534 and tab 542, respectively. When cam 504 is in the clamped position, arm 534 is spaced from sensor 538 and tab 542 contacts sensor 544. When cam 504 is in an unclamped position, arm 534 contacts sensor 538 and tab 542 is spaced from sensor 544. Thus, sensors 538 and 544 signal the unclamped and clamped positions, respectively, of cam 504.

Figure 10:
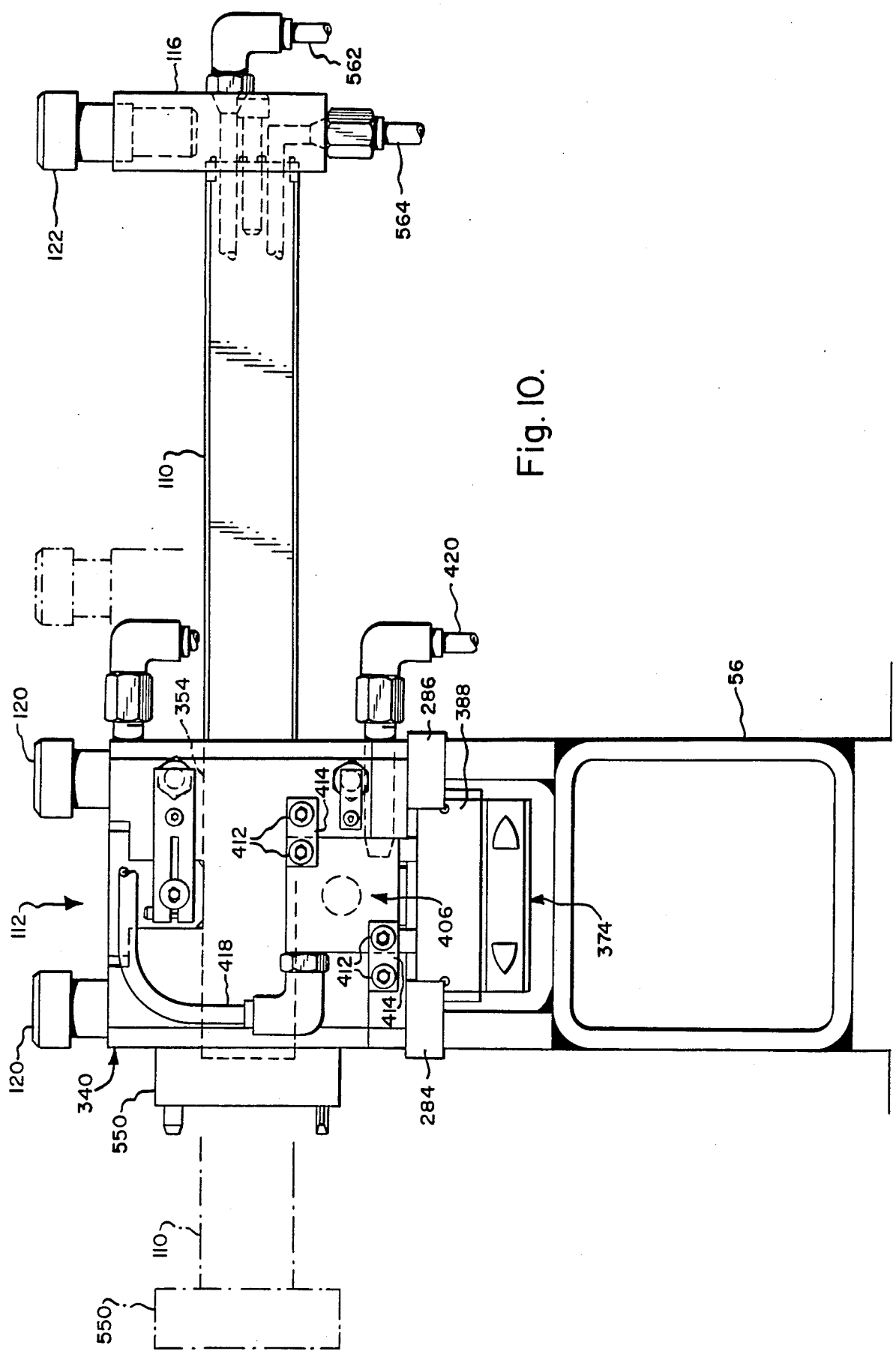
FIG. 10 is a side elevational view of one of the movable positioning means in the fixture of FIGS. 4 and 5.
Figure 12:
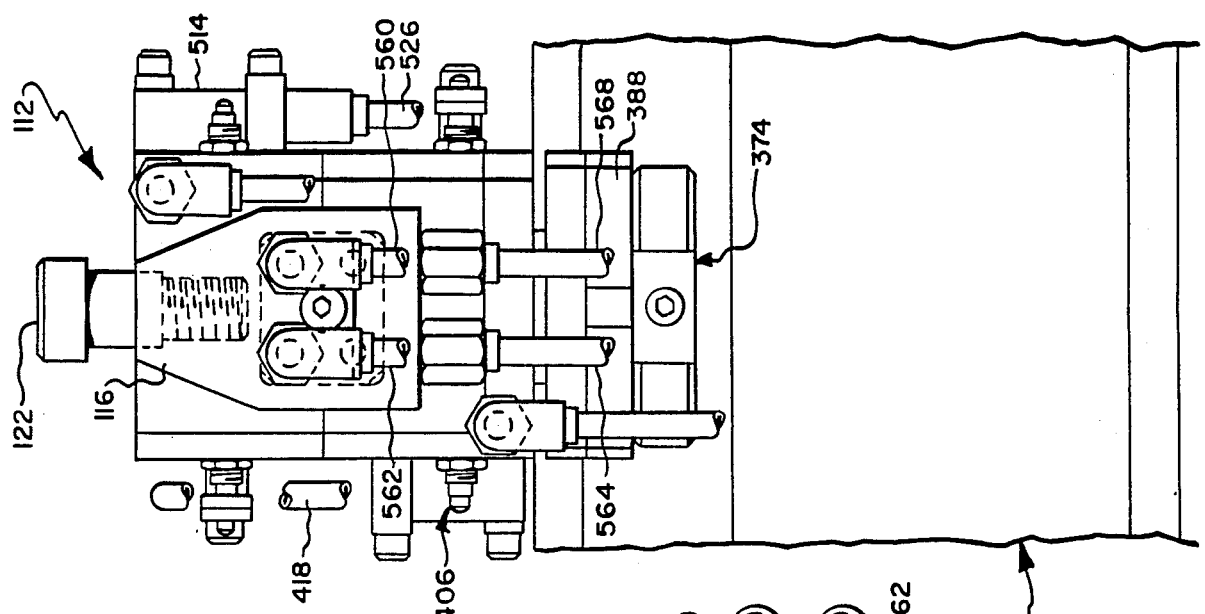
FIG. 12 is an end elevational view thereof taken from the right-hand end in FIG. 10.
Figure 11:
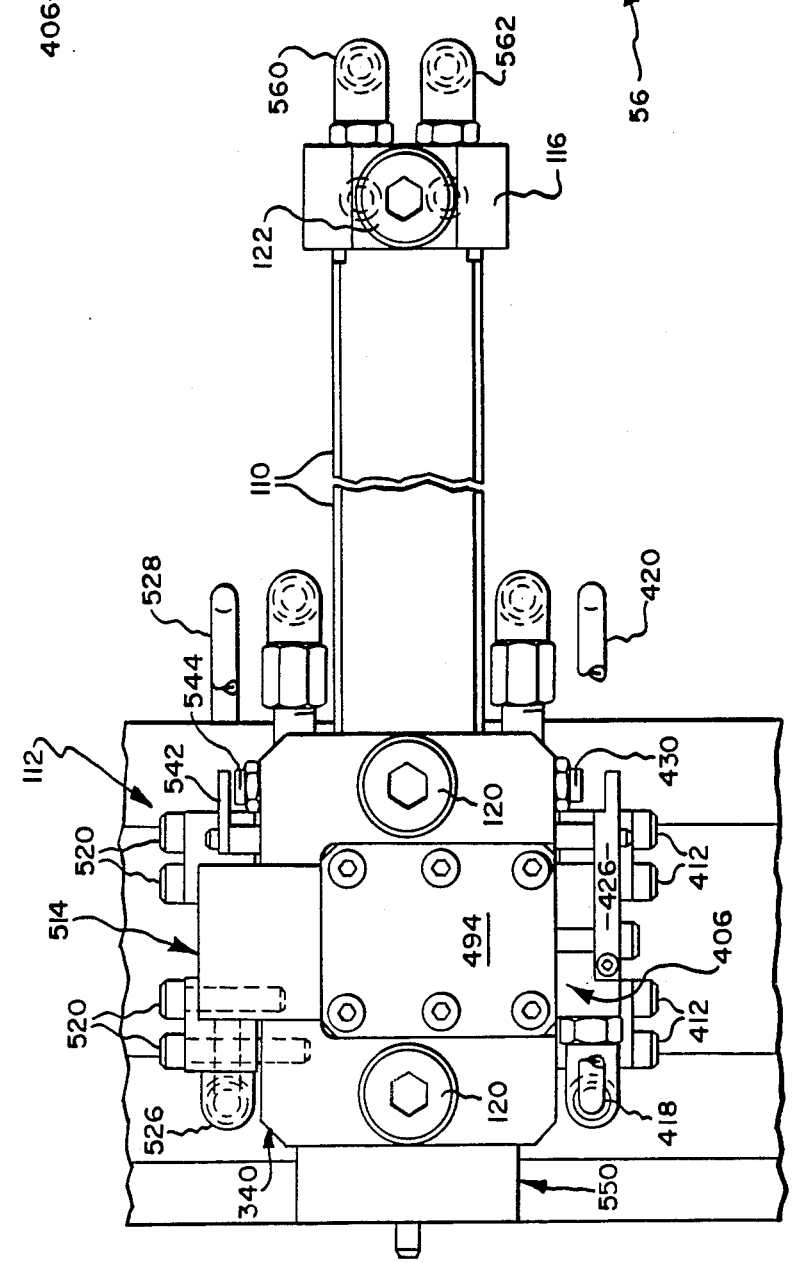
FIG. 11 is a top plan view thereof with parts removed.

Traverse bar 110 is connected at the outer end to manifold block 116 as shown in FIG. 10 and at the opposite end to a clamp mounting bracket 550 which, in turn, is connected to the clamp arm assembly 54 as will be described. Bar 110 is provided with a plurality of longitudinal passages or bores, in particular the four indicated 552, 554, 556 and 558 in FIG. 15 for containing air/hydraulic fluid for operating the clamping mechanism. Fluid lines 560, 562, 564 and 568 are connected to manifold block 116 and are in communication with the passage 552, 554, 556 and 558, respectively. Bracket 550 is provided with openings 572, 574, 576 and 578 in communication with the passage 552, 554, 556 and 558, respectively, for connection to the clamping mechanism as will be described.

Figure 19:
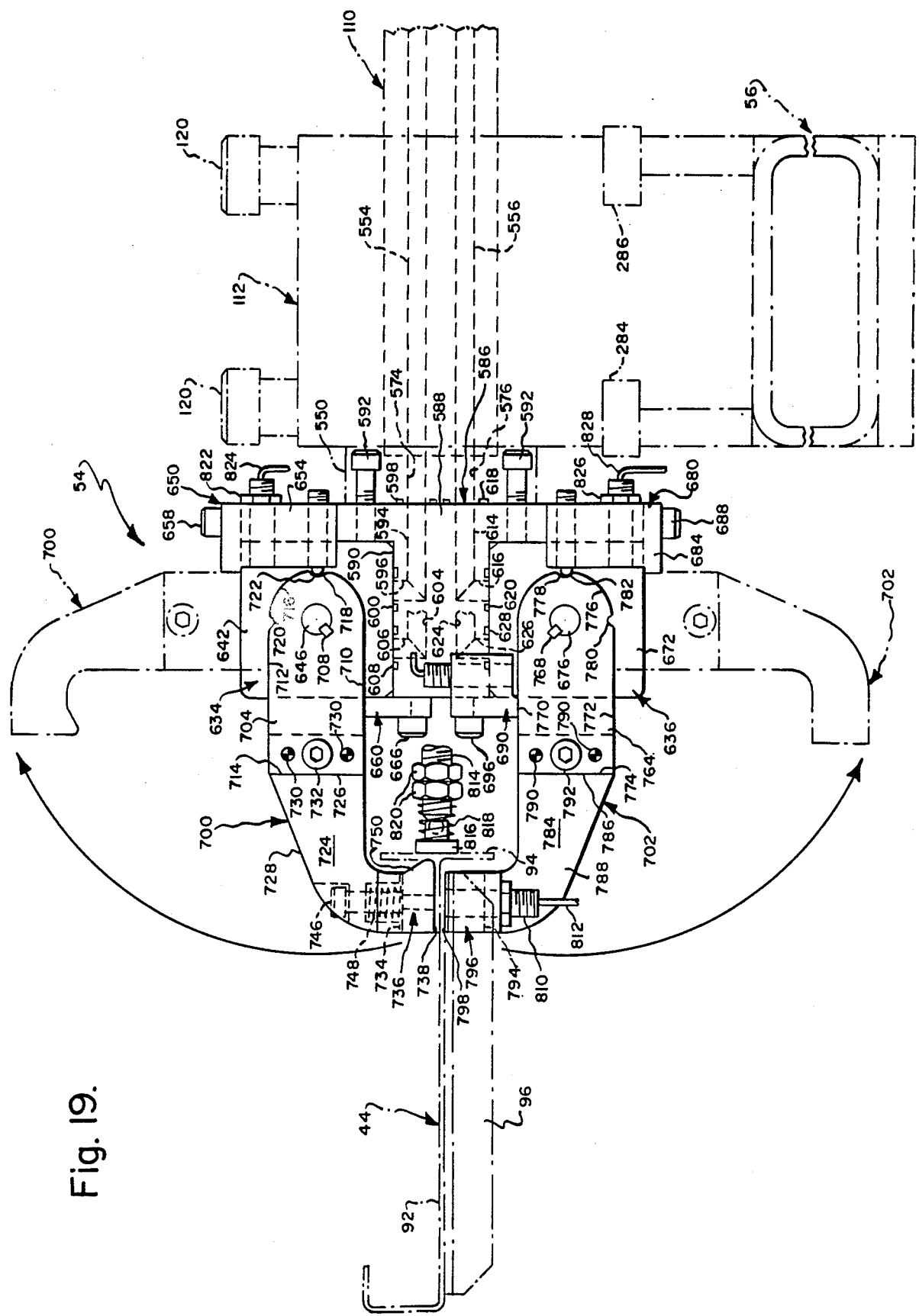
FIG. 19 is a side elevational view of one type of clamp assembly in the fixtures of FIGS. 4 and 5.

FIGS. 19–22 show in detail one of the clamp assemblies 54, for example the clamp assembly of the type previously designated a tee clamp in connection with the description of FIG. 4. As previously described, each clamp assembly 54 includes a pair of jaws or fingers and a mechanism for operating the same. Referring now to FIG. 19, clamp assembly 54 includes a body or manifold block 586 having a plate-like base 588 and a rectangular solid extension 590 projecting from one side of the plate facing toward the jaws or fingers. The opposite side of base 588 is connected to clamp mounting bracket 550 by screws 592 and at a location generally centrally of base 588. Extension 590 is provided with bores or passages in communication with the passages in bracket 550 and therefore with the passages in traverse bar 110. In particular, a first passage has a longitudinally extending portion 594 in communication with bracket opening 574 and a laterally extending portion 596 open at the outer surface of extension 590. An O-ring seal 598 is seated in a groove provided in the surface of bracket 550 surrounding opening 574 for sealing the connection between opening 574 and passage portion 594. An O-ring seal 600 also is seated in a groove provided in the surface of extension 590 surrounding passage portion 596 for sealing its connection to another component of the mechanism as will be described. A second passage has a longitudinally extending portion 604 in communication with bracket opening 572 and a laterally extending portion 606 open at the outer surface of extension 590. An O-ring seal (not shown) is seated in a groove provided in the surface of bracket 550 surrounding opening 572 for sealing the connection between opening 572 and passage portion 604. An O-ring seal 608 also is seated in a groove provided in the surface of extension 590 surrounding passage portion 606 for sealing its connection to another component as will be described.

Similarly, a third passage has a longitudinally extending portion 614 in communication with bracket opening 576 and a laterally extending portion 616 open at the opposite outer surface of extension 590. An O-ring seal 618 is seated in a groove provided in the surface of bracket 550 surrounding opening 576 for sealing the connection between opening 576 and passage portion 614. An O-ring seal 620 also is seated in a groove provided in the surface of extension 590 surrounding passage portion 616 for sealing its connection to another component as will be described. A fourth passage has a longitudinally extending portion 624 is communication with bracket opening 578 and a laterally extending portion 626 open at the outer surface of extension 590. An O-ring seal (not shown) is seated in a groove provided in the surface of bracket 550 surrounding opening 578 for sealing the connection between opening 578 and passage portion 624. An O-ring seal 628 also is seated in a groove provided in the surface of extension 590 surrounding passage portion 636 for sealing its connection to another component as will be described.

Figure 20:
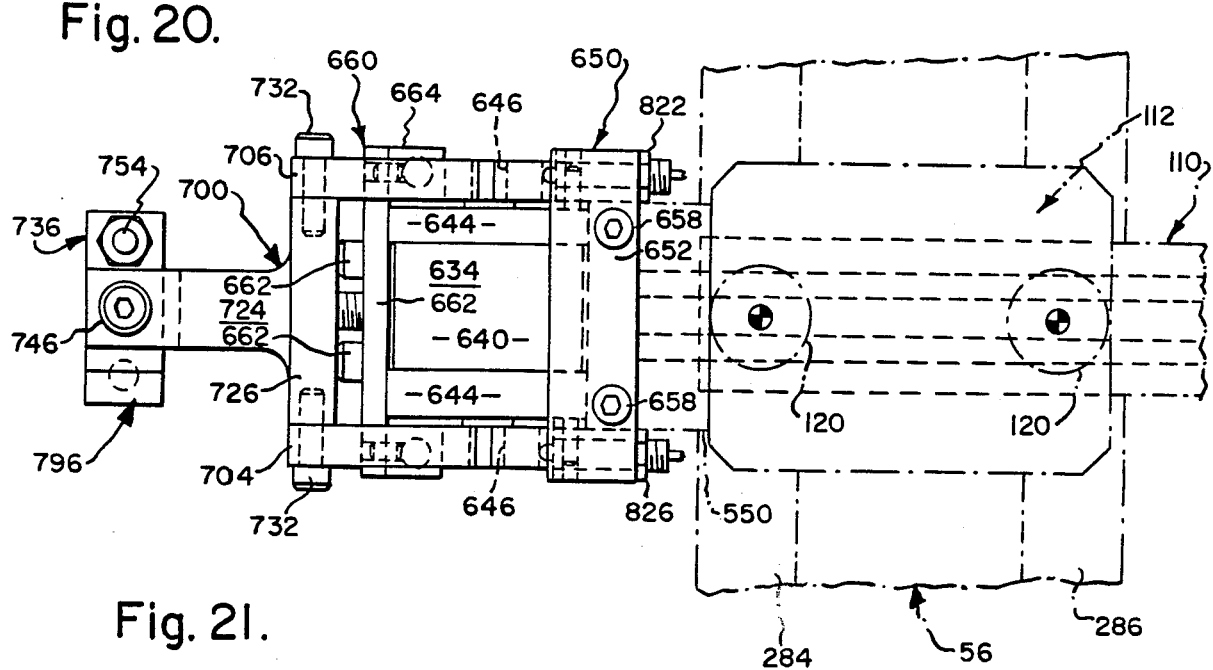
FIG. 20 is a top plan view thereof.
Figure 21:
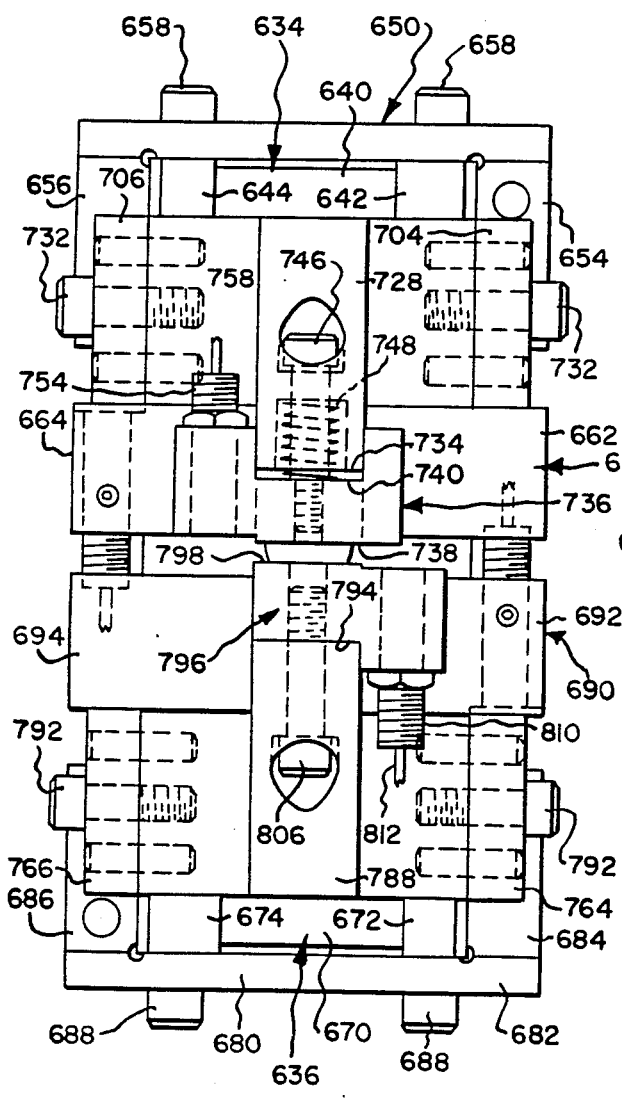
FIG. 21 is an end elevational view thereof taken from the left-hand end in FIG. 19.
Figure 22:
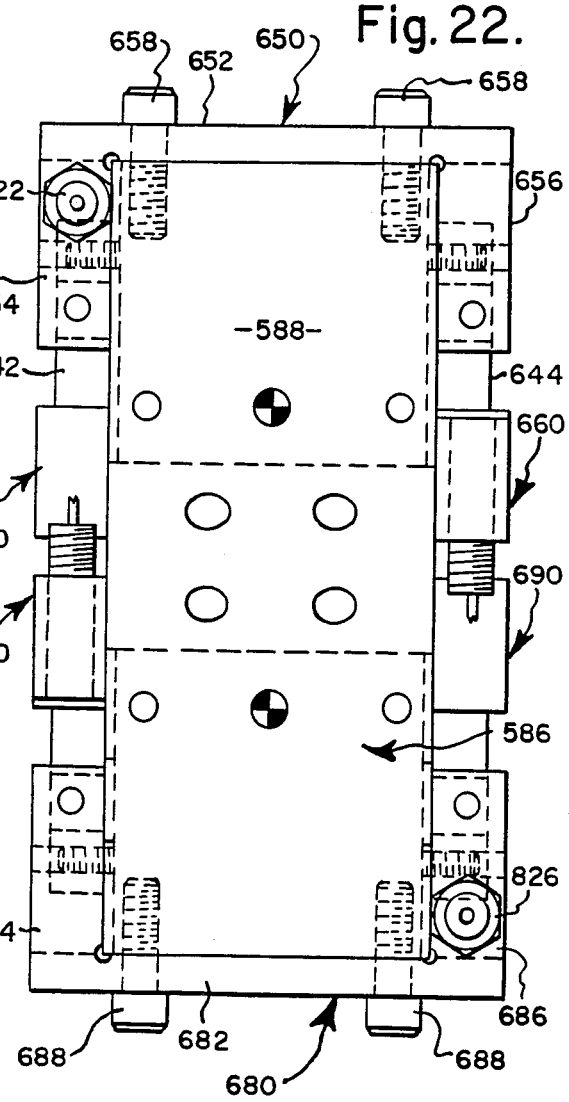
FIG. 22 is an end elevational view thereof taken from the right hand end in FIG. 19.

The clamp assembly further comprises first and second motive means in the form of first and second rotary actuators 634 and 636, respectively, mounted on manifold block 586. In particular, rotary actuator 634 has an elongated housing 640 shown in FIGS. 20 and 21 provided with end caps 642, 644 at opposite ends and an output shaft 646 extending outwardly beyond both end caps 642, 644. Actuator 634 is mounted on manifold block 586 in contact with the upper surface of extension 590 as viewed in FIG. 19 and in contact with the adjacent surface of base 588. Actuator 634 is held in place by a first retaining element 650 which is generally U-shaped having a web or base 652 shown in FIGS. 22 which extends along the top edge of base 588 as viewed in the drawings and a pair of legs 654, 656 which depend at right angles from base 652 and are in contact with the side edges of base 588 and an adjacent portion of each end cap 642, 644. Retaining element 650 is fastened to base 588 by screws 658. Actuator 634 also is held in place by a second retaining element 660 which is generally L-shaped having a major leg 662 which extends across the entire front end of extension 590 as shown in FIG. 21 and adjacent portion or actuator 634 and having a minor leg 664 which extends at a right angle to leg 662 and along a portion of end cap 644. Retaining element 660 is fastened to extension 590 by screws 662. Rotary actuator 634 is provided with a pair of fluid ports which are in communication with passage portions 596 and 606, the connection being sealed against leakage by O-rings 600 and 608.

Rotary actuator 636 has an elongated housing 670 provided with end caps 672, 674 at opposite ends as shown in FIG. 21 and an output shaft 676 extending outwardly beyond both end caps 672, 674. Actuator 636 is mounted on manifold block 586 in contact with the lower surface of extension 590 as viewed in FIG. 19 and in contact with the adjacent surface of base 588. Actuator 636 is held in place by a first retaining element 680 which is generally U-shaped like retaining element 650 and having a web or base 682 which extends along the bottom edge of plate 588 as viewed in FIG. 19 and a pair of legs 684, 686 which extend at right angles to base 682 and are in contact with the side edges of base 588 and adjacent portion of each end cap 672, 674 as shown in FIG. 21. Retaining element 680 is fastened to plate 588 by screws 688. Actuator 636 also is held in place by a second retaining element 690 which is generally L-shaped having a major leg 694 which extends along the entire front end of extension 590 as shown in FIG. 21 and adjacent portion of actuator 636 and having a minor leg 692 which extends at a right angle to 694 and along a portion of end caps 672 as shown in FIG. 19. Retaining element 690 is fastened to extension 590 by a screws 696. Rotary actuator 636 is provided with a pair of fluid ports which are in communication with passage ports 616 and 626, the connection being sealed by O-rings 620 and 628.

The clamp assembly further comprises holding or clamping means in the form of first and second fingers or jaws 700 and 702, respectively, shown in FIG. 19 operatively connected to the first and second rotary actuators 634 and 636, respectively, for movement into and out of clamping engagement with the assembly. In particular, finger 700 comprises a pair of elongated arm member 704 and 706 shown also in FIG. 20 each fixed at one end to a corresponding end of shaft 646 of rotary actuator 634. This can be accomplished by keying actuator shaft 646 to each arm, for example key 708 in arm 704 as shown in FIG. 19. Each arm, for example arm 704, has a pair of spaced apart substantially parallel side edges 710, 712 which meet an end edge 714 at substantially right angles. The opposite end edge 716 adjacent the connection to shaft 646 is arcuate, generally in the shape of a semi-circle. Edge 716 is provided with a pair of spaced apart notches or recesses, one notch 718 being located in substantially on the longitudinal axis of arm 704 and the other notch 720 being located at the junction of edges 716 and 712 and thus displaced about 90° from notch 718. Notch 720 thus faces away from extension 590 of manifold block 586. A plunger 722 held in base 588 is adapted to engage notches 718, 720 for holding finger 700 in the two positions indicated in FIG. 19. Arm 706 has an arrangement of edges and notches identical to that of arm 704.

Finger 700 comprises a clamp member 724 having a plate-like base 726 adapted for connection at each end to arms 704, 706 as shown in FIG. 20 and a generally L-shaped finger 728 which extends from the center of base 726 with an end thereof adapted to engage the workpiece. In particular, clamp member 724 is formed as a single casting with base 726 being rectangular and having a length adapted to fit in the space between the inner facing surfaces of arms 704, 706 and fixed in place by pins 730 and screws 732. Finger 728 extends from the center of base 72 with one arm thereof generally parallel to arms 704, 706 and the other arm extending at about a right angle and terminating in a substantially planar end face 734 shown in FIG. 19. Finger 700 further comprises a pad element 736 in the form of a generally rectangular block having a surface 738 adapted to contact the workpiece and being generally C-shaped to define a rectangular notch or recess 740 shown in FIG. 21 in the opposite surface to receive the end of finger 728 including end face 734. The end of the finger including end face 734 and pad 736 are connected by adjustment means in the form of a screw 746 received in a bore in finger 728 extending through face 734 and threaded into the recess of pad 736 with biasing means in the form of a coil spring 748 received in the bore in finger 728 and contacting a face of recess 740. Movement of pad 736 toward and away from the assembly by adjustment of screw 746 accommodates different detail thicknesses. Pad 736 also is formed with a foot 750 shown in FIG. 19 extending in a generally direction toward manifold block 586. A sensor 754 is threaded into the body of pad 736 and has an end adjacent surface 738 for sensing contact with the assembly and sensor 754 is connected by a wire 758 to the system control.

Finger 702 likewise comprises a pair of elongated arm members 764 and 766 each fixed at one end to a corresponding end of shaft 676 of rotary actuator 636. As previously described, this can be accomplished by keying the actuator shaft 676 to each arm, for example key 768 in arm 764 as shown in FIG. 19. Each arm, for example arm 764, has a pair of spaced apart substantially parallel side edges 770, 772 which meet at an end edge 774 at substantially right angles. The opposite end edge 776 adjacent the connection to shaft 676 is generally arcuate in the shape of a semicircle. Edge 776 is provided with a pair of spaced apart notches or recesses, one notch 778 being located substantially on the longitudinal axis of arm 764 and the other notch 780 being located at the junction of edges 776 and 772 and thus displaced about 90° from notch 778. Notch 780 thus faces away from the extension 590 of manifold block 586. A plunber 782 held in base 588 is adapted to engage notches 778, 780 for holding finger 702 in the two positions indicated in FIG. 19. Arm 766 has an arrangement of edges and notches identical to that of arm 764.

Finger 702 further comprises a clamp member 784 having a plate-like base 786 adapted for connection at each end to arms 764 and 766 and a generally L-shaped finger 788 which extends from the center of base 786 with an end thereof adapted to engage the workpiece. In particular, clamp member 784 is formed as a single casting with base 786 being rectangular and having a length adapted to fit in the space between the inner facing surfaces of arms 764 and 766 and fixed in place by pins 790 and screws 792. Finger 788 extends from the center of base 786 with one arm thereof generally parallel to arms 764, 766 and the other extending about a right angle and terminating in a substantially planar end face 794. Finger 702 further comprises a pad element 796 in the form of a generally rectangular block having a surface 798 adapted to contact the assembly and being somewhat L-shaped as viewed in FIG. 21 to define a shoulder to receive the end of finger 788 including end face 794. The end of finger 788 including end face 794 and pad 796 are connected by adjustment means in the form of screw 806 received in a bore in arm 788 extending through face 794 and threaded into the shoulder of pad 796. A sensor 810 is threaded into the body of pad 796 and has an end adjacent surface 798 for sensing contact with the assembly, and sensor 810 is connected by a wire 812 to a system control.

The clamp assembly further comprises means for abutting the inner face of the tee or base of the toe part of the assembly. As shown in FIG. 19, a swivel screw body 814 extends out from the end face of the extension 590 of manifold block 586 and terminates in a swivel screw foot 816. A compression spring 818 is fitted between foot 816 and a pair of hexagonal jam nuts 820 threaded on screw body 814. A first sensor 822 is mounted in base 588 of manifold block 586 is adapted to be contacted by finger 700 in the full open position indicated in broken lines in FIG. 19 for signalling the same and is connected by wire 824 to the system control. Similarly, a second sensor 826 mounted in base 588 of manifold block 586 is adapted to be contacted by finger 702 in the full open position indicated in broken lines in FIG. 19 for signalling the same and is connected by a wire 828 to the system control. When the clamp pads 736, 796 engage detail 44, the foot 750 pulls the detail over to the fixed stop 816.

Figure 23:
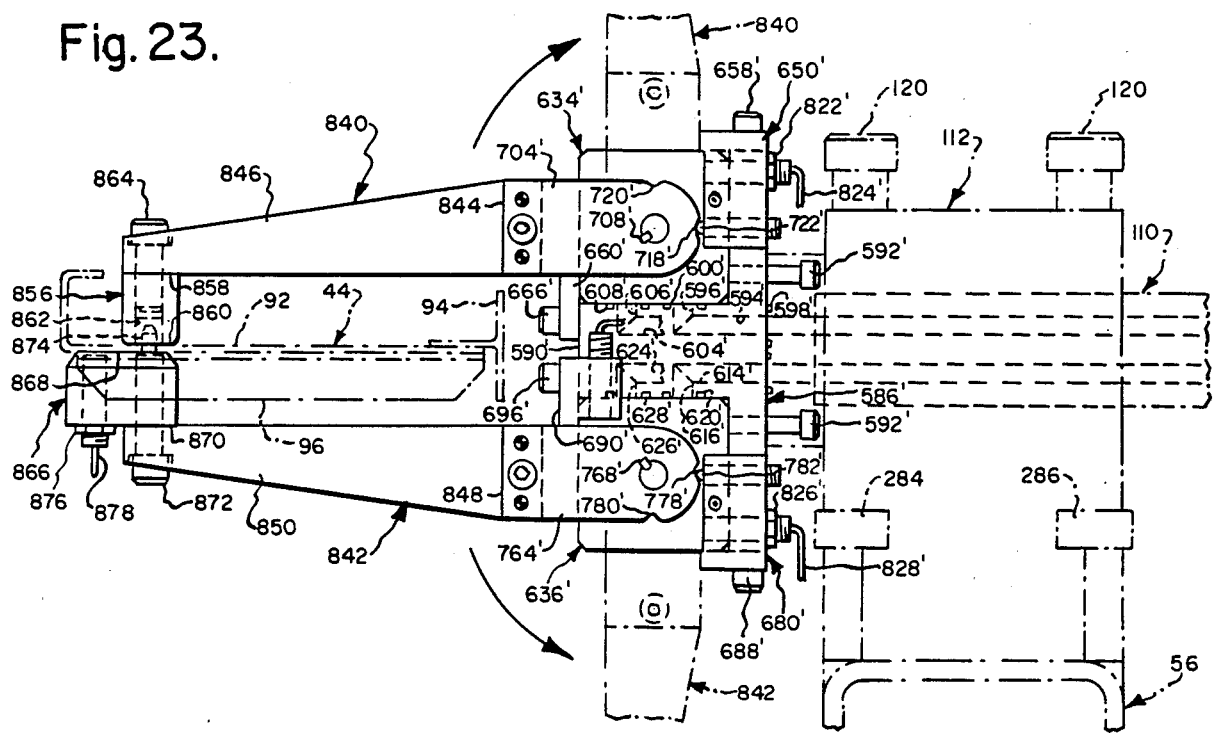
FIG. 23 is a side elevational view of a second type of clamp assembly in the fixture of FIGS. 4 and 5.

FIG. 23 shows in detail the clamp assembly of the type previously designated the web clamp in connection with the description of FIG. 4. The web clamp assembly has many of the same components as the tee clamp assembly of FIGS. 19-22, and for convenience in illustration these components are identified by the same reference numerals but with a prime designation. Thus, there is a manifold block 586' having base 588' and extension 590' and fixed to clamp mounting bracket 550' by screws 592'. Extension 590' has passages including portions 594' and 596', 604' and 606', 614 and 616', 624' and 626' and corresponding O-rings 598', 600', 608', 618', 620', and 628'. There is also provided rotary actuators 634' and 636', retaining elements 650', 660' and 680', 690', and screws 658', 666', 688' and 696' for fastening the retaining elements. As in the clamp assembly of FIGS. 19-21, there is holding or clamping means in the form of first and second fingers or jaws 840 and 842 operatively connected to the first and second rotary actuators 634' and 636', respectively, for movement into and out of clamping or holding engagement with the assembly. Each finger comprises a pair of elongated arm members, for example the arm members designated 704' and 764' and each arm is fixed at one end to output shafts of the rotary actuators such as by keys 708', 768' and each provided with notches or recesses 718', 720' and 778', 780' for engagement with plungers 722' and 782'.

In this embodiment, finger 840 includes a base 844 fixed between arms 704', 706' as in the previous embodiment and an arm 846 extending from the center of base 844 with an end thereof adapted to engage the assembly. Arm 846 is generally elongated. Similarly, jaw 842 includes a base 848 fixed between arms 764', 766' as in the previous embodiment and arm 850 extending from the center of base 848 with an end thereof adapted to engage the assembly. Arm 850 is generally elongated. The outer end of arm 846 is provided with an upper finger pad 856 in the form of a solid body having a flat upper surface 858 contacting the surface of arm 846 and a flat lower surface 860 adapted to contact the detail, in particular the upward facing surface of web 92. Pad 856 is provided with a central bore or recess 862 extending inwardly a short distance from surface 860, and pad 856 is fixed to arm 846 by a screw 864. The outer end of arm 850 is provided with a lower finger pad 866 in the form of a solid body having a flat upper surface 868 adapted to contact the detail, in particular the downward facing surface of web 92, and a flat lower surface 870 contacting the surface of arm 850. Pad 866 is fixed to arm 850 by a screw 872 which also serves as a locating pin by having a tip 874 which projects out from the upper surface 868 and is adapted to be received in a locating hole in web 92. A sensor 876 is fitted in pad 866 and has an end adjacent the upper surface 868 for sensing contact for detail 92 and includes a wire 878 for connection to the system control. A first sensor 822' mounted in base 588' of manifold block 586' is adapted to be contacted by finger 840 in the full open position indicated in broken lines in FIG. 23 for signalling the same and is connected by wire 824' to the system control. Similarly, a second sensor 826' mounted in base 588' of the manifold block 586' is adapted to be contacted by finger 842 in the full open position indicated in broken lines in FIG. 23 for signalling the same and is connected by wire 828' to the system control. The web clamp functions to secure the web 92 into position using existing tooling holes in the detail. The web 92 is positioned over a pair of the tooling pins 874, one per clamp assembly, and once the web 92 is secured on the pins the cap clamp or pad 856 moves into position over tooling pin 874 to lock web 92 into position.

Figure 25:
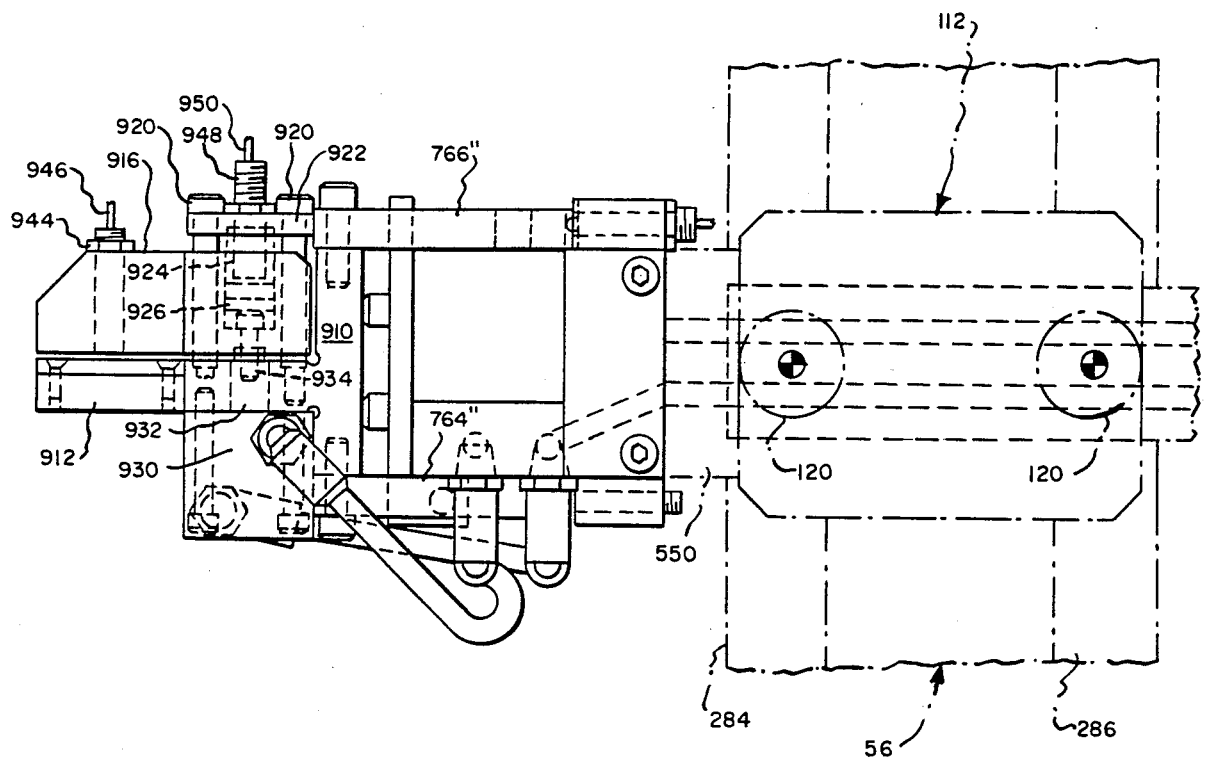
FIG. 25 is a top plan view thereof.
Figure 24:
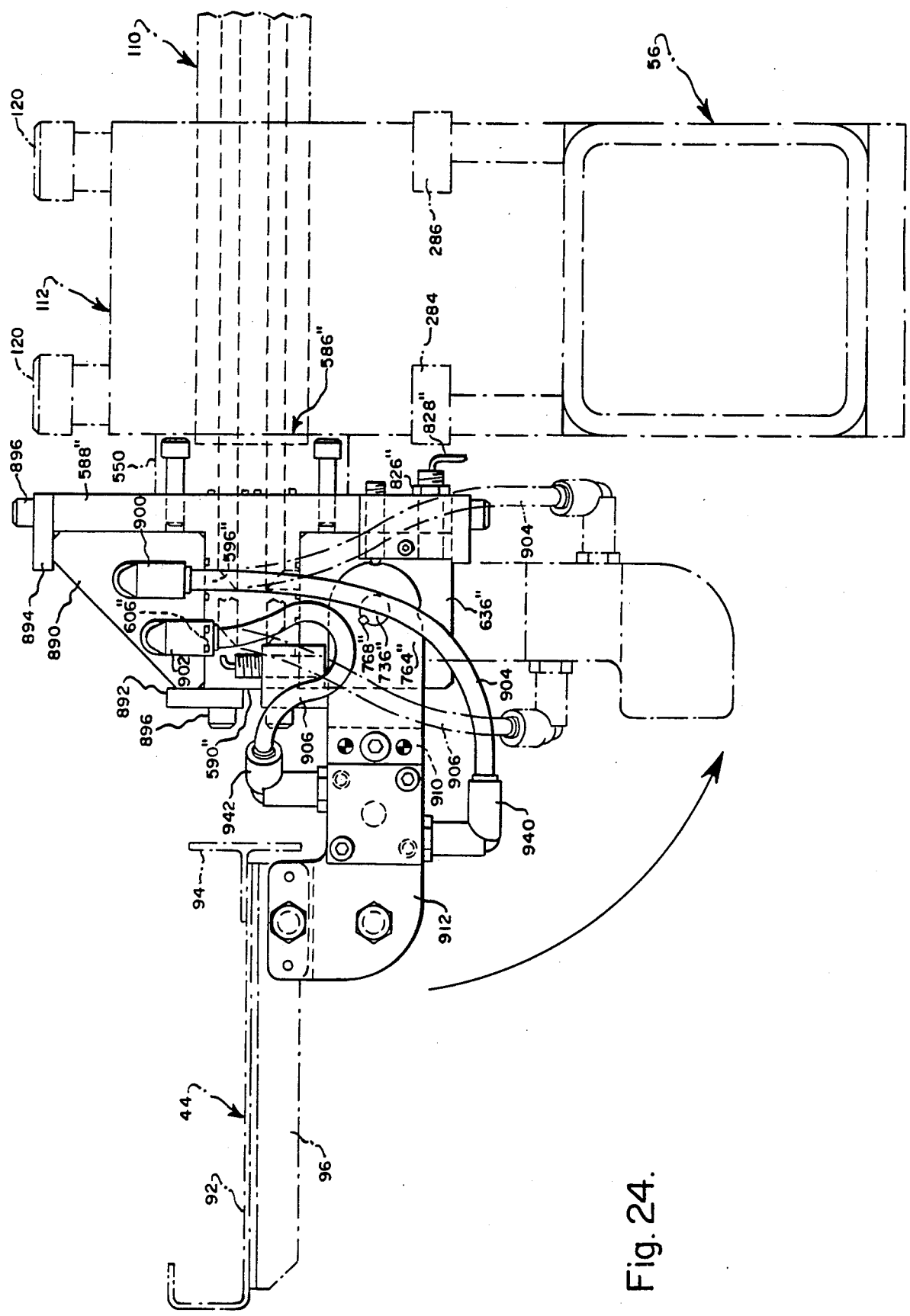
FIG. 24 is a side elevational view of a third type of clamp assembly in the fixture of FIGS. 4 and 5.

FIGS. 24 and 25 show in detail the clamp assembly of the type previously designated to the angle clamp in connection with the description of FIG. 4. The angle clamp assembly has some of the same components as the tee clamp assembly of FIGS. 19–22 and the web clamp assembly of FIG. 23, and for convenience in illustration these components are identified by the same reference numerals but with a double prime designation. Thus there is a manifold block 586" having base 588" and extension 590" and fixed to clamp mounting bracket 550" by screws 592". Extension 590" has passages including portions 594" and 596", 604" and 606", 614" and 616", 624" and 626" and corresponding O-rings 598", 600", 608", 618", 620" and 628". There is also provided a rotary actuator 636", retaining elements 680", 690" and screws 688", 696" for fastening the retaining elements.

In this embodiment there is holding or clamping means in the form of a single arm moved toward and away from the assembly by rotary actuator 636" and a pair of fingers or jaws on the arm moved toward and away from one another by motive means on the arm for movement into and out of clamping engagement with the detail i.e. with the reinforcement member 96 of the workpiece 44. In particular, manifold block 586" carries a body 890 on the upper surface of extension 590" as viewed in FIG. 24 which is held in place by retainer plates 892 and 894 fastened by screws 896 to extension 590" and base 588", respectively. Body 890 is provided with internal bores or passages each in communication at one end with the passage portions 596" and 606" in extension 590 and each connected at the other end to fittings 900 and 902 on the ends of flexible conductors or hoses 904 and 906, respectively, for supplying fluid to motive means on the arm as will be described.

The single arm is connected to rotary actuator 636" in a manner similar to that in the previous embodiments. A pair of elongated members 764", 766" is fixed at one end to the output shaft of rotary actuator 636" such as by key 768" and provided with notches or recesses 778", 780 for engagement with plunger 782". One finger or jaw component of the single arm has a base portion 910 fixed between parts 764", 766" and an arm 912 extending from the center of base 910. Arm 912 is generally in the form of an L, with the longer leg extending from base 910 and the shorter leg extending toward the workpiece 44 as shown in FIG. 24. The other finger or jaw component 916 is movably carried on the first component. In particular, component 916 also is in the form of an L and located in side-by-side registry with component 912 with the longer leg extending along the corresponding longer leg of component 912 in the shorter leg extending towards the workpiece. Component 916 is slidably mounted on a pair of shoulder screws 920 threaded at one end to component 912. A retaining plate 922 is located adjacent the heads of screws 920. A coil spring 924 is located in a recess 926 in jaw component 916 and contracts plate 922 for biasing the jaw 916 in a first position. The jaw 916 is moved to a second position by motive means in the form of a square cylinder 930 mounted on jaw 912 and having a piston rod 932 extending therefrom and connected to jaw 916 by screw 934. Hoses 904, 906 are connected to cylinder 930 by fittings 940 and 942, respectively. A first sensor 944 in the body of jaw component 916 senses contact with detail 96 and is connected by a wire 946 to the system control. A second sensor 948 is connected to retaining plate 922 to sense the position of jaw component 916 and is connected by a wire 950 to the system control. Another sensor 826" mounted in base 588" of manifold block 586" is adapted to be contacted by the arm in the full open position indicated in broken lines FIG. 24 for signalling same and is connected by wire 828" to the system control.

Figure 26:
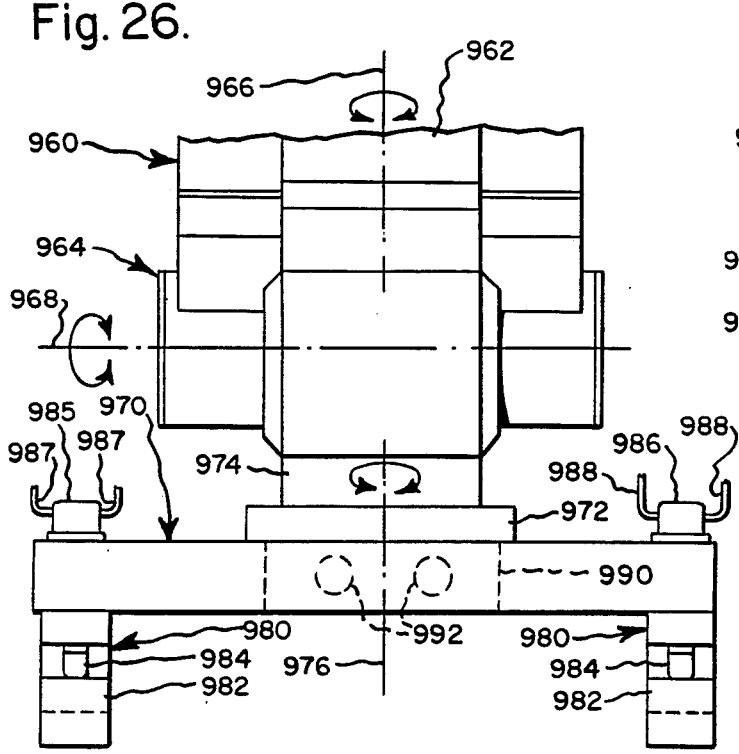
FIG. 26 is a side elevational view of the manipulative means of each robot in the cell of FIG. 1.
Figure 27:
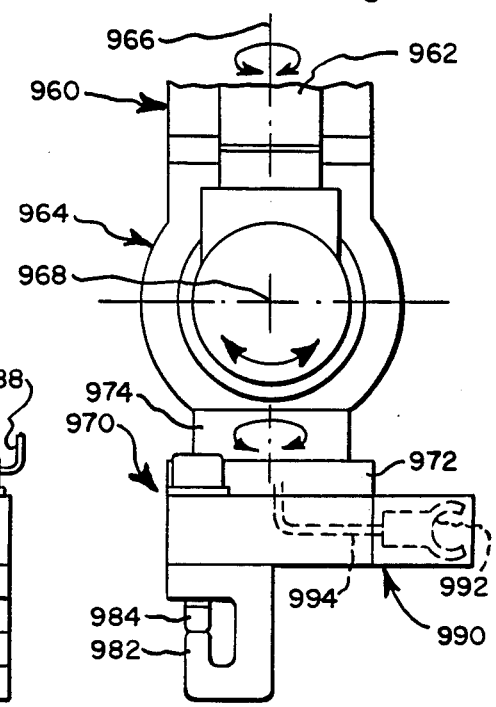
FIG. 27 is an end elevational view thereof.

FIGS. 26–30 illustrate the manipulative means of each robot and the manner in which it performs various tasks. As shown in FIGS. 26 and 27 the robot arm 960 and mast 962 terminate in a wrist 964. The mast 962 is rotatable about a first axis 966 which is the longitudinal axis of arm 960, and wrist 964 is rotatable about a second axis 968 which is orthogonal to the first axis 966. An end effector 970 generally in the form of a flat plate is connected through a mounting plate 972 and coupling 974 to wrist 964. Coupling 974 is rotatable about a third axis 976 which is coincident with the first axis 966. End effector 970 is provided with a pair of grippers or clamps 980, one at each end, for holding details or finished assemblies. Each clamp 980 includes jaws 982 and 984 operated by appropriate motive means for example compressed air cylinders 985 and 986, respectively, connected by lines 987, 988 to control valves associated with a supply. Each clamp 980 also includes appropriate sensors (not shown) for signalling when the gripper is open, closed with a part therein and closed without a part therein. The end effector 970 also is provided with a gripper or clamp 990 shown in FIG. 27 for grasping the knobs 120, 122 of the clamp assembly and positioning units for adjusting same in the X, Y and C directions. Gripper 990 also includes jaws 992 connected by line 994 to appropriate motive means and appropriate sensors (not shown) for signalling open and closed conditions of jaws 992.

Figure 28:
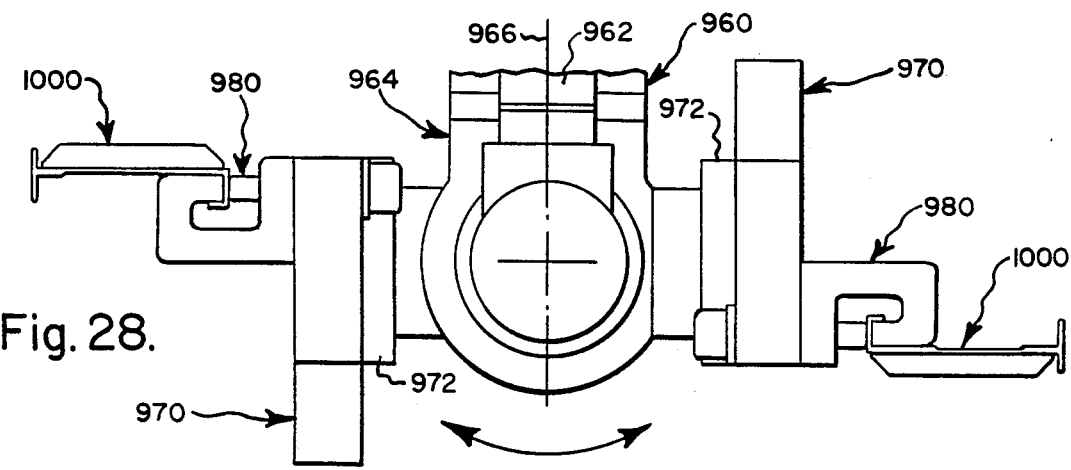
FIG. 28 is a view similar to FIG. 27 illustrating grasping of a finished assembly.
Figure 29:
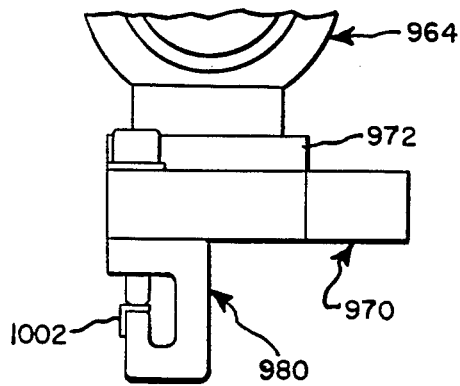
FIG. 29 is a fragmentary view similar to FIG. 27 illustrating grasping of a detail.
Figure 30:
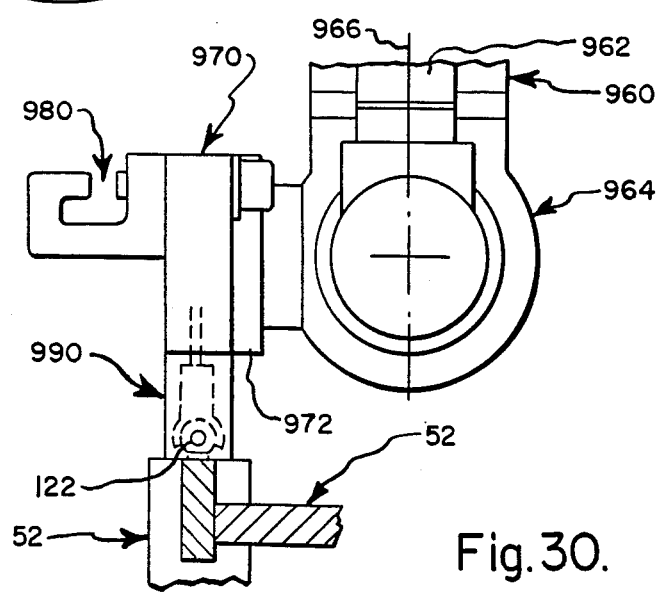
FIG. 30 is a view similar to FIG. 27 illustrating grasping of a knob of a clamp assembly and positioning unit.

FIG. 28 illustrates how the clamps hold a finished assembly, generally designated 1000, and further illustrates travel of the end effector 970 about the wrist 964 through 180° of rotation. FIG. 29 illustrates how a clamp holds a detail 1002, for example a reinforcement. FIG. 30 illustrates how gripper 990 grasps knob 122 of a clamp assembly and positioning unit 52.

Figure 32:
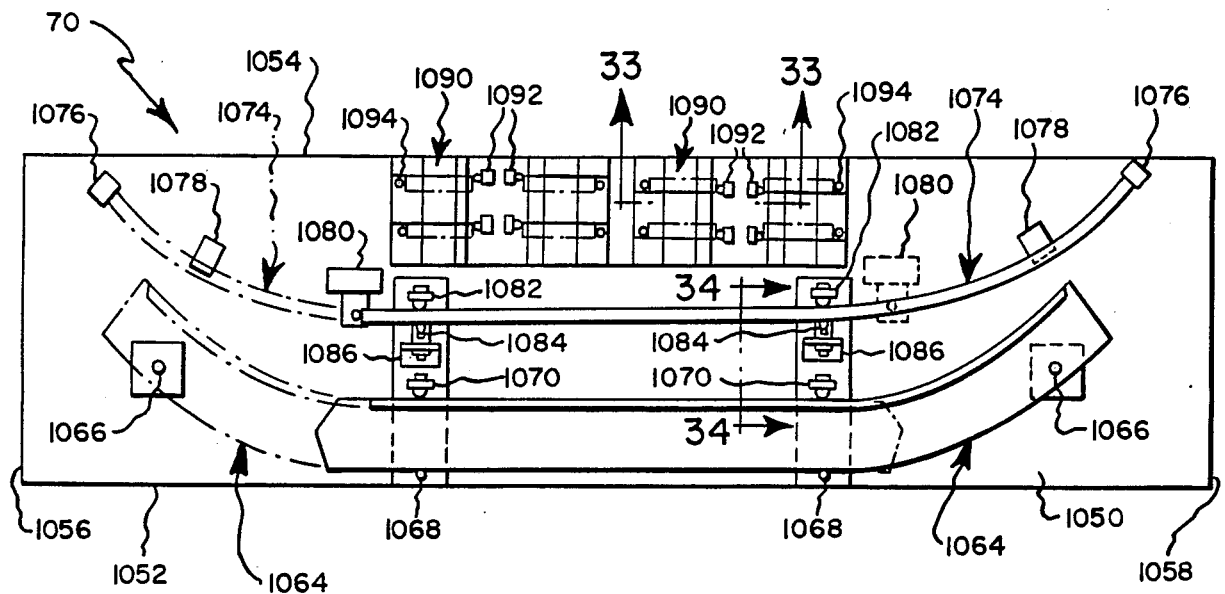
FIG. 32 is a top plan view of one of the transport means or kitting trays of the cell of FIG. 1.
Figure 33:
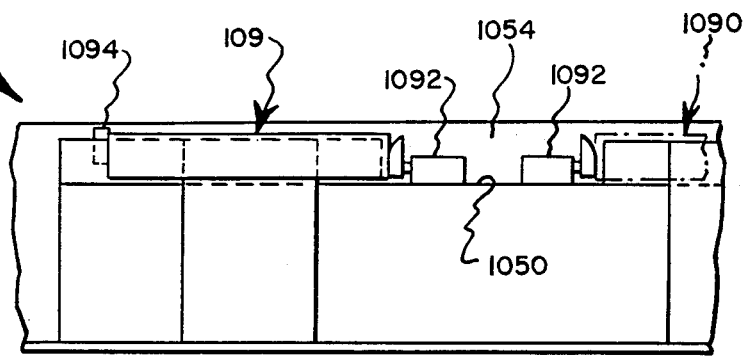
FIG. 33 is a fragmentary elevational view taken about on line 33—33 in FIG. 32.
Figure 34:
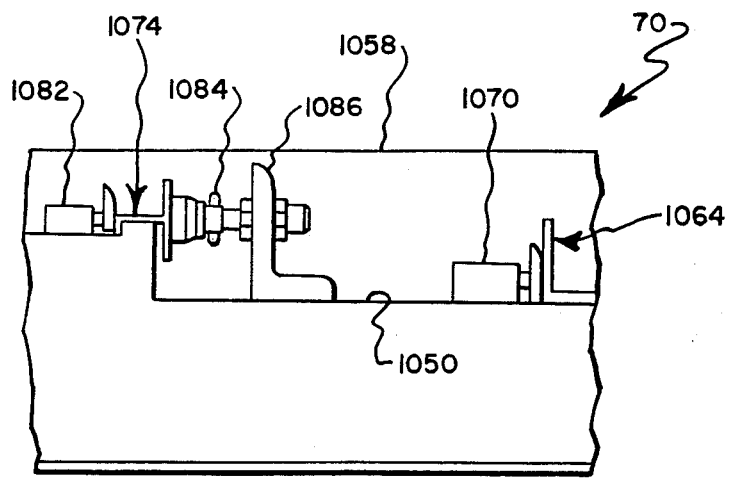
FIG. 34 is a fragmentary elevational view taken about on line 34—34 in FIG. 32.

FIGS. 32–34 illustrate in further detail one of the transport means or kitting trays 70 shown in FIG. 1. Each kitting tray 70 is designed to locate all details of an assembly in defined positions for automatic quality assurance and for loading of the fixture banks by the corresponding robots. Each kitting tray is designed to handle all assemblies associated with a particular family; however, only one set of details for one particular assembly will ever be in the tray 70 at any instant in time. As shown in FIGS. 32–34 tray 70 includes a base 1050, upstanding sidewalls 1052, 1054 and upstanding end walls 1056, 1058. The details are located and held in tray 70 at defined positions by various means. As shown in FIG. 32, for example, detail 1064 is located by a combination of one of a pair of end locating pins 1066 projecting from and at right angles to base 1050, intermediate pins 1068 contacting one side edge of detail 1064 and spring stops 1070 engaging the opposite side edge of the detail. Pin 1066 extends into an opening near one end of detail 1064, intermediate pins 1068 project upwardly at right angles to base 1050 and engage the edge of detail 1064, and spring stops 1070 are mounted on base 1050. Detail 1064 shown in solid lines in FIG. 32 is a right-handed version; detail 1064 shown in broken lines in FIG. 32 is a left hand version and receives the other locating pin 1066.

By way of further illustration, another detail 1074 is located by a combination of one of a pair of end stops 1076 which abuts an end of detail 1074, a pair of rest pads 1078 which contact detail 1074 inwardly on the flange thereof to support it, and one of a pair of end pin locators 1080 which engage detail 1074 on the end opposite the end thereof contacted by end stop 1076. There is also provided a pair of spring stops 1082 similar to spring stops 1070 which contact one side or edge of detail 1074 and a pair of rest pins 1084 which contact the opposite side or edge of the detail. As shown in FIG. 34, rest pins 1084 are carried by brackets 1086 which are fixed to the base 1050 of tray 70. Detail 1074 shown in solid lines in FIG. 32 is a right-handed detail; detail 1074 shown in broken lines is a left-handed version which requires removal of the end pin locator 1080 from the left-hand portion of tray 70 and transfer to the right-hand portion of tray 70. By way of further illustration, additional details in the form of angle members 1090 are located on tray 70 in a group including eight such details in the present example. Each angle member 1090 is located by a spring stop 1092 engaging one end of the member and locating pin 1094 engaging the opposite end of the member as shown also in FIG. 33. Each pin 1094 is similar to pin 1066 and each spring stop 1092 is similar to spring stops 1070.

The foregoing arrangement of details 1064, 1074 and 1090 is merely illustrative by way of example and different numbers, kinds and relative locations of details can be provided on the kitting trays 70. In the foregoing manner, the location of each detail in a kitting tray 70 can be defined for a particular assembly to allow for automatic quality assurance or robotic pick up. Inserting the details in association with fixed stops in tray 70 insures defined positions in the tray, and the spring loaded retainers insure easy loading and removal of details while at the same time preventing the details from shifting. The kitting trays 70 transport the details on conveyor 66 into the assembly cell in the specified positions and then recycle under the conveyor 66 to the head of the line as shown in FIG. 1 for reloading. In this manner, only a relatively small number of kitting trays 70, for example seven, is required for any family of assemblies.

The system of the present invention operates in the following manner. The operation of cell 10 shown in FIGS. 1–3 begins by following the entry of a particular set of details for assembly into the cell. In this particular instance an individual worker 74 is positioned at the load station 76. This individual could be replaced by a robot for detail loading or by an interchange station for handling pre-kitted details from an automatic storage and retrieval system. In the present illustration a person is employed because while the system is running, he can perform such multiple functions as filling automatic fastener selection systems on the fastening machines 16, 18 with fasteners, loading details, checking, tool changes, routine maintenance, lubrication, etc., in addition to performing the function of loading individual details.

The operator 74 loads tray 70 by picking up each single component or detail for a particular assembly, identified by a magnetic or a printed bar code. He scans the bar code on a particular detail before loading it into tray 70, and that reading is sent to the cell controller 84 which is controller 1038 in the arrangement of FIG. 31. The cell controller 84, in turn, interprets that reading as assembly 44, for example, and it downloads the proper programs to the robot 61, 62 and to the control on the automatic fastening machine 16. The robot 61, 62, then, would enter the area and start to reposition all the clamps on fixture 20 as required to satisfy that particular assembly. The manner in which fixture clamps are positioned will be described in detail presently. The bar coding operation also performs another function. As the person reads the bar code on the individual details, he automatically keeps inventory control on all details and assemblies. The cell controller 84 has the capability of keeping track of operations in the cell 10 in real-time, synchronizing and optimizing equipment utilization, and identifying which details and assemblies are being assembled. In addition, through bar coding the cell controller 84 provides a double check to insure that all the proper details have been loaded into the kitting tray 70 for that particular assembly. This information would be flashed up on monitor 80 adjacent to the operator, allowing for immediate correction of the error detail and replacement with the proper detail.

While the robot 61, 62 is occupied positioning the fixture clamps in fixture 20, the conveyor 66 would index from the load station 76 to the first station outside the cell i.e. to the left of cell 10 as viewed in FIG. 1. Here an automatic quality assurance system (not shown in FIG. 1), such as a coordinate measuring machine or other means, will automatically perform the first quality control operation on the individual details that are loaded in the kitting tray 70. The quality assurance operation would inspect for errors or defects within the details themselves, bent flanges, out-of tolerance dimensions, etc. This automatic quality assurance operation determines that all the required details are present in the kitting tray 70 and that they are within the predetermined tolerances necessary for acceptable assembly prior to entering the actual cell. Once this initial quality control operation has taken place, the conveyor 66 indexes into the first station in cell 10 adjacent to fixture 20. Prior to the loading of individual details into the fixture, another automatic quality assurance system (not shown in FIG. 1) inspects the fixture 20 for proper positioning according to CAD/CAM fixture data generated for the assembly in question. Upon verification of fixture position, the robot 61, 62 individually picks up details from the kitting tray 70, transports them into the fixture area, and begins loading them in proper sequence. This fixture loading program is downloaded from the cell controller 84, which maintains a complete family data base of programs for the robot 61, 62 and for the control on the fastening machine 16. The robot 61, 62 continues to pick and place details into the fixture 20 until the fixture is completely loaded. Upon completion of fixture loading, another automatic quality assurance inspection of the clamped assembly in the fixture is performed and verified against the CAD/CAM assembly data generated for the assembly in question. This is done prior to any fastening operation. If there were an error in positioning, or a detail was incorrect, this inspection action would initiate immediate corrective measures through the controller 84 via a visual or audible signal to the cell operator 74. Given this precise inspection of key part interface points with higher follow-on assemblies, the CAD/CAM and automatic dimensional checking will virtually assure that further assemblies will mate properly.

The loading of individual details into fixture 20 will be illustrated in further detail by the following examples. The program downloaded from controller 84 to robot 61, 62 tells the robot where the details are presently located in kitting tray 70, where they belong in fixture 20, which sequence must be used for their installation in fixture 20 and which clamps in fixture 20 must be engaged to hold the details in position during assembly. The following sequence occurs for loading two angles, for example angles detail 96 shown in FIGS. 4 and 5. Robot 61, 6 moves rapidly from the workstation area to kitting tray 70 and the angle pick-up position therein, lowers rapidly to a height of about 2 inches above an angle, for example one of the details 1090 in FIG. 32, then moves sideways to pick up an angle. The end effector clamp 980 of FIGS. 26-30 is engaged to grasp the angle and the robot 61, 62 moves slowly to retract the angle from the tray. The grasping of an angle in the end effector clamp 980 is illustrated in FIG. 29. Robot 61, 62 then moves sideways slowly to pick up the second angle. The other end effector clamp 980 is engaged to grasp this angle and the robot 61, 62 moves slowly to retract the second angle from tray 70. Robot 61, 62 rotates the end effector and then moves upwardly and then horizontally at a fast speed into position adjacent fixture 20. Then robot 61, 62 moves more slowly to place the second angle into position on the appropriate one of the angle clamps in fixture 20. At this point the lower clamp jaw is up and the upper clamp jaw open. Robot 61, 62 places the angle into the clamp, the upper clamp jaw is closed, the end effector clamp 980 then is disengaged and robot 61, 62 moves at medium speed to a position away from fixture 20. The end effector is rotated quickly, robot 61, 62 moves at medium speed to another clamp on fixture 20 for the fist angle, and the lower clamp jaw corner up and the upper jaw opens. Robot 61, 62 places the angle into the clamp, the upper jaw is closed, the end effector clamp 980 is then disengaged and robot 61, 62 moves at medium speed to a position away from fixture 20 where it is ready for the next operation.

The following sequence occurs for loading a web detail, for example web 92 shown in FIGS. 4 and 5. Robot 61, 62 moves rapidly from the workstation area to kitting tray 70 and the web pick-up position therein, rotates end effector to the proper position during this movement, and then lowers rapidly to a height of about 2 inches above a web, for example detail 1064 shown in FIG. 32. Robot 61, 62 then lowers further slowly to pick up the web, engages the end effector clamp 980 on the web, moves slowly upwardly about 2 inches and then moves at medium speed to fixture 20. Robot 61, 62 moves the web into position slowly toward the appropriate web clamp on fixture 20, installs the web on clamp tooling pins, for example pin 874 shown in FIG. 23, disengages the end effector clamps 980 and then moves slowly away from the web to a position spaced from fixture 20 where it is ready for the next operation.

The following sequence occurs for loading a tee detail, for example tee 94 shown in FIGS. 4 and 5. Robots 61, 62 moves rapidly from the workstation area, rotating the end effector and arrives over kitting tray 70 and the tee pick-up position therein whereupon it lowers slowly to pick up a tee, for example detail 1074 shown in FIG. 32. The end effector clamps 980 are engaged on the tee, robot 61, 62 moves slowly to a height of about 2 inches and then moves at medium speed to fixture 20. Then robot 61, 62 moves slowly to position the tee on appropriate tee clamps of fixture 20. At this point the lower clamp jaws are up and the upper clamp jaws open. The tee is placed on the clamp, the upper jaws closed to engage the clamps, and end effector clamps 980 are disengaged. Then robot 61, 62 moves slowly away from the tee to a position spaced from fixture 20 where it is ready for the next operation.

The foregoing illustrative sequences can also be carried out by robot, 61, 62 with fixture 20'. Similarly, these same sequences can be carried out by robot 61, 62 or by robot 63, 64 with fixtures 20" and 20'" in the cell 10 of FIG. 1. As previously explained, the number of fixtures and robots is illustrative and can vary depending upon the assembly operations being performed.

Once all the details are loaded into fixture 20 and inspected, the fastening machine 16 would move into position and start, through its computer numerical control, to automatically install all the required fasteners in the individual details, completing an assembly. The robot 61, 62, in turn, would transfer to the next fixture 20' and position the fixture clamps as determined by the next assembly at the load station 70. The manner in which the clamps are positioned will be described in detail presently.

Upon completion of fastener installation in the first workstation 12 (riveter 16 and fixtures 20 and 20'), the robot 61, 62 would pick up the assembly, transfer it downline to workstation 14 (riveter 18 and fixture 20" and 20'''), and load the assembly into the fixtures 20" or 20''' for final fastener installation. The clamps of fixture 20" or 20''' have already been repositioned and quality assurance inspected exactly as described previously. The automatic quality assurance inspection of the fixture and the assemblies, prior to any fastening operation, ensures that everything is in the proper dimensional position. Again, its is all done through direct comparison to a predetermined CAD/CAM data. The foregoing sequence is, of course, illustrative and can vary depending upon the assembly operations being performed.

Upon completion of the loading operation in workstation 12, the robot 61, 62 goes about other duties, such as readjusting other fixture clamps, or picking, loading, or transferring other details and assemblies. The riveter 18 then moves in and installs the final fasteners. Once the fastener installation is completed, robot 63, 64 transfers the assembly over to a finished storage and quality control area. Here a final automatic quality assurance operation takes place on the finished assembly to determine that the assembly is within specifications. The assembly is then placed in a storage rack for transportation to the final assembly area. The organization of the workstations 12, 14 and the sequence of operations described is illustrative and can change depending upon the assembly operations being performed.

The cell 10 according to the present invention has the capability of accepting processing of assemblies in either batch-lot quantities or ship-set quantities. Due to the time required for fixture reconfiguration, fixture inspection, assembly inspection, etc. the ship-set assembly operation is by far the most time consuming. However, even considering the extra time required for ship-set processing, the cell 10 of the present invention is capable of drastically reducing production time. By way of example, concerning the particular families an illustrative cell was designed to assemble, the average conventional assembly time of 9.27 hrs. per assembly for set up and run has been cut to an average of 17.5 min. per assembly, or a savings of 97% of the conventional assembly time.

With the basic configuration and operation of a typical programmable or flexible cell 10 of the present invention having been described, the individual details of the system and the operation thereof now will be described. The illustrative arrangement of FIG. 4 as previously described includes several major items: two fixture bases 56a and 56b each supporting the multiple fixture clamp positioning units 90 and their respective holding means 54, all anchored to the fixture mounting table 60 by adjustable support arms 58. The support arms 58 are anchored to the fixture mounting table 60 through a set of gibs and ways with automatic clamps. Each is equipped with the tooling balls 132 for robotic positioning of the fixture base. This allows for complete flexibility to automatically position the fixture bases to different assemblies, for example varying airframe curvatures. A typical airframe 44 is shown clamped into position in FIG. 4. Fixture base 56a has been positioned to allow the fixture clamps to conform more readily to the curvature of the assembly 44. Each individual fixture clamp positioning unit 90 is independently adjustable through three axes along the fixture base: "X" axis longitudinally along the fixture base, "C" axis rotationally, and "Y" axis for extension. This provides total fixture flexibility and enables matching of the clamp positions to the shape or curvature of the details.

The programmable fixture bank is supported by the fixture mounting table 60 as previously described, the table 60 rigidly secured to the floor 23 within the cell 10, in a position readily accessible to the automatic fastening machines 16, 18, and table 60 is servo-motor driven for "Z" axis variation and also controlled through the riveter controls to compensate for the variation in workline of assemblies due to material stack-up.

The fixture clamp positioning units 90 and their associated end effectors or clamp assemblies 54 are the heart of the programmable or flexible fixture of the present invention. All fixture clamp positioning units 90 within the system are modular in design and identical up to the end effector or clamp assembly 54 mounting manifold 550 shown in FIG. 10. The end effectors or clamp assemblies 54 are varied to suit the required assembly task. The fixture clamp positioning units 90 are designed to be adjustable in three axes, "X", "C", and "Y". The end effector 970 of the robot 61, 62 or 63, 64 grasps the two tooling balls 120 on the positioner base 112, signals the release of the "X" and "C" axis clamp 374 shown in FIGS. 10, 14 and 15, and through a positioning program moves the positioner base 112 longitudinally along fixture base 56 and rotationally to the required position. Once in position, the robot signals the "X" and "C" axis clamp 374 to engage, locking the positioner base 112 to the fixture base rails with suitable force, for example 1200 lbs. The robot end effector 970 then grasps the tooling ball 122 signals the release of the "Y" axis clamp, and through a positioning program, moves the "Y" axis arm or bar perpendicularly to the "X" axis centerline of the positioner base 112, to the required position. Then the robot signals the "Y" axis clamp 504 to engage, locking the fixture clamp positioning arm 110 into position with suitable clamp force, for example about 1200 lbs.

The foregoing will be illustrated in further detail by the following example. The positioning program downloaded from controller 84 to robot 61, 62 provides the robot with "X", "C" and "Y" positioning information for each clamp positioning unit 90 of fixture 20 as determined by the particular detail which is to be held in fixture 20. In other words, for each individual detail to be held in fixture 20 there will be different "X", "C" and "Y" positioning information for each clamp positioning unit 90 which is provided to robot 61, 62. The following sequence occurs for adjusting one of the clamp assembly and positioning units 90, it being understood that the same sequence is followed for adjusting the other units 90 of fixture 20.

Robot 61, 62 moves rapidly to a position over the "Y" axis tooling pin 122 of unit 90 shown, for example, in FIGS. 4 and 5. The gripper 990 or robot end effector 970 is opened and then lowered slowly by robot 61, 62 onto pin 122 whereupon gripper 990 is closed. This is signaled to the system control which causes unlocking of the "Y" axis clamp 504. Then robot 61, 62 moves traverse bar 110 longitudinally in a specified forward or backward direction by a specified amount determined by the "Y" axis information in the positioning program. The system control then locks "Y" axis clamp 504, gripper 990 opens, robot 61, 62 moves end effector 970 into position where gripper 990 and a companion gripper (not shown) are on the "X" and "C" axis tooling pins 120 whereupon the grippers 990 are closed upon the pins 120. This is signaled to the system control which causes unlocking of the "X" and "C" axis clamp 374. Then robot 61, 62 moves positioner base 112 along fixture base 56 longitudinally in a specified forward or backward direction by a specified amount determined by the "X" axis information in the positioning program. Robot 61, 62 also rotates base 112 about an axis perpendicular to fixture base 56 in a specified angular direction by a specified amount determined by the "C" axis information in the positioning program. The system control then locks the "X" and "C" axis clamp 374, grippers 990 are opened, end effector 970 is raised and then robot 61, 62 moves to a position over the "Y" axis tooling pin 122 of the adjacent or neighboring positioning unit of fixture 20 whereupon the foregoing sequence is repeated.

Thus the foregoing sequence is repeated for each of the positioning units 90 on fixture 20, for example the seven units 90 on the illustrative fixture 20 shown in FIG. 4. There will be specific "X", "C" and "Y" information corresponding to each unit. Furthermore, the same sequence is followed by robot 61, 62 operating on fixture 20' and by robot 61, 62 or robot 63, 64 operating on fixtures 20'' and 20'''.

The modular design of the fixture clamp positioning units 90 provides a base for a multitude of modular designed end effectors or clamp assemblies. Each individual end effector or clamp assembly will be designed to mate with the clamp assembly mounting manifold 550 of each fixture clamp positioning unit 90. This provides flexibility for changing and interchanging clamp assemblies, as required, to match the varied configurations of multiple assemblies.

When installation of fasteners is to begin, all the individual details are clamped and rigid in their positions in fixture 20. When installing a sequence of fasteners it is apparent that there will be an interference as to some fasteners with the clamp assembly. After installing the row of fasteners up to the clamp the detail will be firmly held in position. In order to install the next fasteners the clamp assembly releases the detail and swings out of position. The riveter 16 then installs the remaining fasteners and the clamp assembly swings back up and reclamp the detail to support the assembly. Considering the number of fixture clamps in a particular fixture bank, there is more than enough capacity to hold individual details and the assembly. It should be noted that individual details, such as the tee, web, and reinforcing angles, are not pretacked. They are positioned in the fixture 20 as loose details, clamped in position, and all fasteners that are installed are machine installed, highquality fasteners. There is no pretacking, no predrilling, no Cleco clamps, or Kado marks associated with manual assembly. When necessary, assemblies can be automatically machine tacked before final riveting to maintain final assembly dimensional adherence.

As previously described, the following functions are performed during a typical cycle of operation of cell 10. Details are loaded into kitting tray 70 by operator 74, the loaded tray 70 is moved by conveyor 60 to an inspection station wherein the details in tray 70 are inspected, kitting tray 70 then is moved to the load station by conveyor 60, details are loaded into fixture 20 by robot 61, 62, the loaded fixture 20 is inspected the assembly in fixture 20 is riveted up by machine 16, the assembly is moved by robot 61, 62 from fixture 20 associated with machine 16 to fixture 20'' associated with machine 18, the assembly in fixture 20'' is riveted up by machine 18, the cycle holds while robot 61, 62 performs interface functions, the fixture 20'' is unloaded and the assembly is rotated 180° and reloaded into fixture 20'' by robot 61, 62, final riveting of the assembly is done by machine 18, the fixture 20'' is unloaded and the assembly moved to final quality control by robot 61, 62, after unloading the assembly robot 61, 62 moves to fixture 20 and the clamps in fixture 20 then are adjusted by robot 61, 62 to receive the next detail. The foregoing sequence is of course illustrative and may change depending upon the nature of the assembly operations being performed.

Several of the functions mentioned above have been described in detail previously, such as loading details into the fixture and adjusting the clamps. The function of moving the assembly from machine 16 to machine 18 is performed in the following manner. Robot 61, 62 moves rapidly to a location almost two inches above fixture 20 at workstation 12, the robot 61, 62 having been adjusting clamps on fixture 20'' in workstation 14. Robot 61, 62 then lowers end effector 970 slowly and engages clamps 980 on the assembly to grasp the same, slowly raises end effector 970 carrying the assembly to a level about two inches above fixture 20, and then travels rapidly to a location about two inches above fixture 20'' at workstation 14. Robot 61, 62 then lowers the assembly slowly onto tooling pins on the fixture clamps, opens end effector clamps 980 to release the assembly, slowly raises and effector 970 to a level about two inches above fixture 20'' and then returns rapidly to workstation 12.

The function of unloading fixture 20'', rotating the assembly 180° and reloading the assembly into fixture 20'' is performed in the following manner. Robot 61, 62 moves rapidly to a location about two inches above fixture 20'' at workstation 14, the robot 61, 62 having been adjusting clamps on fixture 20 in workstation 12. Robot 61, 62 then lowers end effector 970 slowly and engages clamps 980 on the assembly to grasp same, slowly raises end effector 970 carrying the assembly to a level about two inches above fixture 20'' and then moves rapidly to a location spaced from fixture 20''. Robot 61, 62 then rotates end effector 970 about the axis 968 as illustrated in FIG. 28 at a rate of about 30 degrees/sec. whereupon robot 61, 62 returns rapidly to a location about two inches above fixture 20''. Robot 61, 62, then lowers the assembly slowly onto tooling pins on the fixture clamps, opens end effector clamps 980 to release the assembly, slowly raises end effector 970 to a level about two inches above fixture 20'' and then moves rapidly to hold position away from fixture 20''.

The function of unloading fixture 20'' and moving the assembly to storage is performed in the following manner. Robot 61, 62 moves rapidly from the above-mentioned hold position to a location about two inches above fixture 20'' at workstation 14. Robot 61, 62 then lowers end effector 970 slowly and engages clamps 980 on the assembly to grasp same, and slowly raises end effector 970 carrying the assembly to a level about two inches above fixture 20''. Robot 61, 62 then moves rapidly to a location about two inches above a finished assembly rack (not shown) at or near the unloading zone 82. Robot 61, 62 then lowers the finished assembly slowly onto the rack, opens end effector clamps 980 to release the assembly, slowly raises end effector 970 to a level about two inches above the rack and then returns rapidly to workstation 12.

The typical cycle of operation of cell 10 previously outlined can be performed by the assembly through fixtures 20 and 20" or through fixtures 20' and 20'''. In either case the cell 10 continues to be loaded with new details as the finished assemblies are released. The following sequence depicts the movements of robot 61, 62 between release of finished assemblies from cell 10 with the assembly being run through fixtures 20 and 20". The robot 61, 62 first travels to fixture 20' and holds until completion of inspection of fixture 20'. Then the robot loads details into fixture 20' and when finished travels to fixture 20''' whereupon it adjusts the positioning units and hence the clamps on fixture 20'''. When finished the robot travels to fixture 20 and holds until riveting of the assembly in fixture 20 is completed. Then robot 61, 62 picks up the assembly in fixture 20 and travels to fixture 20" and loads the assembly into fixture 20". The robot returns to fixture 20, adjusts the positioning units and hence the clamps on fixture 20 and then travels to fixture 20". The robot flips over or inverts the assembly in fixture 20", holds at that fixture until the second stage of riveting is completed, and then picks up the assembly in fixture 20" and carries it to the finished assembly storage area.

The following sequence depicts the movements of robot 61, 62 between release of finished assemblies from cell 10 with the assembly being run through fixtures 20' and 20'''. The robot 61, 62 first travels to fixture 20 and holds until completion of inspection of fixture 20. Then the robot loads details into fixture 20 and when finished travels to fixture 20" whereupon it adjusts the positioning units and hence the clamps on fixture 20". When finished the robot travels to fixture 20', picks up the assembly in fixture 20', travels to fixture 20''' and loads the assembly into fixture 20'''. Next the robot 61, 62 returns to fixture 20', adjusts the positioning units and hence the clamps on fixture 20' and when finished travels to fixture 20'''. The robot flips over or inverts the assembly in fixture 20''', holds at that fixture until the second stage of riveting is completed, and then picks up the assembly in fixture 20''' and carries it to the finished assembly storage area.

By way of further example, the following is a typical operational cycle for one of the robots, for example robot 61, 62. The robot first adjusts the clamp positioning units 90 on fixture 20, then travels to fixture 20" where it performs the flipping over or 180° rotation of the assembly in fixture 20" and then moves to the holding location near fixture 20" during second stage riveting. Next, robot 61, 62 picks up the finished assembly from fixture 20" and transports it to the finished assembly storage area 82 whereupon the robot travels to fixture 20 and waits until inspection of the adjusted positioning units 90 in fixture 20 is completed. Then robot 61, 62 loads details from the kitting tray into fixture 20 and when finished travels to fixture 20" and adjusts the clamp positioning units 90" on fixture 20". Next, robot 61, 62 travels to fixture 20', picks up the riveted assembly in fixture 20', transports the assembly to fixture 20''' and loads the assembly therein. Then the robot 61, 62 travels to fixture 20', adjusts the clamp positioning units 90' on fixture 20', adjusts the clamp positioning units 90' on fixture 20', travels to fixture 20''', performs the flipping over or 180° rotation of the assembly in fixture 20''' and then moves to a holding location near fixture 20''' during second stage riveting. Next, robot 61, 62 picks up the finished assembly from fixture 20" and transports it to the finished assembly storage area 82 whereupon the robot travels to fixture 20' and waits until inspection of the adjusted positioning units 90' in fixture 20' is completed. Then robot 61, 62 loads details from the kitting tray into fixture 20' and when finished travels to fixture 20''' and adjusts the clamp positioning units 90''' in fixture 20'''. Next, robot 61, 62 travels to fixture 20, waits until riveting of the assembly in fixture 20 is completed, picks up the riveted assembly in fixture 20, transports the assembly to fixture 20" and loads the assembly therein. The robot 61, 62 then returns to fixture 20 and begins the foregoing sequence again. The foregoing is of course illustrative, and the nature and sequence of the various operations can change depending upon the nature of the assembly operations being performed.

The flexible fixture 20 of the present invention advantageously provides a link between the factory CAD/CAM system and the shop floor so that tooling can be changed to handle different details or parts in a cost effective manner. In order to facilitate determination of the proper fixture, standard clamp or end effectors as previously described are provided, and the fixture according to the present invention may be viewed as a modular base system to accommodate many families of details or parts. In particular, the flexible fixture is characterized by a modular design including clamp, base, upper clamp holder and a holder surface plate which can accommodate a variable number of clamps. Each of the devices can be positioned in "X", "Y" and "C" axis of rotation as required. The lower base is made up of clamp base, "Z" axis and floor mount. In this manner, all angles and dimensions of a detail or part can be accommodated.

Fixture programming can be done during the actual layout of clamps against the parts or detail whereby the designer or person applying the standard clamps to parts or details will take into account such factors as stack thickness, tooling holes used for positioning if available, and riveter clearance and accessibility. Related to this is the family identification process in which is included the evaluation of cell applicability and definition; that is, segregating parts or details into family members from drawing packages and proceeding through step-by-step evaluating process, from receipt of drawings, to engineering of cell configuration determination, to the work station selection from the set of previously defined standard work stations, to the actual programming of fixtures, and to part loading and kit design.

It is contemplated that the fixtures 20 according to the present invention be programmed on a CAD system. A standard selection of fixture modules will be selectable from a menu or touch tablet by the CAD user or designer. The clamps will be positioned by this designer at appropriate hold down and locating points on the detail or part, which will be also outlined on the CAD screen. Having positioned these clamps on the screen, and after minor design changes to the clamps, if necessary, to fit the part, the programming is ready to begin. At this point all positions, coordinates of part and clamps, are known on CAD systems. Using CAM software, these data points can be translated into position moves for the robot. If because of nonavailability or lack of cost benefit CAM is not used, then teach mode, manual data input, or a combination of the two can be used from the CAD generated dimensional drawing. After programming, the data can be sent by tape, DNC, or other means to the cell controller and, as required, downloaded to the equipment function controllers.

The present invention is illustrated further the following example. A programmable or flexible fixture according to the present invention was constructed for test purposes as shown in FIG. 35. It is the same as fixture 20 of FIG. 4, and for convenience in description the seven clamp assembly and positioning units are identified by the numbers 1-7. Units 1, 3 and 6 are on one fixture base section B1 and units 2, 4, 5 and 7 are on the other fixture base section B2. The fixture base sections, in turn, are each fixed to a pair of support arms A extending from a fixture mounting table T as in the fixture 20 of FIG. 4. Units 6 and 7 include "K" hole or web type clamps as shown in FIG. 23, units 3, 4 and 5 include tee clamps of the type shown in FIG. 19 and units 1 and 2 include angle clamps of the type shown in FIG. 24. A GCA Corporation (Cimcorp Inc.) XR6050M 6 axis gantry robot with GCA (Cimcorp Inc.) CIMROC II controller as previously described was used in the test, the robot having an end effector as shown in FIGS. 26-30. In the test set-up or cell, the tracks extend parallel to the side edges of table T, i.e. horizontally as viewed in FIG. 35, and the bridge beam carrying the robot extends perpendicular thereto. Along one side of the cell, i.e. along the far side of table T remote from the clamps, an hydraulic power unit and control valve panel was located which will be described. Along the opposite side of the cell three assembly and support tables were provided which will be designated Tables I, II and III. Table I is for a complete assembly designated M, table II is for details, i.e. webs, angles and tees, and table III is for another complete assembly designated N. Assemblies M and N are complete airframe assemblies, from the same family of assemblies, but dimensionally different. The details comprise one set of individual details associated with assembly M.

In performing the test, a combination of teach mode and manual data input was used to instruct the robot in programming the fixture and picking and placing details and assemblies into the fixture. The test was designed to perform the following operations:

1. The robot will start at a "Home" position, move to the fixture and adjust the clamps into position for assembly N.
2. As each fixture clamp positioning unit is brought into position it will lock-up on the fixture base B1, B2.
3. When the fixture is totally re-configured, the robot will move to Table III and pick up assembly N and move it to the fixture clamps.
4. When the assembly is in position, the clamps will engage.
5. The robot will release the assembly and move to a "home" position, leaving the fixture holding the assembly.
6. The robot returns to the fixture, grasps assembly N, releases the clamps, and returns the assembly to Table I.
7. The robot moves to the fixture and repositions the fixture clamp positioning units to the configuration required for assembly M.
8. As each fixture clamp positioning unit is brought into position it will lock-up on the fixture base B1, B2.
9. Each axis associated with the fixture clamp positioning unit "X", "C" and "Y" will be dynamically moved during this re-configuration operation.
10. When the fixture is totally re-configured, the robot will move to Table III and pick up assembly M and move it to the fixture clamps.
11. When the assembly is in position, the clamps will engage.
12. The robot will release the assembly and move to a "home" position, leaving the fixture holding the assembly.
13. The robot returns to the fixture, grasps assembly M, releases the clamps and returns the assembly to Table I.
14. The robot traverses to Table II while initiating a 180° roll.
15. After picking up two reinforcement angles associated with assembly M, the robot returns to the fixture while exercising all six of the robot's axes.
16. As each reinforcement is brought into the proper position, the clamps swing up into position and clamp the details.
17. The robot returns to Table II and grasps the web detail associated with assembly M.
18. Returning to the fixture, the robot loads the web onto the tooling pin clamps, and engages them to firmly hold the web into position.
19. Releasing the web, the robot returns to Table II and grasps the tee detail associated with assembly M.
20. The robot returns to the fixture and loads the tee into the locating clamps, and engages them to firmly clamp the tee into position.
21. Releasing the tee, the robot moves to a "home" position, leaving the fixture holding the details.
22. Returning to the fixture, the robot systematically returns the individual details to Table II.
23. The robot repositions itself above the fixture in the "Home" position, ready to start the cycle at operation no. 1.

As previously described, each of the clamp assembly and positioning units includes a number of clamps which are involved in various functions, and each is operated by an actuator or similar motive means under control of a solenoid operated valve controlling operating fluid, air or hydraulic, to and from the actuator or motive means. The solenoids are represented diagrammatically in FIG. 36 and arranged according to the associated clamp assembly and positioning units 1-7 of FIG. 35. Accordingly, the groups of solenoids in FIG. 36 are identified by the large numbers 1-7 corresponding to the units 1-7 of FIG. 35. In the arrangement of FIG. 36 each group includes eight solenoids identified by a number, followed by the letters HA or HB, followed by another number. The number and letters indicate the function controlled or performed by the valve associated with the particular solenoid as will be described. Each solenoid is connected by an electrical line, for example line L leading from solenoid 1HB-3 in group 3, to a terminal block in one of two groups TB1 and TB2 in an electrical control panel.

The functions controlled by the various solenoids are set forth in the table of FIG. 37. In FIGS. 36 and 37 the letters A and B correspond to the two states of a valve, i.e. open and closed, controlled by the indicated solenoids. Solenoids 1HA and 1HB operate the valve which controls the clamping and unclamping, respectively, of the "X" clamp of each unit 1-7, i.e. cylinder 406 for moving cam 394 to move clamp 374 between clamped and unclamped positions as previously described in connection with FIGS. 10-18. Solenoids 2HA and 2HB operate the valve which controls the clamping and unclamping, respectively, of the "Y" clamp, of each unit 1-7, i.e. cylinder 514 for moving cam 504 between clamped and unclamped positions as previously described in connection with FIGS. 10-18. Solenoids 3HA and 3HB operate the valve which controls the gripping and releasing of the angle details by the clamps on units 1 and 2, i.e. cylinder 930 for moving jaw 916 toward and away from arm 912 as previously described in connection with FIGS. 24 and 25. Solenoids 4HA and 4HB operate the valve which controls the rotary motion of arm 912 up and down of the angle clamps on units 1 and 2, i.e. rotary actuator 636" for moving arm 912 between up and down positions as previously described in connection with FIGS. 24 and 25. Solenoids 5HA and 5HB operate the valve which controls movement of the bottom or lower jaw between clamped and unclamped positions in the tee clamps on units 3, 4 and 5, i.e. rotary actuator 636 for moving jaw 702 between clamped and unclamped positions as previously described in connection with FIGS. 19-22. Similarly, solenoids 6HA and 6HB operate the valve which controls movement of the top or upper jaws between clamped and unclamped positions in the tee clamps on units 3, 4 and 5, i.e. rotary actuator 634 for moving jaw 700 between clamped and unclamped positions as previously described in connection with FIGS. 19-22. Solenoids 7HA and 7HB operate the valve which controls movement of the bottom or lower jaw between clamped and unclamped positions in the web clamps on units 6 and 7, i.e. rotary actuator 636' for moving jaw 842 between clamped and unclamped positions as previously described in connection with FIG. 23. Similarly, solenoids 8HA and 8HB operate the valve which controls movement of the top or upper jaw between clamped and unclamped positions in the web clamps on units 6 and 7, i.e. rotary actuator 634' for moving jaw 840 between clamped and unclamped positions as previously described in connection with FIG. 23. Solenoid 9H which is located on a hydraulic power unit operates a valve for pressurizing the system.

The groups of terminal blocks TB1 and TB2 are shown in detail in FIGS. 38 and 39. The terminal blocks in group TB1 are identified as TB1-1, TB1-2 etc. up to TB-60. Each terminal block is associated with a particular solenoid for operating a valve to perform a specific function in one of the clamp assembly and positioning units 1-7. The broken lines in FIGS. 38 and 39 separate the groups of terminal blocks according to the various units 1-7 of the fixture. For example, energizing terminal block TB1-1 causes operation of solenoid 1HA3 to perform the "X" clamp function in unit 3. Similarly, enegizing terminal block TB1-21 operates solenoid 2HA4 to perform the "Y" clamp function in unit 4. The terminal blocks in group TB2 shown in FIG. 39 are identified as TB2-1, TB2-2 etc. up to TB2-60. Energizing terminal block TB2-13 energizes solenoid 3HA2 to move the angle clamp into gripping position on unit 2. Similarly, energizing terminal block TB2-29 operates solenoid 7HA1 to move the bottom web clamp jaw into clamping position on unit 6. The designations −1 and −2 after each solenoid represent power and common electrical lines, respectively. The lines designated "Output Nos." in FIGS. 38 and 39 are outputs from the previously identified CIMROC-2 controller.

The following is a detailed step-by-step description of a test procedure performed using the fixture shown in FIG. 35 with the previously identified robot and controller and carrying out the operations previously summarized in steps 1-23 hereinabove. For each of the steps performed, the particular terminal blocks in groups TB1 and TB2 which are energized are identified in the description. By referring to FIGS. 38 and 39, one can see further the particular solenoids which then are energized and the resulting valves operated, and functions performed on particular ones of the clamp assembly and positioning units.

GENERAL CONSIDERATIONS

A. Set system pressure at 250 PSI.
B. Solenoid valves should remain energized when clamping or unclamping to minimize drift due to trapped air in the system.
C. Terminal TB2-59 should always be energized when system is running to maintain system pressure on the actuators and cylinders.

I. PHASE I
  A. SET UP PROCEDURE
   1. "X" and "Y" axis clamp should be set so that valves are centered.
   2. Energize TB2-59 to provide system pressure.
   3. Open angle clamp gripper.

| Energize | TB1-59 |
|---|---|
|  | TB2-15 |

4. Move bottom clamps up into position for initial set up, top clamps fully retracted.

| Bottom Clamps Up | | Top Clamps Open | |
|---|---|---|---|
| Energize | TB1-9 | Energize | TB1-15 |
|  | TB1-25 |  | TB1-31 |
|  | TB1-41 |  | TB1-47 |
|  | TB2-1 |  | TB2-35 |
|  | TB2-17 |  | TB2-51 |
|  | TB2-29 |  |  |
|  | TB2-45 |  |  |

5. Place part M. onto clamps and adjust "X" and "Y" axis. Rear edge of reinforcement angle should be flush with rear edge of clamp. Clamp angles and angle fixture bases.

| | Clamp Angles | | |
|---|---|---|---|
| De-Energize | TB1-59 | Energize | TB1-57 |
|  | TB2-15 |  | TB2-13 |
|  | Axes | | |
| Energize | TB1-49 |  |  |
|  | TB1-53 |  |  |
|  | TB2-5 |  |  |
|  | TB2-9 |  |  |

6. Position "K" hole clamp and adjust "X" and "Y" axes. Engage clamps and secure fixture bases.

| | Clamp Web | | |
|---|---|---|---|
| De-Energize | TB2-35 | Energize | TB2-33 |
|  | TB2-51 |  | TB2-49 |
|  | Axes | | |
| Energize | TB2-21 |  |  |
|  | TB2-25 |  |  |
|  | TB2-37 |  |  |

-continued

| | |
|---|---|
| | TB2-41 |

7. Position tee clamps and adjust "X" and "Y" axes. Engage clamps and secure fixture bases.

| | Clamp Tee | | |
|---|---|---|---|
| De-Energize | TB1-15 | Energize | TB1-13 |
| | TB1-31 | | TB1-29 |
| | TB1-47 | | TB1-45 |
| | Axes | | |
| Energize | TB1-1 | | |
| | TB1-5 | | |
| | TB1-17 | | |
| | TB1-21 | | |
| | TB1-33 | | |
| | TB1-37 | | |

8. The part should now be firmly held in position with all bases locked. The following should be energized at this point in time:

| Energized | TB1-1 | TB2-1 |
|---|---|---|
| | TB1-5 | TB2-5 |
| | TB1-9 | TB2-9 |
| | TB1-13 | TB2-13 |
| | TB1-17 | TB2-17 |
| | TB1-21 | TB2-21 |
| | TB1-25 | TB2-25 |
| | TB1-29 | TB2-29 |
| | TB1-33 | TB2-33 |
| | TB1-37 | TB2-37 |
| | TB1-41 | TB2-41 |
| | TB1-45 | TB2-45 |
| | TB1-49 | TB2-49 |
| | TB1-53 | TB2-59 |
| | TB1-57 | |

9. Run thru a teach operation with the robot end effector so that the location of all fixture clamp positioning units are defined in a program. Working a unit at a time, teach "X" and "C" first, then "Y". Once defined move onto the next clamp unit.
10. When all locations have been defined, move the robot end effector to the assembly, part M, and teach it where it is in the fixture.
11. Grasp the assembly with the end effector. After a 2 to 3 second delay release the clamps.

| De-Energize | TB1-9 | TB2-1 |
|---|---|---|
| | TB1-13 | TB2-13 |
| | TB1-25 | TB2-17 |
| | TB1-29 | TB2-29 |
| | TB1-41 | TB2-33 |
| | TB1-45 | TB2-45 |
| | TB1-57 | TB2-49 |
| Energize | TB1-11 | TB2-3 |
| | TB1-15 | TB2-15 |
| | TB1-27 | TB2-19 |
| | TB1-31 | TB2-31 |
| | TB1-43 | TB2-35 |
| | TB1-47 | TB2-47 |
| | TB1-59 | TB2-51 |

12. All clamps should drop out of the way leaving the robot end effector holding the assembly.
13. Robotically transport the assembly to Table I, set it on a set of risers, and release.
14. The robot should now contain a program telling it where the assembly is presently located, where it belongs in the fixture and where the fixture clamp positioning units have to be in order to hold it.
15. Release the "X" and "Y" axis clamps and engage unclamping. Shut off system pressure with the valves in the unclamp mode to release system pressure in the clamp cylinders. Center the clamping valve spools.

| De-Energize | TB1-1 | TB2-5 |
|---|---|---|
| | TB1-5 | TB2-9 |
| | TB1-17 | TB2-21 |
| | TB1-21 | TB2-25 |
| | TB1-33 | TB2-37 |
| | TB1-37 | TB2-41 |
| | TB1-49 | |
| | TB1-53 | |
| Energize | TB1-3 | TB2-7 |
| | TB1-7 | TB2-11 |
| | TB1-19 | TB2-23 |
| | TB1-23 | TB2-27 |
| | TB1-35 | TB2-39 |
| | TB1-39 | TB2-43 |
| | TB1-51 | |
| | TB1-55 | |
| De-Energize | TB2-59 | System Pressure |
| De-Energize | TB1-3 | TB2-7 |
| | TB1-7 | TB2-11 |
| | TB1-19 | TB2-23 |
| | TB1-23 | TB2-27 |
| | TB1-39 | |
| | TB1-51 | |
| | TB1-55 | |

16. Energize TB2-59 to provide system pressure.
17. Return to step 3 and repeat the procedure to establish a program for part N.
18. There must be significant differences in the locations established for the clamp positioning units in the "X" direction and the clamp positioning arms in the "Y" direction from one assembly to the other in order to demonstrate the robot's ability to locate and position the fixture clamps.
19. When the programming is complete, the assembly, part N, will be set on risers on Table III.
20. The robot should now contain two complete programs.

B. OPERATIONAL PROCEDURE

1. Energize TB2-59 to provide system pressure.
2. Angle clamp grippers open.

| Energize | TB1-59 |
|---|---|
| | TB2-15 |

3. Bottom clamps come up into position and top clamps fully retract.

| Bottom Clamps Up | | Top Clamps Open | |
|---|---|---|---|
| Energize | TB1-9 | Energize | TB1-15 |
| | TB1-25 | | TB1-31 |
| | TB1-41 | | TB1-47 |
| | TB2-1 | | TB2-35 |
| | TB2-17 | | TB2-51 |
| | TB2-29 | | |
| | TB2-45 | | |

4. The robot moves from a "Home" position to the "X" and "C" axis shoulder bolts on the fixture clamp positioning unit for web clamp 6. The end effector grabs hold of the base and unclamps the unit.

| | |
|---|---|
| Energize | TB2-23 |

5. The robot moves the fixture clamp positioning unit of unit 6 to the proper position for part M, as determined in the set up procedure, and locks it into position.

| | |
|---|---|
| De-Energize | TB2-23 |
| Energize | TB2-21 |

6. The robot releases the fixture clamp positioning unit and moves to the "Y" axis shoulder bolt on unit 6. The end effector grabs hold of the bolt and unclamps the unit.

| | |
|---|---|
| Energize | TB2-27 |

7. The robot moves the "Y" axis to the proper position for part M, as determined in the set up procedure, and locks it into position.

| | |
|---|---|
| De-Energize | TB2-27 |
| Energize | TB2-25 |

8. This procedure, item 4 thru item 7, is followed until all "X" and "C" axes for the bases are locked into position and all "Y" axis arms are locked. The following is a summary of this sequence;

| Unit #3 | |
|---|---|
| "X" & "C" Unclamp and Move | Energize TB1-3 |
| "X" & "C" Clamp | De-Energize TB1-3 |
| | Energize TB1-1 |
| "Y" Unclamp and Move | Energize TB1-7 |
| "Y" Clamp | De-Energize TB1-7 |
| | Energize TB1-5 |
| Unit #1 | |
| "X" & "C" Unclamp and Move | Energize TB1-51 |
| "X" & "C" Clamp | De-Energize TB1-51 |
| | Energize TB1-49 |
| "Y" Unclamp And Move | Energize TB1-55 |
| "Y" Clamp | De-Energize TB1-55 |
| | Energize TB1-53 |
| Unit #4 | |
| "X" & "C" Unclamp and Move | Energize TB1-19 |
| "X" & "C" Clamp | De-Energize TB1-19 |
| | Energize TB1-17 |
| "Y" Unclamp and Move | Energize TB1-23 |
| "Y" Clamp | De-Energize TB1-23 |
| | Energize TB1-21 |
| Unit #2 | |
| "X" & "C" Unclamp and Move | Energize TB2-7 |
| "X" & "C" Clamp | De-Energize TB2-7 |
| | Energize TB2-5 |
| "Y" Unclamp and Move | Energize TB2-11 |
| "Y" Clamp | De-Energize TB2-11 |
| | Energize TB2-9 |
| Unit #5 | |
| "X" & "C" Unclamp and Move | Energize TB1-35 |
| "X" & "C" Clamp | De-Energize TB1-35 |
| | Energize TB1-33 |
| "Y" Unclamp and Move | Energize TB1-39 |
| "Y" Clamp | De-Energize TB1-39 |
| | Energize TB1-37 |
| Unit #7 | |
| "X" & "C" Unclamp and Move | Energize TB2-39 |
| "X" & "C" Clamp | De-Energize TB2-39 |
| | Energize TB2-37 |
| "Y" Unclamp and Move | Energize TB2-43 |

-continued

| | | |
|---|---|---|
| "Y" Clamp | De-Energize TB2-43 | |
| | Energize TB2-41 | |

9. At this point in time, bottom clamps are up, top clamps are open, and "X", "C" and "Y" axes are locked into position. The following should be energized:

| Energized: | TB1-1 | TB2-1 |
|---|---|---|
| | TB1-5 | TB2-5 |
| | TB1-9 | TB2-9 |
| | TB1-15 | TB2-15 |
| | TB1-17 | TB2-17 |
| | TB1-21 | TB2-21 |
| | TB1-25 | TB2-25 |
| | TB1-31 | TB2-29 |
| | TB1-33 | TB2-35 |
| | TB1-37 | TB2-37 |
| | TB1-41 | TB2-41 |
| | TB1-47 | TB2-45 |
| | TB1-49 | TB2-51 |
| | TB1-53 | TB2-59 |
| | TB1-59 | |

10. The robot will move to Table I and pick up assembly M and move it to the fixture clamps.
11. When in position the clamps will engage to hold the assembly.

| De-Energize | TB1-15 | TB2-15 |
|---|---|---|
| | TB1-31 | TB2-35 |
| | TB1-47 | TB2-51 |
| | TB1-59 | |
| Energize | TB1-13 | TB2-13 |
| | TB1-29 | TB2-33 |
| | TB1-45 | TB2-49 |
| | TB1-57 | |

12. The robot will release the part and return to "home" position, leaving the fixture holding the assembly.
13. The robot now returns to the fixture, grasps assembly M releases the clamps and returns the assembly to Table I.

| De-Energize | TB1-9 | TB2-1 |
|---|---|---|
| | TB1-13 | TB2-13 |
| | TB1-25 | TB2-17 |
| | TB1-29 | TB2-29 |
| | TB1-41 | TB2-33 |
| | TB1-45 | TB2-45 |
| | TB1-57 | TB2-49 |
| Energize | TB1-11 | TB2-3 |
| | TB1-15 | TB2-15 |
| | TB1-27 | TB2-19 |
| | TB1-31 | TB2-31 |
| | TB1-43 | TB2-35 |
| | TB1-47 | TB2-47 |
| | TB1-59 | TB2-51 |

14. Release the "X" and "Y" axis clamps and engage unclamping. Shut off system pressure with the valves in the unclamp mode to release system pressure in the clamp cylinders. Center the clamping valve spools.

| De-Energize | TB1-1 | TB2-5 |
|---|---|---|
| | TB1-5 | TB2-9 |
| | TB1-17 | TB2-21 |

-continued

| | | |
|---|---|---|
| | TB1-21 | TB2-25 |
| | TB1-33 | TB2-37 |
| | TB1-37 | TB2-41 |
| | TB1-49 | |
| | TB1-53 | |
| Energize | TB1-3 | TB2-7 |
| | TB1-7 | TB2-11 |
| | TB1-19 | TB2-23 |
| | TB1-23 | TB2-27 |
| | TB1-35 | TB2-39 |
| | TB1-39 | TB2-43 |
| | TB1-51 | |
| | TB1-55 | |
| De-Energize | TB2-59 | System Pressure |
| De-Energize | TB1-3 | TB2-7 |
| | TB1-7 | TB2-11 |
| | TB1-19 | TB2-23 |
| | TB1-23 | TB2-27 |
| | TB1-35 | TB2-39 |
| | TB1-39 | TB2-43 |
| | TB1-51 | |
| | TB1-55 | |

15. Energize TB2-59 to provide system pressure.
16. Angle clamp grippers open.

| | |
|---|---|
| Energize | TB1-59 |
| | TB2-15 |

17. Bottom clamps come up into position and top clamps fully retract.

| Bottom Clamps Up | | Top Clamps Open | |
|---|---|---|---|
| Energize | TB1-9 | Energize | TB1-15 |
| | TB1-25 | | TB1-31 |
| | TB1-41 | | TB1-47 |
| | TB2-1 | | TB2-35 |
| | TB2-17 | | TB2-51 |
| | TB2-29 | | |
| | TB2-45 | | |

18. The robot moves from a "Home" position to the "X" and "C" axis shoulder bolts on the fixture clamp positioning unit for web clamp 6. The end effector grabs hold of the bolts and unclamps the unit.

| | |
|---|---|
| Energize | TB2-23 |

19. The robot moves the fixture clamp positioning unit of unit 6 to the proper position for part N, as determined in the set up procedure, and locks it into position.

| | |
|---|---|
| De-Energize | TB2-23 |
| Energize | TB2-21 |

20. The robot releases the fixture clamp positioning unit and moves to the "Y" axis shoulder bolt on unit 6. The end effector grabs hold of the bolt and unclamps the unit.

| | |
|---|---|
| Energize | TB2-27 |

21. The robot moves the "Y" axis to the proper position for part N, as determined in the set up procedure, and locks it into position.

| | |
|---|---|
| De-Energize | TB2-27 |
| Energize | TB2-25 |

22. This procedure, item 18 thru item 21, is followed until all "X" and "C" axes for the bases are locked into position and all "Y" axis arms are locked. The following is a summary of this sequence:

| | |
|---|---|
| Unit #3 | |
| "X" & "C" Unclamp and Move | Energize TB1-3 |
| "X" & "C" Clamp | De-Energize TB1-3 |
| | Energize TB1-1 |
| "Y" Unclamp and Move | Energize TB1-7 |
| "Y" Clamp | De-Energize TB1-7 |
| | Energize TB1-5 |
| Unit #1 | |
| "X" & "C" Unclamp and Move | Energize TB1-51 |
| "X" & "C" Clamp | De-Energize TB1-51 |
| | Energize TB1-49 |
| "Y" Unclamp and Move | Energize TB1-55 |
| "Y" Clamp | De-Energize TB1-55 |
| | Energize TB1-53 |
| Unit #4 | |
| "X" & "C" Unclamp and Move | Energize TB1-19 |
| "X" & "C" Clamp | De-Energize TB1-19 |
| | Energize TB1-17 |
| "Y" Unclamp and Move | Energize TB1-23 |
| "Y" Clamp | De-Energize TB1-23 |
| | Energize TB1-21 |
| Unit #2 | |
| "X" & "C" Unclamp and Move | Energize TB2-7 |
| "X" & "C" Clamp | De-Energize TB2-7 |
| | Energize TB2-5 |
| "Y" Unclamp and Move | Energize TB2-11 |
| "Y" Clamp | De-Energize TB2-11 |
| | Energize TB2-9 |
| Unit #5 | |
| "X" & "C" Unclamp and Move | Energize TB1-35 |
| "X" & "C" Clamp | De-Energize TB1-35 |
| | Energize TB1-33 |
| "Y" Unclamp and Move | Energize TB1-39 |
| "Y" Clamp | De-Energize TB1-39 |
| | Energize TB1-37 |
| Unit #7 | |
| "X" & "C" Unclamp and Move | Energize TB2-39 |
| "X" & "C" Clamp | De-Energize TB2-39 |
| | Energize TB2-37 |
| "Y" Unclamp and Move | Energize TB2-43 |
| "Y" Clamp | De-Energize TB2-43 |
| | Energize TB2-41 |

23. At this point in time, bottom clamps are up, top clamps are open, and "X", "C" and "Y" axes are locked into position. The following should be energized:

| | | |
|---|---|---|
| Energized | TB1-1 | TB2-1 |
| | TB1-5 | TB2-5 |
| | TB1-9 | TB2-9 |
| | TB1-15 | TB2-15 |
| | TB1-17 | TB2-17 |
| | TB1-21 | TB2-21 |
| | TB1-25 | TB2-25 |
| | TB1-31 | TB2-29 |
| | TB1-33 | TB2-35 |
| | TB1-37 | TB2-37 |
| | TB1-41 | TB2-41 |
| | TB1-47 | TB2-45 |
| | TB1-49 | TB2-51 |
| | TB1-53 | TB2-59 |

-continued

| | TB1-59 | |
|---|---|---|

24. The robot will move to Table III and pick up assembly N and move it to the fixture clamps.
25. When in position the clamps will engage to hold the assembly.

| De-Energize | TB1-15 | TB2-15 |
|---|---|---|
| | TB1-31 | TB2-35 |
| | TB1-47 | TB2-51 |
| | TB1-59 | |
| Energize | TB1-13 | TB2-13 |
| | TB1-29 | TB2-33 |
| | TB1-45 | TB2-49 |
| | TB1-57 | |

26. The robot will release the part and return to "home" position, leaving the fixture holding the assembly.
27. The robot now returns to the fixture, grasp assembly N, releases the clamps and returns the assembly to Table III.

| De-Energize | TB1-9 | TB2-1 |
|---|---|---|
| | TB1-13 | TB2-13 |
| | TB1-25 | TB2-17 |
| | TB1-29 | TB2-29 |
| | TB1-41 | TB2-33 |
| | TB1-45 | TB2-45 |
| | TB1-57 | TB2-49 |
| Energize | TB1-11 | TB2-3 |
| | TB1-15 | TB2-15 |
| | TB1-27 | TB2-19 |
| | TB1-31 | TB2-31 |
| | TB1-43 | TB2-35 |
| | TB1-47 | TB2-47 |
| | TB1-59 | TB2-51 |

28. Release the "X" and "Y" axis clamps and engage unclamping. Shut off system pressure with the valves in the unclamp mode to release system pressure in the clamp cylinders. Center the clamping valve spools.

| De-Energize | TB1-1 | TB2-5 |
|---|---|---|
| | TB1-5 | TB2-9 |
| | TB1-17 | TB2-21 |
| | TB1-21 | TB2-25 |
| | TB1-33 | TB2-37 |
| | TB1-37 | TB2-41 |
| | TB1-49 | |
| | TB1-53 | |
| Energize | TB1-3 | TB2-7 |
| | TB1-7 | TB2-11 |
| | TB1-19 | TB2-23 |
| | TB1-23 | TB2-27 |
| | TB1-35 | TB2-39 |
| | TB1-39 | TB2-43 |
| | TB1-51 | |
| | TB1-55 | |
| De-Energize | TB2-59 System Pressure | |
| De-Energize | TB1-3 | TB2-7 |
| | TB1-7 | TB2-11 |
| | TB1-19 | TB2-23 |
| | TB1-23 | TB2-27 |
| | TB1-35 | TB2-39 |
| | TB1-39 | TB2-43 |
| | TB1-51 | |
| | TB1-55 | |

29. The robot now returns to "home" position ready to start another cycle.
30. The cycle can be repeated as many times as desired.

II. PHASE II

A. SET UP PROCEDURE

1. "X" and "Y" axis clamp should be set so that valves are center.
2. Energize TB2-59 to provide system pressure.
3. Open angle clamp gripper.

| Energize | TB1-59 |
|---|---|
| | TB2-15 |

4. Move bottom clamps up into position for initial set up, top clamps fully retracted.

| Bottom Clamps Up | | Top Clamps Open | |
|---|---|---|---|
| Energize | TB1-9 | Energize | TB1-15 |
| | TB1-25 | | TB1-31 |
| | TB1-41 | | TB1-47 |
| | TB2-1 | | TB2-35 |
| | TB2-17 | | TB2-51 |
| | TB2-29 | | |
| | TB2-45 | | |

5. Using the original fixture clamp positioning program from Phase I for part M, which determines clamp position to a quality control checked assembly, position all unit bases, and lock into position.
6. The robot moves from a "Home" position to the "X" and "C" axis shoulder bolts on the fixture clamp positioning unit for web clamp 6. The end effector grabs hold of the bolts and unclamps the unit.

| Energize | TB2-23 |
|---|---|

7. The robot moves the fixture clamp positioning unit of unit 6 to the proper position for part M, as determined in the set up procedure, and locks it into position.

| De-Energize | TB2-23 |
|---|---|
| Energize | TB2-21 |

8. The robot releases the fixture clamp positioning unit and moves to the "Y" axis shoulder bolt on clamp 6. The end effector grabs hold of the bolt and unclamps the unit.

| Energize | TB2-27 |
|---|---|

9. The robot moves the "Y" axis to the proper position for part M, as determined in the set up procedure, and locks it into position.

| De-Energize | TB2-27 |
|---|---|
| Energize | TB2-25 |

10. This procedure, item 6 thru item 9, is followed until all "X" and "C" axes for the bases are locked into position and all "Y" axis arms are locked. The following is a summary of this sequence:

Unit #3
| | | |
|---|---|---|
| "X" & "C" Unclamp and Move | Energize | TB1-3 |
| "X" & "C" Clamp | De-Energize | TB1-3 |
| | Energize | TB1-1 |
| "Y" Unclamp and Move | Energize | TB1-7 |
| "Y" Clamp | De-Energize | TB1-7 |
| | Energize | TB1-5 |

Unit #1
| | | |
|---|---|---|
| "X" & "C" Unclamp and Move | Energize | TB1-51 |
| "X" & "C" Clamp | De-Energize | TB1-51 |
| | Energize | TB1-49 |
| "Y" Unclamp and Move | Energize | TB1-55 |
| "Y" Clamp | De-Energize | TB1-55 |
| | Energize | TB1-53 |

Unit #4
| | | |
|---|---|---|
| "X" & "C" Unclamp and Move | Energize | TB1-19 |
| "X" & "C" Clamp | De-Energize | TB1-19 |
| | Energize | TB1-17 |
| "Y" Unclamp and Move | Energize | TB1-23 |
| "Y" Clamp | De-Energize | TB1-23 |
| | Energize | TB1-21 |

Unit #2
| | | |
|---|---|---|
| "X" & "C" Unclamp and Move | Energize | TB2-7 |
| "X" & "C" Clamp | De-Energize | TB2-7 |
| | Energize | TB2-5 |
| "Y" Unclamp and Move | Energize | TB2-11 |
| "Y" Clamp | De-Energize | TB2-11 |
| | Energize | TB2-9 |

Unit #5
| | | |
|---|---|---|
| "X" & "C" Unclamp and Move | Energize | TB1-35 |
| "X" & "C" Clamp | De-Energize | TB1-35 |
| | Energize | TB1-33 |
| "Y" Unclamp and Move | Energize | TB1-39 |
| "Y" Clamp | De-Energize | TB1-39 |
| | Energize | TB1-37 |

Unit #7
| | | |
|---|---|---|
| "X" & "C" Unclamp and Move | Energize | TB2-39 |
| "X" & "C" Clamp | De-Energize | TB2-39 |
| | Energize | TB2-37 |
| "Y" Unclamp and Move | Energize | TB2-43 |
| "Y" Clamp | De-Energize | TB2-43 |
| | Energize | TB2-41 |

11. At this point in time, bottom clamps are up, top clamps are open, and "X", "C" and "Y" axes are locked into position. The following should be energized:

| Energized | | |
|---|---|---|
| | TB1-1 | TB2-1 |
| | TB1-5 | TB2-5 |
| | TB1-9 | TB2-9 |
| | TB1-15 | TB2-15 |
| | TB1-17 | TB2-17 |
| | TB1-21 | TB2-21 |
| | TB1-25 | TB2-25 |
| | TB1-31 | TB2-29 |
| | TB1-33 | TB2-35 |
| | TB1-37 | TB2-37 |
| | TB1-41 | TB2-41 |
| | TB1-47 | TB2-45 |
| | TB1-49 | TB2-51 |
| | TB1-53 | TB2-59 |
| | TB1-59 | |

12. With the corresponding loose parts from Table II, manually load the fixture clamps.
13. Position the two angles into the clamps of units 1 and 2 and clamp up.

| | |
|---|---|
| De-Energize | TB1-59 |
| | TB2-15 |
| Energize | TB1-57 |
| | TB2-13 |

14. Position the web onto the clamps of units 6 and 7 and clamp up.

| | |
|---|---|
| De-Energize | TB2-35 |
| | TB2-51 |
| Energize | TB2-33 |
| | TB2-49 |

15. Position the tee onto the clamps of units 3, 4 and 5 and clamp up.

| | |
|---|---|
| De-Energize | TB1-15 |
| | TB1-31 |
| | TB1-47 |
| Energize | TB1-13 |
| | TB1-29 |
| | TB1-45 |

NOTE: The position of the tee within the clamps will have to be dimensionally checked against the finished M assembly for proper location.

16. Bring the robot from "Home" position to the fixture and teach the end effector where the tee section is located.
17. The end effector should grasp the tee section. After a 2 to 3 second delay, the clamps will drop out of the way.

| | |
|---|---|
| De-Energize | TB1-9 |
| | TB1-13 |
| | TB1-25 |
| | TB1-29 |
| | TB1-41 |
| | TB1-45 |
| Energize | TB1-11 |
| | TB1-15 |
| | TB1-27 |
| | TB1-31 |
| | TB1-43 |
| | TB1-47 |

18. The robot then transports the tee section to Table II and places it on a set of risers.
19. The robot then returns to the fixture and grasps the web section. After a 2 to 3 second delay, the clamps will drop out of the way.

| | |
|---|---|
| De-Energize | TB2-29 |
| | TB2-33 |
| | TB2-45 |
| | TB2-49 |
| Energize | TB2-31 |
| | TB2-35 |
| | TB2-47 |
| | TB2-51 |

20. The robot then transports the web section to Table II and places it on a set of risers.
21. The robot then returns to the fixture and grasps the angle in the clamp of unit 2. After a 2 to 3 second delay, the clamp will drop out of the way.

| | |
|---|---|
| De-Energize | TB2-13 |

-continued

| | |
|---|---|
| Energize | TB2-17<br>TB2-15<br>TB2-19 |

22. The robot then transports the angle to Table II and places it on a set of risers.
23. The robot then returns to the fixture and grasps the angle in the clamp of unit 1. After a 2 to 3 second delay, the clamp will drop out of the way.

| | |
|---|---|
| De-Energize | TB1-57<br>TB2-1 |
| Energize | TB1-59<br>TB2-3 |

24. The robot should now contain a program telling it where the components are presently located on Table II, where they belong in the fixture, which sequence must be used for their installation (order of disassembly is reversed for assembly) and which clamps must be engaged to hold the components in position during assembly.

B. OPERATION PROCEDURE

1. All fixture clamp positioning units should remain in the position for part M as established in the set up procedure, item 5 thru 10.

| | | |
|---|---|---|
| Energize From Set Up | TB1-1<br>TB1-5<br>TB1-17<br>TB1-21<br>TB1-33<br>TB1-37<br>TB1-49<br>TB1-53 | TB2-5<br>TB2-9<br>TB2-21<br>TB2-25<br>TB2-37<br>TB2-41 |

2. Open angle clamp grippers

| | |
|---|---|
| Energize | TB1-59<br>TB2-15 |

3. Bottom clamps come up into position and top clamps fully open.

| Bottom Clamps Up | | Top Clamps Open | |
|---|---|---|---|
| Energize | TB1-9<br>TB1-25<br>TB1-41<br>TB2-1<br>TB2-17<br>TB2-29<br>TB2-45 | Energize | TB1-15<br>TB1-31<br>TB1-47<br>TB2-35<br>TB2-51 |

4. The robot moves from the "Home" position to Table II and grasps an angle. The robot transports the angle to the fixture and positions it in the Clamp of unit 1. After a 2 to 3 second delay, the clamp engages.

| | |
|---|---|
| De-Energize | TB1-59 |
| Energize | TB1-57 |

5. The robot returns to Table II and grasps the second angle. The robot transports the angle to the fixture and positions it in the clamp of unit 2. After a 2 to 3 second delay, the clamp engages.

| | |
|---|---|
| De-Energize | TB2-15 |
| Energize | TB2-13 |

6. The robot returns to Table II and grasps the web. The robot transports the web to the fixture and positions it in the clamps of units 6 and 7. After a 2 to 3 second delay, the clamps engage.

| | |
|---|---|
| De-Energize | TB2-35<br>TB2-51 |
| Energize | TB2-33<br>TB2-49 |

7. The robot returns to Table II and grasps the tee. The robot transports the tee to the fixture and positions it in the clamps of units 3, 4 and 5. After a 2 to 3 second delay, the clamps engage.

| | |
|---|---|
| De-Energize | TB1-15<br>TB1-31<br>TB1-47 |
| Energize | TB1-13<br>TB1-29<br>TB1-45 |

8. The robot returns to "Home" position.
9. After a short hold in "Home" position, the robot returns to the fixture and grasps the tee section. After a 2 to 3 second delay, the clamps will drop out of the way.

| | |
|---|---|
| De-Energize | TB1-9<br>TB1-13<br>TB1-25<br>TB1-29<br>TB1-41<br>TB1-45 |
| Energize | TB1-11<br>TB1-15<br>TB1-27<br>TB1-31<br>TB1-43<br>TB1-47 |

10. The robot then transports the tee section back to Table II and places it on a set of risers.
11. The robot returns to the fixture and grasps the web section. After a 2 to 3 second delay, the clamps will drop out of the way.

| | |
|---|---|
| De-Energize | TB2-29<br>TB2-33<br>TB2-45<br>TB2-49 |
| Energize | TB2-31<br>TB2-35<br>TB2-47<br>TB2-51 |

12. The robot transports the web section to Table II an places it on a set of risers.
13. The robot returns to the fixture and grasps the angle in clamp 2. After a 2 to 3 second delay the clamp will drop out of the way.

| | |
|---|---|
| De-Energize | TB2-13 |
| | TB2-17 |
| Energize | TB2-15 |
| | TB2-19 |

14. The robot transports the angle to Table II and places it on the set of risers.
15. The robot returns to the fixture and grasps the angle in the Clamp of unit 1. After a 2 to 3 second delay the clamp will drop out of the way.

| | |
|---|---|
| De-Energize | TB1-57 |
| | TB2-1 |
| Energize | TB1-59 |
| | TB2-3 |

16. The robot now returns to "Home" position ready to start another cycle.
17. The cycle can be repeated as many times as desired.

An illustrative computer program for controlling movement and motion of the robot in performing the foregoing operations is set forth in the attached listing. This program is written in CIMPLER language developed by GCA Corporation (Cimcorp Inc.) for use with the CIMROC 2 robot control commercially available from GCA Corporation (Cimcorp Inc.) in conjunction with the XR6050M 6 axis robot previously identified. Other computer programs can of course be employed for controlling movement and motion of the robot in performing the foregoing operations. The first subroutine, NOTPRT, is for removing details from the fixture and returning them to their position on Table II. In this and subsequent subroutines, the command HOLDEXEC means do not execute until the previous point is reached. The second subroutine, SETVAR, is for setting terminology variables. The outputs 91–96 are on the robot controller associated with the clamps. The third subroutine, SETCLP, is for setting the clamps to receive parts or details. It sets the fixture clamps in position to receive details or assemblies, opens angle clamp grippers, places all bottom clamp arms in fully up position, and places all top clamps in fully retracted position. In this and subsequent subroutines the output numbers listed correspond to the numbers 1–88 in FIGS. 38 and 39 alongside the terminal block columns TB1 and TB2. When the output is ON the terminal block is energized. By way of illustration, SETCLP causes energization of terminal blocks 59, 9, 25, 41, 15, 31 and 47 in group TB1 and energization of blocks 15, 1, 17, 29, 45, 35 and 51 in TB2 to provide the following functions: angle clamp release and angle clamp up in units 1 and 2, bottom T clamp and top T unclamp in units 3, 4 and 5, bottom web clamp and top web unclamp in units 6 and 7. The fourth, fifth and sixth subroutines, ANGLE1, WEB and TEE, respectively, cause engagement of the angle, clamp on unit 1, the web clamps on units 6 and 7 and the tee clamps on units 3, 4 and 5, respectively. The seventh subroutine, DROPIT, causes disengagement of all the clamps, for example when the robot is to hold the assembly.

The eighth subroutine, ENDIT, causes deactivation of the bottom T unclamp and top T unclamp functions in units 3, 4 and 5, deactivation of the angle clamp release angle clamp down functions in units 1 and 2 and deactivation of the bottom web unclamp and top web unclamp functions in units 6 and 7. The ninth subroutine, ANGLE 2, causes engagement of the angle on clamp unit 2. The tenth subroutine, UNV, is for releasing the "Y" axis clamps on the positioning units. The eleventh subroutine, UNX, is for releasing the "X" axis clamps on the positioning units. The twelfth, thirteenth, fourteenth and fifteenth subroutines, FAST, MED, SLOW and SSSLOW, respectively, control velocity and acceleration of the robot motion. The sixteenth subroutine, MOVEIT, is the base program for positioning the fixture clamp positioning units to accept assembly M or N. This program calls up subroutines to position the robot end effector over the "X" and "C" axis shoulder bolts, lower and grip the bolts, unclamp the "X" axis (UNX), move the fixture, clamp the "X" axis (XIT), release and move to "Y" axis bolt, clamp onto "Y" axis bolts, unclamp "Y" (UNY), move the "Y" axis bar and reclamp (YIT).

The seventeenth and eighteenth subroutines, XIT and YIT,, respectively, cause locking of the "X" axis clamps and "Y" axis clamps, respectively, on the positioning units. The nineteeth subroutine, UNLOCK, causes unlocking of both the "X" and "Y" axis clamps on all the positioning units. The twentieth subroutine, LOCKIT, causes unlocking of both the "X" and "Y" axis clamps on all the positioning units. The twenty-first and twenty-second subroutines PINDWN and PINUP, respectively, control movement of two pins on the robot end effector for engaging assemblies or details. The twenty-third subroutine, QWERT, is for loading assembly M into the fixture, and the twenty-fourth subroutine, QWERTY, is for unloading that assembly from the fixture and returning it to Table I. The twenty-fifth routine, TYRANT, is the complete program for performing the test operations.

The twenty-sixth subroutine, ASDFG, is for unloading assembly N from the fixture, and the twenty-seventh subroutine, ASDF, is for loading that assembly into the fixture. The twenty-eighth and twenty-ninth subroutines, UNPART and PARTIT, respectively, are for moving the top jaws of the clamps on units 3, 4, 5, 6 and 7 up and down, respectively. In particular, UNPART causes the Top T Unclamp function and PARTIT causes the Top T Clamp function. The thirtieth subroutine, UNWEB, causes movement of the two web clamps up, i.e. provides the top web unclamp function, on units 6 and 7. The thirty first subroutine, TWOOUT, causes release and drop of the angle clamps on positioning unit 2. In particular, it deactivates angle clamp grip, activates angle clamp release, deactivates angle clamp up and activates angle clamp down. The thirty second subroutine, ONEOUT, in a similar manner causes release and drop of the angle clamps on positioning unit 1. The thirty third subroutine, TWOUP, causes grabbing by the angle clamps on positioning unit 2. In particular, it deactivates angle clamp down, activates angle clamp up, deactivates angle clamp release and activates angle clamp grip. The thirty fourth routine, ONEUP, in a similar manner causes grabbing by the angle clamps on positioning unit 1. The thirty fifth routine, PARTS, is for loading parts in the fixture from Table II.

The foregoing demonstrated extremely successful interface between the fixture clamp positioning units and the robotic end effector in achieving extremely high accuracy in repeatability of fixture clamp reconfiguration. High accuracy and ease of operational positioning was exhibited in loading and unloading of loose details and finished assemblies. The adaptability, flexibility, integrity and high accuracy repeatability of the fixture of the present invention presents an extremely viable automated alternative to conventional subassembly manufacturing techniques while being extremely cost effective.

It is therefore apparent that the present invention accomplishes its intended objects. While an embodiment of the present invention has been described in detail, that is for the purpose of illustration, not limitation.

We claim:

1. A flexible fixture for holding a plurality of details comprising an assembly during assembly processes thereon comprising:
   (a) an elongated base;
   (b) means for supporting said base in a predetermined position;
   (c) a plurality of movable positioning means located at spaced locations along said base, each of said positioning means having holding means adapted to engage said details, said positioning means being located to allow access to said details from two directions of movement of tools of assembly apparatus moving with respect to the assembly during assembly processes thereon;
   (d) mechanical means separate from said base for engaging said positioning means for moving said positioning means relative to said base to enable said holding means to accept various members of a family of details which all have substantially the same configuration and differ by increments in size and for holding the details together as an assembly and in the proper detail location and assembly position for assembling; and
   (e) means for moving said holding means into and out of engagement with said details.

2. A flexible fixture according to claim 1, further including means for movably mounting said positioning means on said base for movement in first and second directions at angles to each other and in a first plane.

3. A flexible fixture according to claim 2, wherein said holding means are disposed relative to said positioning means such that the assembly is held in a plane generally parallel to said first plane.

4. A flexible fixture according to claim 1, further including means for movably mounting said positioning means on said base for pivotal movement about an axis generally perpendicular to the plane of the assembly.

5. A flexible fixture according to claim 2, further including means operatively associated with said positioning means for holding said positioning means at selected locations after movement in said directions.

6. A flexible fixture according to claim 4, further including means operatively associated with said positioning means and said base for holding said positioning means at selected locations after movement about said axis.

7. A flexible fixture according to claim 1, further including control means for controlling said mechanical means engaging said positioning means and for controlling said means for moving said holding means.

8. A flexible fixture according to claim 1, further including means operatively connected to said holding means for moving said holding means about an axis generally parallel to the plane of the assembly.

9. A flexible fixture according to claim 1, further including means operatively connected to said holding means for moving said holding means along a plane substantially perpendicular to the plane of said assembly.

10. A flexible fixture according to claim 1, wherein means for moving said positioning means comprises robotic means operatively associated with said fixture.

11. A flexible fixture according to claim 1, wherein each of said positioning means comprises:
   (a) an assembly movably supported on said base;
   (b) an elongated member having a longitudinal axis and movably carried by said assembly for movement in opposite directions along said longitudinal axis; and
   (c) said holding means being located adjacent one end of said elongated member.

12. A flexible fixture according to claim 11, further including releasable clamping means on said assembly and operatively engaging said base for enabling said assembly to be moved relative to said base when said clamping means is released and for holding said assembly in a fixed position on said base when said clamping means is engaged.

13. A flexible fixture according to claim 11, further including releasable clamping means on said assembly and operatively engaging said elongated member for enabling said member to be moved along said axis relative to said assembly when said clamping means is released and for holding said elongated member in a fixed position relative to said member when said clamping means is engaged.

14. A flexible fixture according to claim 11, further including means for removably connecting said holding means to said elongated member to enable various types of holding means to be connected to said elongated member.

15. A flexible fixture according to claim 1, further including means for removably connecting said holding means to said positioning means so that various types of holding means can be associated with said positioning means.

16. A flexible fixture for holding a plurality of details comprising an assembly during assembly processes thereon the assembly of plurality of details defining a plane of the assembly, said flexible fixture comprising:
   (a) an elongated base;
   (b) means for supporting said base in a predetermined position, said supporting means including means for moving said base in a direction substantially perpendicular to the plane of the assembly;
   (c) a plurality of positioning means located at spaced locations along said base, each of said positioning means having holding means adapted to engage said details, said positioning means being located to allow access to said details from two directions of movement of tools of assembly apparatus moving with respect to the assembly during assembly processes thereon;
   (d) means for movably mounting each of said positioning means on said base for movement in first and second angular directions in a plane substantially parallel to the plane of the assembly and for pivotal movement about an axis substantially perpendicular to said plane;
   (e) means operatively associated with said positioning means for moving said positioning means relative to said base in said first and second directions and about said axis to enable said holding means to accept the various members of a family of details which all have substantially the same configuration and differ by increments in size and for holding the details together as an assembly and in the proper detail location and assembly position for assembling;

(f) means for moving said holding means into and out of engagement with said details; and (g) control means operatively connected to said means for moving said positioning means and to said means for moving said holding means.

17. A flexible fixture according to claim 16, further including means operatively connected to said holding means for moving said holding means about an axis generally parallel to the plane of the assembly.

18. A flexible fixture according to claim 16 further including means operatively connected to said holding means for moving said holding means about an axis generally perpendicular to the plane of the assembly.

19. A flexible fixture according to claim 16, further including means operatively associated with said positioning means for holding said positioning means at selected locations after movement in said first and second directions.

20. A flexible fixture according to claim 16, further including means operatively associated with said positioning means and said base for holding said positioning means at selected locations after movement about said axis.

21. A flexible fixture according to claim 16, wherein said holding means comprises clamping means including jaw means movable about an axis generally parallel to the plane of said assembly.

22. A flexible fixture according to claim 16 further including motive means operatively associated with each jaw of said jaw means for moving said jaws independently of each other.

23. A flexible fixture according to claim 16, wherein said positioning means is provided with first and second formations and said means for moving said positioning means includes means for selectively grasping said first formation for moving said positioning means in said first direction and about said axis and grasping said second formation for moving said positioning means in said second direction.

24. A flexible fixture according to claim 16, wherein said means for moving said positioning means comprises robotic means operatively associated with said fixtures.

25. A flexible fixture according to claim 24, wherein said robotic means comprises (a) motive means for moving said robotic means along defined paths relative to said fixture, said paths being in two orthogonal directions in a plane and in a third direction normal to said plane; and (b) manipulative means adapted to engage said positioning means for adjusting same and adapted to grasp parts and assemblies for placing in and removing from said fixture.

26. A flexible fixture according to claim 25, wherein said manipulative means includes means for providing at least three separate movements about at least three axes.

27. A flexible fixture according to claim 16, wherein each of said positioning means comprises:

(a) an assembly movably supported on said base;

(b) an elongated member having a longitudinal axis and movably carried by said assembly for movement in opposite directions along said longitudinal axis; and (c) said holding means being located adjacent one end of said elongated member.

28. A flexible fixture according to claim 27, further including releasable clamping means on said assembly and operatively engaging said base for enabling said assembly to be moved relative to said base when said clamping means is released and for holding said assembly in a fixed position on said base when said clamping means is engaged.

29. A flexible fixture according to claim 27, further including releasable clamping means on said assembly and operatively engaging said elongated member for enabling said member to be moved along said longitudinal axis relative to said assembly when said clamping means is released and for holding said elongated member in a fixed position relative to said member when said clamping means is engaged.

30. A flexible fixture according to claim 27, further including means for removably connecting said holding means to said elongated member to enable various types of holding means to be connected to said elongated member.

31. A flexible fixture according to claim 16, further including means for removably connecting said holding means to said positioning means so that various types of holding means can be associated with said positioning means.

32. A flexible fixture for holding a plurality of details comprising an assembly during assembly processes thereon comprising;

(a) an elongated base;

(b) means for supporting said base in a predetermined position;

(c) a plurality of positioning means located at spaced locations along said base, each of said positioning means having holding means adapted to engage said details, said positioning means being located to allow access to said details from two directions of movement of tools of assembly apparatus moving with respect to the assembly during assembly processes thereon;

(d) means operatively associated with said positioning means for moving said positioning means relative to said base to enable said holding means to accept various members of a family of details which all have substantially the same configuration and differ by increments in size and for holding the details together as an assembly and in the proper detail location and assembly position for assembling;

(e) means for moving said holding means into and out of engagement with said details; and (f) said means for supporting said base including means for moving said base in a direction substantially perpendicular to the plane of the assembly.

33. A flexible fixture for holding a plurality of details comprising an assembly during assembly processes thereon comprising:

(a) an elongated base;

(b) means for supporting said base in a predetermined position;

(c) a plurality of positioning means located at spaced locations along said base, each of said positioning means having holding means adapted to engage said details, said positioning means being located to allow access to said details from two directions of movement of tools of assembly apparatus moving with respect to the assembly during assembly processes thereon;

(d) means operatively associated with said positioning means for moving said positioning means relative to said base to enable said holding means to accept various members of a family of details which all have substantially the same configuration and differ by increments in size and for holding the details together as an assembly and in the proper detail location and assembly position for assembling;

(e) means for moving said holding means into and out of engagement with said details;

(f) means for movably mounting said positioning means on said base for movement in first and second directions at angles to each other and in a first plane; and (g) said positioning means being provided with first and second formations and said means for moving said positioning means including means for selectively grasping said first and second formations for moving said positioning means in said first and second directions, respectively.

34. A flexible fixture for holding a plurality of details comprising an assembly during assembly processes thereon comprising:

(a) an elongated base;

(b) means for supporting said base in a predetermined position;

(c) a plurality of positioning means located at spaced locations along said base, each of said positioning means having holding means adapted to engage said details, said positioning means being located to allow access to said details from two directions of movement of tools of assembly apparatus moving with respect to the assembly during assembly processes thereon;

(d) means operatively associated with said positioning means for moving said positioning means relative to said base to enable said holding means to accept various members of a family of details which all have substantially the same configuration and differ by increments in size and for holding the details together as an assembly and in the proper detail location and assembly position for assembling;

(e) means for moving said holding means into and out of engagement with said details;

(f) means for movably mounting said positioning means on said base for pivotal movement about an axis generally perpendicular to the plane and assembly; and (g) said positioning means being provided with a first formation and said means for moving said positioning means including means for grasping said formation for moving said positioning means about said axis.

35. A flexible fixture for holding a plurality of details comprising an assembly during assembly processes thereon comprising:

(a) an elongated base;

(b) means for supporting said base in a predetermined position;

(c) a plurality of positioning means located at spaced locations along said base, each of said positioning means having holding means adapted to engage said details, said positioning means being located to allow access to said details from two directions of movement of tools of assembly apparatus moving with respect to the assembly during assembly processes thereon;

(d) means operatively associated with said positioning means for moving said positioning means relative to said base to enable said holding means to accept various members of a family of details which all have substantially the same configuration and differ by increments in size and for holding the details together as an assembly and in the proper detail location and assembly position for assembling;

(e) means for moving said holding means into and out of engagement with said details; and (f) said means for moving said positioning means comprising robotic means operatively associated with said fixture, said robotic means comprising motive means for moving said robotic means along defined paths relative to said fixture, said paths being in two orthogonal directions in a plane and in a third direction normal to said plane and manipulative means adapted to engage said positioning means for adjusting same and adapted to grasp details and assemblies for placing in and removing from said fixture.

36. A flexible fixture according to claim 35, wherein said manipulative means includes means for providing three separate movements about three axes.

* * * * *